(12) United States Patent
Dao et al.

(10) Patent No.: US 7,406,557 B2
(45) Date of Patent: Jul. 29, 2008

(54) PROGRAMMABLE LOGIC DEVICE INCLUDING PROGRAMMABLE INTERFACE CORE AND CENTRAL PROCESSING UNIT

(75) Inventors: Khang Kim Dao, San Jose, CA (US); Glenn A. Baxter, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 11/452,859

(22) Filed: Jun. 14, 2006

(65) Prior Publication Data

US 2007/0255886 A1    Nov. 1, 2007

Related U.S. Application Data

(62) Division of application No. 09/861,112, filed on May 18, 2001, now Pat. No. 7,076,595.

(51) Int. Cl.
*G06F 13/00* (2006.01)
(52) U.S. Cl. ........................ 710/305; 710/107
(58) Field of Classification Search ............... 710/100, 710/305, 306, 317, 107; 326/37–39, 41, 326/47
See application file for complete search history.

(56) References Cited

U.S. PATENT DOCUMENTS

| | | | |
|---|---|---|---|
| 4,758,985 A | 7/1988 | Carter | |
| 4,855,669 A | 8/1989 | Mahoney | |
| 5,072,418 A | 12/1991 | Boutaud et al. | |
| 5,109,503 A | 4/1992 | Cruickshank et al. | |
| 5,111,423 A | 5/1992 | Kopec et al. | |
| 5,142,625 A | 8/1992 | Nakai | |
| RE34,363 E | 8/1993 | Freeman | |
| 5,274,570 A | 12/1993 | Izumi et al. | |

(Continued)

FOREIGN PATENT DOCUMENTS

EP        0315275 A2     10/1989

(Continued)

OTHER PUBLICATIONS

U.S. Appl. No. 09/858,732, filed May 15, 2001, Schultz.

(Continued)

*Primary Examiner*—Glenn A Auve
(74) *Attorney, Agent, or Firm*—John J. King

(57) ABSTRACT

A programmable logic device (PLD) includes a central processing unit (CPU) and a programmable interface coupled to the CPU, wherein the programmable interface includes a core designated by a user. The programmable interface core allows devices, both on and off-chip, to communicate with the CPU. In one embodiment, the programmable interface core includes a crosspoint switch for coupling a plurality of devices and the CPU. Re-programmability of the PLD provides significant flexibility in providing features that can be parameterized based on the user's needs and/or associated design. Specifically, these parameterized features can be implemented in programmable resources on the PLD, thereby allowing these features to be modified at any time. Moreover, only those resources actually needed for the programmable interface core need be implemented, thereby allowing the user to optimize use of the remainder of the PLD. Finally, the functions of the processor local bus can be efficiently limited, thereby allowing the PLD to approach the performance level of an ASIC.

18 Claims, 28 Drawing Sheets

U.S. PATENT DOCUMENTS

| | | |
|---|---|---|
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |
| 5,537,601 A | 7/1996 | Kimura et al. |
| 5,543,640 A | 8/1996 | Sutherland et al. |
| 5,550,782 A | 8/1996 | Cliff et al. |
| 5,552,722 A | 9/1996 | Kean |
| 5,572,717 A | 11/1996 | Pedersen |
| 5,574,930 A | 11/1996 | Halverson, Jr. et al. |
| 5,574,942 A | 11/1996 | Colwell et al. |
| 5,581,745 A | 12/1996 | Muraoka et al. |
| 5,600,845 A | 2/1997 | Gilson |
| 5,652,904 A | 7/1997 | Trimberger |
| 5,671,355 A | 9/1997 | Collins |
| 5,705,938 A | 1/1998 | Kean |
| 5,732,250 A | 3/1998 | Bates et al. |
| 5,737,631 A | 4/1998 | Trimberger |
| 5,740,404 A | 4/1998 | Baji |
| 5,742,179 A | 4/1998 | Sasaki |
| 5,742,180 A | 4/1998 | DeHon et al. |
| 5,748,979 A | 5/1998 | Trimberger |
| 5,752,035 A | 5/1998 | Trimberger |
| 5,760,607 A | 6/1998 | Leeds et al. |
| 5,809,517 A | 9/1998 | Shimura |
| 5,835,405 A | 11/1998 | Tsui et al. |
| 5,874,834 A | 2/1999 | New |
| 5,889,788 A | 3/1999 | Pressly et al. |
| 5,892,961 A | 4/1999 | Trimberger |
| 5,914,902 A | 6/1999 | Lawrence et al. |
| 5,933,023 A | 8/1999 | Young |
| 5,970,254 A | 10/1999 | Cooke et al. |
| 6,011,407 A | 1/2000 | New |
| 6,020,755 A | 2/2000 | Andrews et al. |
| 6,026,481 A | 2/2000 | New et al. |
| 6,034,542 A | 3/2000 | Ridgeway |
| 6,060,903 A | 5/2000 | Rangasayee et al. |
| 6,096,091 A | 8/2000 | Hartmann |
| 6,147,890 A * | 11/2000 | Kawana et al. ................ 365/49 |
| 6,154,051 A | 11/2000 | Nguyen et al. |
| 6,163,166 A | 12/2000 | Bielby et al. |
| 6,172,990 B1 | 1/2001 | Deb et al. |
| 6,178,541 B1 | 1/2001 | Joly et al. |
| 6,181,163 B1 | 1/2001 | Agrawal et al. |
| 6,211,697 B1 | 4/2001 | Lien et al. |
| 6,242,945 B1 | 6/2001 | New |
| 6,272,451 B1 | 8/2001 | Mason et al. |
| 6,279,045 B1 | 8/2001 | Muthujumaraswathy et al. |
| 6,282,627 B1 | 8/2001 | Wong et al. |
| 6,301,696 B1 | 10/2001 | Lien et al. |
| 6,343,207 B1 | 1/2002 | Hessel et al. |
| 6,353,331 B1 | 3/2002 | Shimanek |
| 6,356,987 B1 | 3/2002 | Aulas |
| 6,389,558 B1 | 5/2002 | Herrmann et al. |
| 6,434,735 B1 | 8/2002 | Watkins |
| 6,460,172 B1 | 10/2002 | Farre et al. |
| 6,467,009 B1 | 10/2002 | Winegarden et al. |
| 6,483,342 B2 | 11/2002 | Britton et al. |
| 6,507,942 B1 | 1/2003 | Calderone et al. |
| 6,510,548 B1 | 1/2003 | Squires |
| 6,518,787 B1 | 2/2003 | Allegrucci et al. |
| 6,519,753 B1 | 2/2003 | Ang |
| 6,522,167 B1 | 2/2003 | Ansari et al. |
| 6,532,572 B1 | 3/2003 | Tetelbaum |
| 6,539,508 B1 | 3/2003 | Patrie et al. |
| 6,541,991 B1 | 4/2003 | Hornchek et al. |
| 6,587,995 B1 | 7/2003 | Duboc et al. |
| 6,588,006 B1 | 7/2003 | Watkins |
| 6,601,227 B1 | 7/2003 | Trimberger |
| 6,604,228 B1 | 8/2003 | Patel et al. |
| 6,611,951 B1 | 8/2003 | Tetelbaum et al. |
| 6,662,285 B1 | 12/2003 | Douglass et al. |
| 6,675,272 B2 | 1/2004 | Ware et al. |
| 6,686,769 B1 | 2/2004 | Nguyen et al. |
| 6,693,456 B2 | 2/2004 | Wong |
| 6,704,816 B1 | 3/2004 | Burke |
| 6,772,230 B2 | 8/2004 | Chen et al. |
| 6,781,407 B2 | 8/2004 | Schultz |
| 6,798,239 B2 | 9/2004 | Douglass et al. |
| 6,886,092 B1 | 4/2005 | Douglass et al. |
| 7,076,595 B1 * | 7/2006 | Dao et al. ................ 710/317 |
| 7,266,632 B2 * | 9/2007 | Dao et al. ................ 710/317 |
| 2001/0049813 A1 | 12/2001 | Chan et al. |
| 2002/0008540 A1 | 1/2002 | Britton et al. |
| 2002/0020905 A1 | 2/2002 | McCormack et al. |
| 2002/0177990 A1 | 11/2002 | Sample |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Sayfe Kiaei et al.; "VLSI Design of Dynamically Reconfigurable Array Processor-Drap," IEEE; Feb. 1989; V3.6, IEEE; 3 Park Avenue, 17th Floor, New York, NY 10016-5997; pp. 2484-2488.

Vason P. Srini; "Field Programmable Gate Array (FPGA) Implementation of Digital Systems: An Alternative to Asic"; IEEE; May 1991; IEEE; 3 Park Avenue, 17th Floor, New York, NY 10016-5997; pp. 309-314.

G. Maki et al.; "A Reconfigurable Data Path Processor"; IEEE; Aug. 1991; IEEE; 3 Park Avenue, 17th Floor, New York, NY 10016-5997; pp. 18-4.1 to 18-4.4.

Jacob Davidson; "FPGA Implementation of Reconfigurable Microprocessor"; IEEE; Mar. 1993; IEEE, 3 Park Avenue, 17th Floor, New York, NY 10016-5997; pp. 3.2.1-3.2.4.

Christian Iseli et al.; "Beyond Superscaler Using FPGA's"; IEEE; Apr. 1993; 3 Park Avenue, 17th Floor, New York, NY 10016-5997; pp. 486-490.

P.C. French et al.;"A Self-Reconfiguring Processor"; IEEE; Jul. 1993; 3 Park Avenue, 17th Floor, New York, NY 10016-5997; pp. 50-59.

Christian Iseli et al., "Spyder; A Reconfigurable VLIW Processor Using FPGA's"; IEEE; Jul. 1993; 3 Park Avenue, 17th Floor, New York, NY 10016-5997; pp. 17-24.

Michael J. Wirthlin et al.; "The Nano Processor: A Low Resource Reconfigurable Processor"; IEEE; Feb. 1994; 3 Park Avenue, 17th Floor, New York, NY 10016-5997; pp. 23-30.

William S. Carter, "The Future of Programmable Logic and Its Impact on Digital System Design"; Apr. 1994; IEEE; 3 Park Avenue, 17th Floor, New York, NY 10016-5997; pp. 10-16.

Andre' DeHon; "DPGA-Coupled Microprocessors: Commodity ICs for the Early 21st Century"; IEEE; Feb. 1994; IEEE; 3 Park Avenue, 17th Floor, New York, NY 10016-5997; pp. 31-39.

Osama T. Albahama; "Area & Time Limitations of FPGA-Based Virtual Hardware"; IEEE; Apr. 1994; 3 Park Avenue, 17th Floor, New York, NY 10016-5997; pp. 184-189.

Xilinx, Inc.; "The Programmable Logic Data Book"; 1994; Revised 1995; available from Xilinx, Inc., 2100 Logic Drive, San Jose, California 95124.

International Business Machines; "Processor Local Bus"; Architecture Specifications; 32-Bit Implementation; Apr. 2000; First Edition; V2.9; IBM Corporation, Department H83A, P.O. Box 12195, Research Triangle Park, NC 27709; pp. 1-76.

Xilinx, Inc.; Virtex II Platform FPGA Handbook, Dec. 6, 2000, v1.1; available from Xilinx, Inc., 2100 Logic Drive, San Jose, California 95124; pp. 33-75.

Xilinx, Inc.; "The Programmable Logic Data Book"; Copyright 2000, Chapter 3; available from Xilinx, Inc., 2100 Logic Drive, San Jose, CA. 95124; pp. 3-1 to 3-117.

Christian Iseli et al.; "AC++ Compiler for FPGA Custom Execution Units Synthesis"; 1995; IEEE; 3 Park Avenue, 17th Floor, New York, NY 10016-5997; pp. 173-179.

International Business Machines; "PowerPC 405 Embedded Processor Core User Manual," 1996; 5th Ed., International Business Machines; 1580 Rout 52, Bldg. 504, Hopewell Junction, NY 12533-6531; pp. 1-1 to X-16.

Yamin Li et al.; "AIZUP-A Pipelined Processor Design and Implementation on Xilinx FPGA Chip"; IEEE; Sep. 1996; IEEE; 3 Park Avenue, 17th Floor, New York, NY 10016-5997; pp. 98-106, 98-106.

Ralph D. Wittig et al.; Onechip: An FPGA Processor with Reconfigurable Logic; Apr. 17, 1996; IEEE; 3 Park Avenue, 17th Floor, New York, NY 10016-5997; pp. 126-135.

Xilinx, Inc.; "The Programmable Logic Data Book"; Jan. 27, 1999; Ch. 3, available from Xilinx, Inc., 2100 Logic Drive, San Jose, CA 95124; pp. 3-1 to 3-50.

William B. Andrew et al.; "A Field Programmable System Chip Which Combines FPGA and ASIC Circuitry"; IEEE; May 16, 1999; IEEE; 3 Park Avenue, 17th Floor, New York, NY 10016-5997; pp. 183-186.

Cary D. Snyder et al.; "Xilinx's A-to-Z System Platform"; Cahners Microprocessor; The Insider's Guide to Microprocessor Hardware; Microdesign Resources; Feb. 6, 2001; pp. 1-5.

"Processors at a Price"; Electronic Times; Jul. 24, 2000; Copyright Miller Freeman UK Ltd.; available from www.looksmart.com; pp. 1-3.

Jonathan Babb et al.; "Logic Emulation with Virtual Wires"; Jun. 1997; IEEE Transactions on Computer-Aided Design of Integrated Circuits and Systems; vol. 16; Issue 6; pp. 609-626.

Ing-Jer Huang et al.; "Reusable Embedded In-Circut Emlator"; Copyright 2001 IEEE; ACM Press; pp. 33-34.

Yao-Wen Chang et al.; "Universal Switch Modules for FPGA Design"; ACM Transactions on Design Automation of Electronic Systems, vol. 1; No. 1; Jan. 1996; pp. 80-101.

"VIPSwitch Partners with Xilinx to Move Beyond ASICs for Optical Switch/Routing: REmotely Programmable Chips are a Perfect Fit for New Line of Optical Terabit Routers" Business Wire; Mar. 28, 2001; available at www.looksmart.com; pp. 1-2.

Michael Barr; "How Programmable Logic Works"; Copyright 1999 by Miller Freeman; available from www.netrino.com; pp. 1-10.

Per Holmberg; "Searching the Ideal Core for FPGAs"; Mar. 22, 1999; available from Xilinx, Inc.; pp. 1-5.

"Xilinx Tool Bridges Gap Between PLDs and DSPs"; Apr. 10, 2000; Electronic Buyers News; downloaded from http://www.truequery.com/truequery/search/articleDetail.jsp?doc=136200 &queryString=core . . . on Apr. 28, 2005; pp. 1-3.

"Xilinx Licenses IBM IP to Design 'Flexible' FPGAs"; Jul. 31, 2000; Electronic Buyers News; downloaded from http/www.truequery.com/truequery/search/articlDetail.jsp?doc=137457 &queryString=core . . . on Apr. 28, 2005; pp. 1-3.

* cited by examiner

PROGRAMMABLE LOGIC DEVICE INCLUDING PROGRAMMABLE INTERFACE CORE AND CENTRAL PROCESSING UNIT

FIELD OF THE INVENTION

The present invention relates to a programmable logic device and, particularly, to a programmable logic device including an interface core and a central processing unit.

DESCRIPTION OF THE RELATED ART

A microprocessor is a well-known integrated circuit that controls a computer. The manner in which the microprocessor controls the computer determines the speed and power of the computer. To control the computer, the microprocessor processes a myriad of instructions, each of which tells the microprocessor to perform a specific operation. A typical microprocessor includes a central processing unit (CPU) that performs the desired arithmetic and logic functions as well as an input/output unit that allows the CPU to receive inputs to perform these functions from and/or communicate its results with the rest of the components of the computer.

FIG. 1 illustrates a known microprocessor 100 including a CPU 101 and two expansion buses 102 and 103. Expansion buses allow CPU 101 to communicate with other devices, thereby expanding the microprocessor's operations. Expansion bus 102, also called a processor local bus (PLB), connects CPU 101 to high-speed devices 104. These high-speed devices 104 could include memory and high performance peripherals. A device that takes control of PLB 102 to handle its own transfer is called a "master", whereas a device that receives commands from the master to send data is called a "slave".

Expansion bus 103, also called an on-chip peripheral bus (OPB), provides CPU 101 access to low speed devices 105. These low speed devices 105 could include UARTs and Ethernet connections. Note that low speed devices 105, like high speed devices 104, can include both masters and slaves. However, to prevent these low speed devices 105 from affecting the performance of CPU 101, OPB 103 is not connected directly to CPU 101. Instead, OPB 103 is coupled to PLB 102 via an OPB bridge 106. It should be noted that most systems consider the segmentation of busses to be done in order to allow lower speed devices to not consume valuable bandwidth on the main bus. However, it is often advantageous to treat the segmentation as a bus in parallel to the main bus that allows for advantageous operation of higher speed peripherals with little effect on the main bus. OPB bridge 106 is a system building block designed to transport data from one bus to another. OPB bridge 106 can automatically convert data formats and protocols, thereby facilitating the transfer of information between OPB 103 and PLB 102.

Application specific integrated circuits (ASICs) are also well known in the art of integrated circuits. An ASIC is a chip designed for a predetermined application. To build an ASIC, a plurality of basic circuit cells are interconnected. Typically, these circuit cells are found in a library provided by the ASIC manufacturer. Currently, some manufacturers are providing microprocessor cells for integration onto the ASIC. These types of microprocessors are called "embedded" microprocessors.

Programmable logic devices (PLDs) are also well known in the art of integrated circuits. A PLD can be user-programmed in the field to implement logic designs. One type of PLD is the field programmable gate array (FPGA). In a typical architecture, an FPGA includes an array of configurable logic blocks (CLBs) surrounded by programmable input/output blocks (IOBs). The IOBs provide the interface between the package pins and the CLBs, whereas the CLBs provide the functional elements for constructing logic on the FPGA. The CLBs and IOBs are interconnected by a hierarchy of programmable routing resources. These CLBs, IOBs, and programmable routing resources are customized by loading a configuration bitstream into the FPGA. This configuration bitstream is generated using software tools.

FIG. 2 illustrates a simplified block diagram of a CLB 200 in the Virtex™ FPGA sold by Xilinx, Inc. CLB 200 includes two "slices" 201A and 201B. Each slice 201 includes a first LUT 202 for receiving a first plurality of input signals G1-G4 from the programmable interconnect and a second LUT 203 for receiving a second plurality of input signals F1-F4, also from the programmable interconnect. Each slice 201 further includes a flip-flop 204 for receiving (on its D terminal) an output signal Y from LUT 202 and outputting (on its Q terminal) a signal YQ. In a similar manner, each slice 201 further includes a flip-flop 205 for receiving (on its D terminal) an output signal X from LUT 203 and outputting (on its Q terminal) a signal XQ. Additional details of the Virtex™ FPGA is disclosed on pages 3-7 to 3-17 and pages 3-76 to 3-87 of "The Programmable Logic Data Book 2000", published by Xilinx, Inc.

Some FPGAs, like the Virtex™ FGPA, can be programmed to incorporate blocks with a pre-designed functionality called a "core". In one embodiment, a core can include a predetermined set of configuration bits that program the FPGA to perform one or more functions. In another embodiment, a core can include source code or schematics, which describe the logic and connectivity of a design. Typical cores can provide, but are not limited to, digital signal processing (DSP) functions, memories, storage elements, and math functions. Cores can be provided with an optimally floorplanned layout for specific FPGAs. Cores can also be parameterizable, i.e. allowing the user to enter parameters to activate or change certain core functionality.

FIG. 3 illustrates one IP process layout 300 for using one or more cores in an FPGA. Note that IP, as used herein, refers to general intellectual property, such as logic designs for an FPGA. Both logic designs provided by the user as well as cores, developed by the assignee of the present invention or others, are considered IP. In layout 300, a core generator 304, activated by system level tools 301, can receive one or more plug-in cores 302 provided by third parties. Alternatively, core generator 304 can use a core provided within a set of libraries 303, wherein these libraries 303 form part of core generator 304. Once the core is selected, it can be provided to an FPGA software tool 306. Exemplary FPGA software could include the Alliance™, Foundation™, or Foundation ISE™ software, all licensed by the assignee of the present invention. This software also can receive a top-level design 305 provided by a user. This top-level design designates the logic design that, in addition to the core(s), will be implemented on the FPGA. In one embodiment, FPGA software tool 306 can receive top-level designs 305 in VHDL, Verilog, or in standard schematic form. FPGA software tool 306 generates the configuration bitstream that will program an FPGA 307 to provide the functions designated by the core(s) and top-level design.

As technology improvements are realized, FPGAs are increasingly moving into previously ASIC-only applications. However, physical resources are more constrained on an FPGA than on an ASIC. Therefore, providing microprocessor components on an FPGA becomes a non-trivial task requiring special considerations.

SUMMARY OF THE INVENTION

In accordance with the present invention, a programmable logic device (PLD) includes a central processing unit (CPU) and a programmable interface coupled to the CPU, wherein the programmable interface is created by a core designated by a user. Typically, the PLD further includes a plurality of devices, each device for either providing information to the CPU via the programmable interface, receiving information from the CPU via the programmable interface, or communicating with another device via the programmable interface.

In one embodiment, the programmable interface includes a crosspoint switch for coupling the plurality of devices. The crosspoint switch includes both address/control paths and data paths. The address/control paths can be formed from a first set of programmable resources on the PLD and the data paths can be formed from a second set of programmable resources on the PLD. The first and second sets of programmable resources can be distinct or can overlap on the PLD.

In one embodiment, the PLD further includes an on-chip peripheral bus (OPB) coupled to the programmable interface. A bridge module couples the OPB to the programmable interface. A first group of devices on the PLD, including both masters and slaves, can be coupled to the OPB. Thus, this first group of masters and slaves can communicate with the programmable interface using the bridge module. The first group of masters and slaves can include peripheral devices that are typically characterized as low speed devices. In one embodiment, at least one of these masters and slaves is created on the PLD using a core. In another embodiment, at least one of these masters and slaves is located off-chip. In yet another embodiment, a core can be used to create a device (one of the first group) having both master and slave functionality. The first group of devices can be on the PLD or off-chip.

A second group of devices on the PLD, also including masters and slaves, can be coupled to the programmable interface. The second group of devices can include high-speed devices, such as memory devices or double data rate devices. The second group of devices can be on the PLD or off-chip. In one embodiment, one of the masters in the second group of devices includes a high speed bus interface coupled to the programmable interface and the OPB, wherein the high speed bus interface provides communication to an off-chip device. The PLD of the present invention can be easily incorporated into a system including other components, wherein the programmable interface and the high-speed bus interface advantageously provide those components efficient access to the CPU-related functions.

In one embodiment of the present invention, the programmable interface includes a crosspoint switch. In the address/control logic, the crosspoint switch can include a plurality of address decoders for receiving addresses from the masters and a plurality of access arbiters for receiving decoded addresses from the address decoders and for arbitrating transactions between the masters and the slaves. The crosspoint switch can provide full or less than full connectivity between the address decoders and the access arbiters.

In the data logic, the crosspoint switch can include a plurality of write multiplexers for receiving write data from the masters, each write multiplexer selectively providing the write data to one slave, and a plurality of read multiplexers for receiving read data from the slaves, each read multiplexer selectively providing the read data to one master. The write and read multiplexers can be controlled by the plurality of access arbiters. The crosspoint switch can provide full or less than full connectivity between each write multiplexer and the plurality of master devices. The crosspoint switch can also provide full or less than full connectivity between each read multiplexer and the plurality of slave devices. In one embodiment, the address/control and/or data logic further include registers for pipelining transactions between the masters and slaves.

In accordance with another embodiment of the present invention, a field programmable gate array (FPGA) having an embedded central processing unit (CPU) includes a hybrid switch generated by a core, wherein the hybrid switch provides communication between the CPU and the user logic implemented on the FPGA. In this embodiment, the CPU includes a master device and the logic includes a plurality of slave devices and a plurality of master devices. This hybrid switch includes both crosspoint and shared bus configurations to provide paths between the master devices and the slave devices.

Specifically, the hybrid switch can includes a plurality of address decoders for receiving addresses from the masters as well as a plurality of access arbiters for receiving decoded addresses from the address decoders and for arbitrating transactions between the masters and the slaves. At least one access arbiter provides the arbitration for more than one slave, and at least one access arbiter provides arbitration for only one slave. The crosspoint switch can also include a plurality of write multiplexers for receiving write data from the masters and providing write data to the slave. In one embodiment, at least one write multiplexer provides its write data to more than one slave, and at least one write multiplexer provides its write data to only one slave. The crosspoint switch can also include a plurality of read multiplexers for receiving read data from the slaves and selectively providing the read data to the masters. In one embodiment, at least one read multiplexer provides its read data to more than one master, and at least one read multiplexer provides its read data to only one master. The write and read multiplexers can be controlled by the plurality of access arbiters. The hybrid switch, like the crosspoint switch of the present invention, can include pipelining for transactions between the masters and slaves.

In accordance with one embodiment of the present invention, a field programmable gate array (FPGA) includes a plurality of master devices, wherein an embedded microprocessor is at least one such master device, a plurality of slave devices, and means for selectively providing connectivity between the plurality of master devices and the plurality of slave devices. The means for selectively providing connectivity can be generated by a core.

In the address/control logic, the means for selectively providing full connectivity can include means for decoding addresses from the master devices and means for arbitrating transactions between the plurality of master devices and the plurality of slave devices based on the decoded addresses. In one embodiment, the means for selectively providing connectivity provides full connectivity between the means for decoding and the means for arbitrating, whereas in other embodiments the means for selectively providing connectivity provides less than full connectivity between the means for decoding and the means for arbitrating.

In the data logic, the means for selectively providing connectivity can include means for receiving write data from the plurality of master devices and selectively providing the write data to designated slave devices and means for receiving read data from the plurality of slave devices and selectively providing the read data to designated master devices. In one embodiment, the means for receiving write data and the means for receiving read data are controlled by the means for arbitrating.

The means for selectively providing connectivity can provide full or less than full connectivity between the means for receiving write data and the plurality of master devices. Additionally, the means for selectively providing connectivity can provide full or less than full connectivity between the means for receiving read data and the plurality of slave devices.

Advantageously, the present invention can be included in known PLD software tools. In one embodiment, a core generator, activated by system level tools, can receive a programmable interface core of the present invention provided by a third party. Alternatively, the core generator can use a programmable interface core provided within a set of libraries that form part of the core generator. Once the programmable interface core is selected, it can be provided to a PLD software tool. This software also can receive a top-level design provided by a user. This PLD software tool generates the configuration bitstream that will program a PLD to provide the functions designated by the programmable interface core and top-level design.

Of importance, the programmable interface core of the present invention can have a plurality of compliance levels. For example, a core could allow only certain functionality to be provided on the PLD. For example, in one embodiment, a subset of the processor local bus (PLB) functions are allowed. In other embodiments, such as those embodiments including existent IP or non-parameterized IP, the present invention could tailor the subset to the functionality required by that IP (or to a predetermined level of compliance based on that IP).

In accordance with the present invention, a method of providing an interface between a central processing unit (CPU) on a programmable logic device (PLD) and user-implemented logic on the PLD is given. The method comprises selectively providing connectivity between a plurality of master devices provided by the logic and a plurality of slave devices provided by the logic, wherein the CPU includes at least one master device. The step of selectively providing connectivity during the address/control logic includes decoding addresses from the master devices using address decoders and arbitrating transactions between the plurality of master devices and the plurality of slave devices using access arbiters and the decoded addresses. In one embodiment, the step of selectively providing connectivity provides full connectivity between the address decoders and the access arbiters. In another embodiment, the step of selectively providing connectivity provides less than full connectivity between the address decoders and the access arbiters.

In the method of the present invention, the step of selectively providing connectivity in the data logic includes receiving write data from the plurality of master devices and selectively providing the write data to designated slave devices using a first set of multiplexers as well as receiving read data from the plurality of slave devices and selectively providing the read data to designated master devices using a second set of multiplexers. The step of selectively providing connectivity can provide full or less than full connectivity between the first set of multiplexers and the plurality of master devices. The step of selectively providing connectivity can also provide full or less than full connectivity between the second set of multiplexers and the plurality of slave devices.

In the method of the present invention, the step of selectively providing connectivity includes pipelining transactions between the plurality of master devices and the plurality of slave devices. Advantageously, this pipelining can be provided in the address/control logic as well as the data logic, thereby improving performance in both.

In accordance with the present invention, a method of providing an interface between a central processing unit (CPU) on a programmable logic device (PLD) and user-implemented logic on the PLD is given. The method comprises selecting a core from a library, wherein the core selectively provides connectivity between a plurality of master devices provided by the logic and a plurality of slave devices provided by the logic, wherein the CPU includes at least one master device. The method further includes setting at least one parameter in the core, thereby affecting the connectivity.

In another embodiment, information content from each of the cores required to build the system is gathered into a centralized facility for analysis of the data. This data is available to the user in order that the user can make alternative choices in instantiating cores or the parameterization. For example, particular choices in parameterization of the core may result in different performances of the overall system.

The present invention provides a number of significant advantages over standard embedded CPUs in the ASIC environment. First, the present invention provides significant flexibility in providing features that can be parameterized based on the user's needs and/or associated design. These parameterized features can be implemented in programmable resources on the PLD, thereby allowing these features to be modified at any time. Second, because of these programmable resources, only those resources actually needed for the programmable interface can be implemented, thereby allowing the user to optimize use of the remainder of the PLD. For example, both the address/control logic and the data logic can "trimmed". In other words, paths (and their associated logic) not required by the user's design can be eliminated, thereby increasing signal speed and decreasing silicon area. In another example, the number of master or slave devices can be increased because extra area is available. Third, the present invention can efficiently limit the functions of the processor local bus, thereby allowing the PLD to approach or even exceed the performance level of an ASIC.

DETAILED DESCRIPTION OF THE FIGURES

Figure 1:
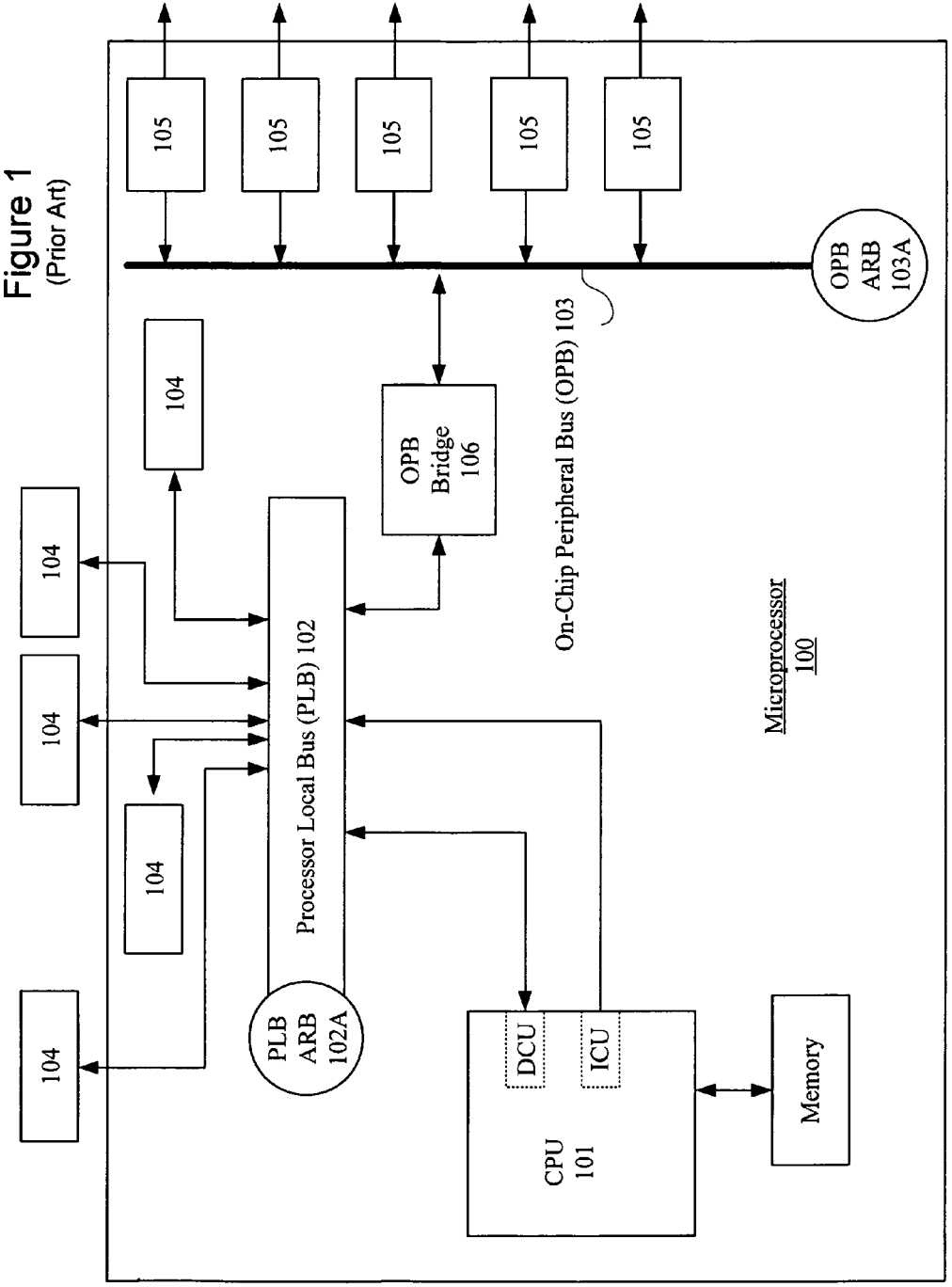
FIG. 1 illustrates a simplified diagram of a microprocessor including a central processing unit, a processor local bus, and an on-chip peripheral bus.
Figure 2:
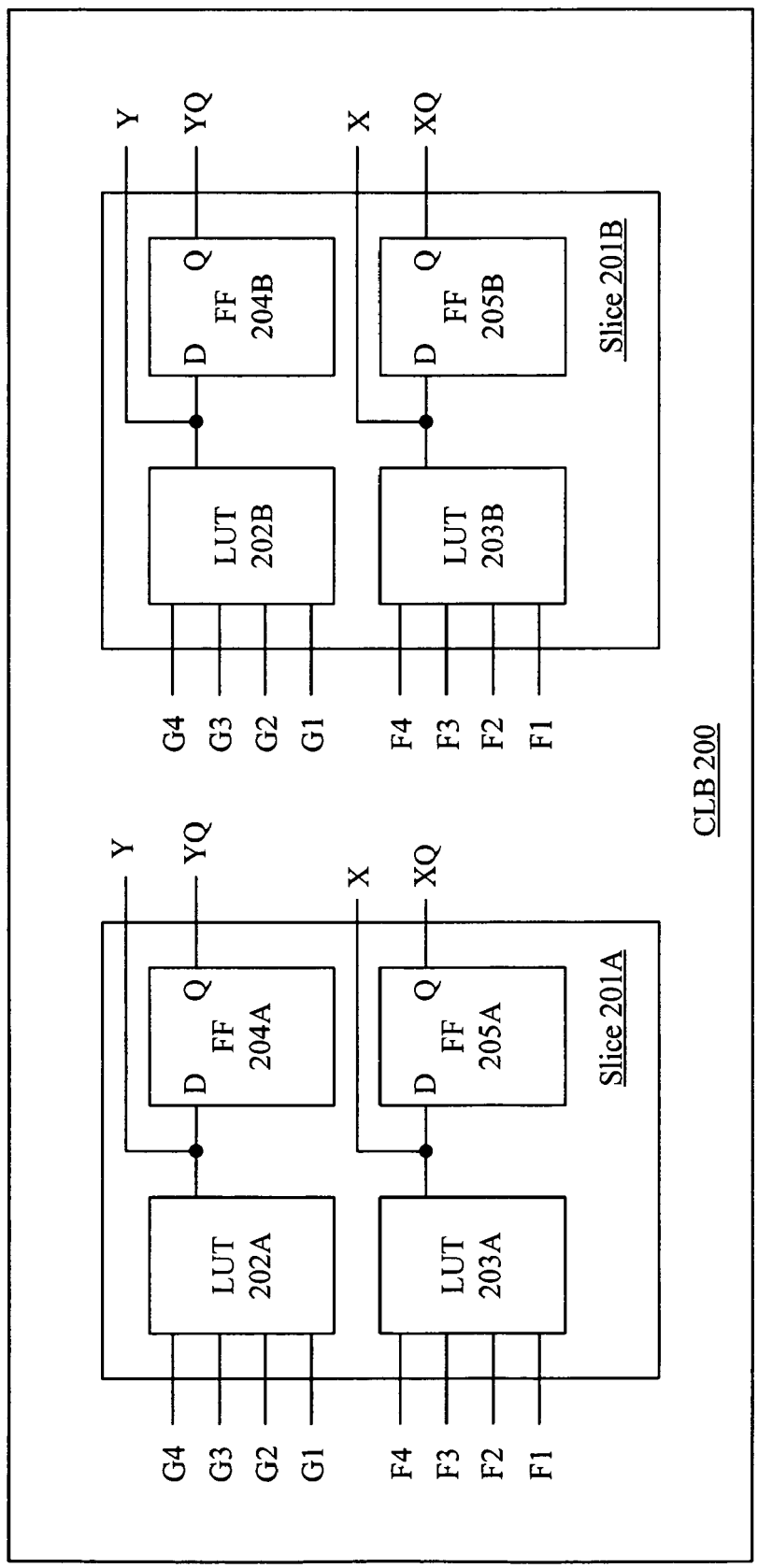
FIG. 2 illustrates a simplified block diagram of a configurable logic block in the Virtex FPGA, sold by the assignee of the present invention.

The following Table of Contents is provided to give the reader an overview of the subject matter organization.

| Table of Contents |
|---|
| I. Terminology and Conventions |
|    A. Definitions |
|    B. Signal Naming and Numbering Conventions |
|    C. Timing Convention |
| II. Recognition of Resource Distinctions |
| III. Limiting Bus Functions |
|    A. PLB Subset Functions |
|       1. Arbitration Control Functions |
|       2. Data Transfer Functions |
|    B. PLB Superset Functions |
|    C. Signals: PLB to PIC Mapping |
| IV. FPGA Implementation: General |
|    A. Central Processing Unit |
|    B. Programmable Interface Core (PIC) |
|    C. Master & Slave Devices |
|    D. On-Chip Peripheral Bus (OPB) |
|    E. High Speed Bus Interface |
| V. FPGA Implementation: Detailed |
|    A. Master/Slave Devices: Ports & Timing |
|       1. Communication Between Master Device and PIC |
|          a. Address Ports for Masters |
|          b. Write Ports for Masters |
|          c. Read Ports for Masters |

| Table of Contents -continued |
|---|
|       2. Timing of Master Device |
|       3. Communication Between Slave Device and PIC |
|          a. Address Ports for Slaves |
|          b. Write Ports for Slaves |
|          c. Read Ports for Slaves |
|       4. Timing of Slave Device |
|    B. Programmable Interface Core |
|    C. DCU/ICU: Interface to PLB |
|    D. BRAM: Interface to PLB |
|    E. OPB Bridge Modules |
|       1. Bridge-Out Module |
|       2. Bridge-In Module |
|    F. Hybrid Programmable Interface Core |
|    G. Software Tools |

I. Terminology and Conventions

The present invention is described using certain terminology and conventions, which may or may not be familiar to those skilled in the art. Therefore, the following definitions, signal and numbering conventions, and timing conventions are described in further detail to assist the reader in understanding the present invention.

A. Definitions

The acronyms, abbreviations, and terms of art used in this description are defined alphabetically following this paragraph. Note that some acronyms, abbreviation, and terms of art may be defined in the Detailed Description.

BEAR: bus error address register

BESR: bus error syndrome register

BRAM: block random access memory (RAM) provided on a programmable logic device

Burst: a transaction in which more than one unit of data is transferred, typically used to quickly move a block of data between a master and a slave Cache: a small, fast memory internal to the CPU for storing recently accessed data content, including instructions and/or data Core: a pre-designed portion of a programmable logic device for providing a specific function, the portion typically implemented using a predetermined amount of physical resources on the programmable logic device CPU: central processing unit, typically including a control unit and an arithmetic and logic unit (ALU)

DCU: data cache unit

DDR: double data rate

HSBI: high speed bus interface, referenced herein generically as a device having a high speed master port on the PIC ICU: instruction cache unit IP: design for incorporation into an integrated circuit, in particular an FPGA Little-endian: architecture in which, assuming a 16- or 32-bit word, bytes at lower addresses have lower significance ISA: instruction set architecture OPB: on-chip peripheral bus PIC: programmable interface core, provided between a CPU and programmable logic device resources in accordance with the present invention Pipelining: process in which a master device can begin to execute a second bus cycle before the first bus cycle has been completed, i.e. processing several bus cycles simultaneously, each at a different stage PLB: processor local bus PowerPC: a RISC microprocessor that meets a standard jointly designed by IBM, Motorola, and Apple Computer, standard specifies a common instruction set architecture (ISA)

Register: high-speed storage area provided on the FPGA

SDRAM: synchronous dynamic random access memory (DRAM) that can run at higher clock speeds than conventional memory and can synchronize itself with the bus of some CPUs Single Data Beat: a non-burst transfer, i.e. a single datum in a single clock cycle across the bus Word: indicates a 32-bit quantity of data

B. Signal Naming and Numbering Conventions

To describe features of the present invention, various signals will be referenced. In accordance with the convention used herein, signal names in FIGS. 6 and 8 begin with a prefix that denotes the direction of signal flow as well as what device is transmitting and what device is receiving the signal. Signal names in other figures may begin with a prefix indicating only the device transmitting. Device names are abbreviated for ease of reference. The prefix is followed by an underscore (_) and then the name of the signal itself. The suffix "_n" denotes an active low signal. For example, the signal name PIC2M_foo describes the signal "foo" which is driven by the programmable interface core (PIC) and received by a master device.

N-bit bus bits are numbered from 0 on the right to N−1 on the left. Note that this numbering convention, irrespective of compatibility issues with various proprietary CPUs, does not change the PIC ISA or affect CPU software compatibility.

C. Timing Conventions

To achieve high performance, timing should be considered. As known by those skilled in the art, timing is often specific to a particular implementation of a design. Therefore, the inclusion of exemplary timing references herein supports the pipelining of the present invention, but is not meant to cover timing for all designs.

For timing information, the terms "early", "middle", and "late" can be used. In the convention used herein, early timing is the best and late timing is the worst.

If an input signal has early timing, then the user has a full clock cycle to process the data before latching it. Early input signal timing implies that the signal is driven from a register output. If an output signal has early timing, then the user can use the full clock cycle before sending the data out. Early output signal timing implies that the signal will drive the input of a register.

If an input signal has middle timing, then the user has approximately half a clock cycle to process the data before latching it. Middle input signal timing implies that the signal is driven from a register output through a small amount of logic or routing to the user. If an output signal has middle timing, then the user can use approximately half the clock cycle before sending the data out. Middle output signal timing implies that the signal will drive a small amount of logic or routing before going to the input of a register.

If an input signal has late timing, then the user has a small fraction of the clock cycle to process the data before latching it. Late input signal timing implies the signal is driven from a register output through a significant amount of logic and routing. Thus, the user has a small window in which to latch the data before using it. If an output signal has late timing, then the user can use a small fraction of the clock cycle before sending the data out. Late output signal timing implies that the signal will drive the input of a register through a significant amount of logic or routing. Thus, the user should drive this output directly from a register.

Given the above issues, the specific implementation can account for the means that each signal provides. Some signals require more time (e.g. late signals) and this can have an adverse impact on the frequency on the operation of the system. To address these issues, pipelining may be implemented to mitigate the timing of signals. These pipeline registers afford the opportunity to resynchronize the signal to earlier in the clock period, albeit with a latency.

II. Recognition of Resource Distinctions

To incorporate a central processing unit (CPU) in a programmable logic device (e.g. an FPGA) instead of in an ASIC, one must understand and address the distinctions between these two types of devices.

One key difference between an FPGA and an ASIC that can affect performance is logic resources. Specifically, as described above, the logic generators in an FPGA are typically built using lookup tables in the CLBs. Therefore, high fan-in or complex combinatorial logic functions generally require several levels of lookup tables, thereby creating substantial delays. In contrast, an ASIC can provide custom structures designed for performing specific logic functions, thereby eliminating the multiple levels of logic.

Another key difference between an FPGA and an ASIC that can affect performance is routing resources. Specifically, an FPGA routes signals over both programmable and dedicated (for example, carry chain logic) routing channels. In contrast, an ASIC provides customized signal paths, thereby eliminating the overhead of programmability. Thus, to approach speeds commensurate with an ASIC, an FPGA would need to include thicker traces and bigger buffers than those typically provided on the FPGA. Up-sizing of these routing resources could require increasing the silicon area of the FPGA, thereby undesirably increasing its manufacturing cost.

In light of the above-described distinctions, FPGA resources interfacing to a CPU could pose significant obstacles in achieving both performance and bandwidth in high speed design. However, in accordance with the present invention and described in detail below, the FPGA fabric can be advantageously leveraged to provide both standard and enhanced transactions involving the CPU. The resultant system can approach and even exceed current ASIC systems because the system uses architecture rather than IC technology to address the problem.

III. Limiting PLB Functions

A typical CPU operates with a set of PLB protocols to communicate with other devices. To provide a full set of PLB protocols on an FPGA would require substantial logic, thereby adversely affecting both performance and area. Therefore, in accordance with one feature of the present invention, some of the standard PLB protocols can be advantageously eliminated without significantly affecting FPGA performance.

In general overview, the present invention eliminates the PLB protocols that require complex data path manipulation. Complex data path manipulation uses a significant amount of logic spread over wide busses and large distances. Thus, complex data path manipulation in an FPGA can monopolize considerable resources while adding only limited functionality for the IP user.

The present invention also eliminates the PLB protocols that require asynchronous handshaking. In asynchronous handshaking, a signal typically travels long distances (i.e. paths from the master to the slave and back to the master) and passes through significant logic, all in a single clock cycle. Thus, asynchronous handshaking, like complex data path manipulation, must monopolize considerable resources to accomplish this timing objective.

By not supporting various standard PLB protocols, several advantages can be realized. First, the present invention can significantly simplify critical paths in the data logic. Simplifying the data path logic is important because these wide busses travel long distances across the FPGA. In other words, reducing the logic in the data path advantageously increases signal speed. Second, the present invention can significantly simplify critical paths in the control logic, thereby further increasing signal speed. Third, removing these PLB protocols can make transactions more deterministic. For example, logic can typically be simplified if a master can expect a smaller set of possible responses from a slave for a given transaction. Clearly, the more types of responses or actions that a master or slave can have, the more complex the logic must be to accommodate those responses or actions.

Note that eliminating PLB protocols has a direct effect on the number of PLB functions that can be performed with the CPU. However, the present invention addresses this issue, as described in detail below.

A. PLB Subset Functions

In accordance with the present invention, a subset of PLB functions implemented in the FPGA focuses on the types of transactions that the CPU typically runs, thereby optimizing the performance of this critical component. Specifically, most data transfers on the PLB are device-to-memory or memory-to-device, and not device-to-device. Thus, memory performance is at a premium across the PLB. Of importance, most FPGA user memory interfaces perform similar transactions to those of the CPU. Therefore, a subset of PLB functions can advantageously support the various kinds of transactions that are most likely to occur on the FPGA. Analysis regarding the incorporation of various PLB functions in an FPGA is provided below.

1. Arbitration Control Functions

Address Decode Function: Implementing an address decode in slaves in a standard PLB is currently done with a shared bus. In a shared bus, the address requested by a master is provided to all slaves on the bus. The slaves decode the address and the selected slave then routes an address acknowledge back to the requesting master. Unfortunately, this process creates a significant delay. Therefore, in accordance with the present invention, address decoding is distributed and performed inside a programmable interface core (PIC)(described in FIGS. 5A-5E). Because of the transaction forwarding nature of this core, a slave is guaranteed an address hit when a transaction is presented to it. In this manner, the present invention significantly reduces the address decode logic currently provided in the slaves, thereby facilitating easier development and building of slaves. Note that in a hybrid system, an additional address decoder can be provided in a slave when multiple slaves share a bus. In this hybrid system, the number of slaves sharing a bus is relatively small, thereby simplifying the address decode logic.

Bus Error (Address or Data Error) Function: The bus error function is supported by both the standard PLB and the PIC core of the present invention.

Abort Function: Supporting an abort function is difficult in a transaction forwarding system because the transaction can be passed on to a slave before an abort signal has a chance to be asserted. Note that in a standard PLB, a transaction cannot be aborted after a slave has acknowledged the request. Moreover, additional logic would be necessary to pass an Abort into the PIC core, thereby negatively impacting timing of the system. Therefore, in the present invention, as a general rule, masters do not generate abort signals.

If a master generates an abort signal, the master can use an interface module, which immediately recognizes the request, acknowledges the request, and forwards the request directly to the pertinent slave. This interface module is located in the path between the master and the port to the PIC. Thus, the general rule of masters not generating abort signals is maintained.

Note that supporting abort signals in a pipelined system can result in some increase in performance if the user's code branches or interrupts. Specifically, if aborts are supported and masters are allowed time to assert aborts, then unnecessary transactions can be terminated early, thereby advantageously reducing utilization of the data logic. Code that branches or interrupts eliminates the need for the information currently requested by the master. If the master is allowed to abort transactions after it discovers that the data is not needed, then performance is improved. However, this benefit can be offset by the complexity and lower clock frequency for the rest of the system.

Prioritized Arbitration Function: Building combinatorial logic to arbitrate among masters based on dynamic priority would require many logic levels that could significantly slow down performance in an FPGA. Therefore, in one embodiment of the present invention, a round-robin or fixed priority arbitration is provided. In other embodiments, a user-selected arbitration can be provided.

Retry Function: A retry function (also sometimes called a rearbitrate function) is typically required in a shared bus architecture to prevent deadlock among a plurality of masters. However, in accordance with the PIC core of the present invention, multiple transactions can proceed in parallel, thereby significantly reducing or even reducing the need for retries. Note that implementing a retry function in a transaction forwarding system would require passing signals from the slave to the master, thereby undesirably increasing the complexity of logic in the arbiter.

Note that a retry function can be provided in a hybrid system using a shared bus. In a hybrid system, the access arbiter could be modified to activate a retry function, thereby eliminating the need for the retry signal to be passed back to the master.

Bus Lock Function: A bus lock function ensures that a particular slave is accessible by only one master. However, a bus lock function can affect the arbitration logic in the PIC core, which is in the critical timing path. Thus, the bus lock function can be enabled, although probably with some performance loss.

Address Pipelining Function: An address pipelining function is supported in both the standard PLB as well as the PIC core of the present invention. Pipelining can significantly improve system performance by allowing multiple transactions to proceed in parallel. Note that code branching can undermine the benefits of pipelining.

Transfer Type Function: A transfer type function in a standard PLB can include, for example, direct memory access (DMA) and fly-by. In general, each transfer type requires a combination of different protocols. Thus, providing a plurality of transfer types can add considerable complexity to an FPGA system. In accordance with the present invention, transfers are limited to basic memory transfers, thereby simplifying the logic and complexity of the FPGA.

2. Data Transfer Functions

Single Data Beat Transfer Function: A single data beat transfer function, i.e. a single data unit transfer, is a basic operation of the CPU and therefore is supported by the present invention. Note that this transfer function can be either a Write or a Read operation and can include any byte enable pattern. Each transaction will only transfer up to the size of the bus width in data. Note that this function is distinct from bursting.

Indeterminate Length Burst Function: Providing an indeterminate length burst function in pipelined address and data paths, as provided by the present invention, introduces significant performance problems. For example, the master would need one or more cycles to communicate the end of a burst to the requested slave. However, during that time, the slave could send too much data. Moreover, address decoding logic might find it computationally difficult to determine if an indeterminate length burst overruns an address boundary in the allotted time. Therefore, in the present invention, indeterminate length bursts are not supported.

Burst Terminate Function: A standard PLB allows a slave to terminate a fixed length burst at any time. However, once again, the master might need one or more cycles to communicate a terminate signal to the slave. In this time period, the slave could send too much data. Therefore, in one embodiment, the present invention does not support the burst terminate function. Instead, the present invention requires deterministic behavior, i.e. the slave returns the correct number of Read acknowledge (RdAck) and Write acknowledge (WrAck) signals. In another embodiment, if a burst terminate signal is used to control data flow, the slave can insert wait states between RdAck and WrAck signals to provide more time. Alternatively, the slave can flag read errors or generate interrupts if a problem arises.

Determinate Length Burst Function: Providing a determinate length burst, i.e. between 2 and 16 transfers, simplifies the design of the master, but in turn necessitates the addition of logic to the slave to detect address boundary or page boundary crossing. Therefore, in one embodiment, this function is not supported in the present invention and, instead, cacheline alignment is provided. In this embodiment, the PIC core can perform fixed length bursts of powers of two that are aligned to that size (i.e. a cacheline transfer). In another embodiment, the determinate length burst function is supported, wherein the user defines the address qualifiers and designs the master/slave IP to support these qualifiers. In another embodiment, the determinate length burst function is forcibly implemented as aligned transfers to the burst length size, thereby obviating the need to have address boundary checks.

Burst Size Function: Varying the burst size increases the complexity of design paths in the slave. Specifically, the slave would need to implement data paths to handle any number of data widths. In one embodiment, the burst size can be set to the data path width.

Cacheline Transfer Function: Cacheline transfers, i.e. atomic data bursts of a specific length and alignment, simplify the design of the slaves with respect to address or page boundary alignment. In accordance with the present invention, cacheline transfers are supported. In embodiment of the present invention, cacheline transfers of 2, 4, 8, 16, and 32 words are provided. Note that these sizes advantageously support DDR SDRAM.

Dynamic Bus Sizing Function: Dynamic bus sizing requires data mirroring and steering logic, which can significantly increase the complexity of the FPGA. Moreover, both masters and slaves must be aware of the transfer widths so they can adjust their internal logic for the correct number of data transfer cycles. Therefore, in accordance with the present invention, the PIC core does not support masters and slaves of different widths. Instead, transfer widths are fixed across the system, thereby decreasing complexity in the FPGA. In one embodiment, parameterized IP can be set to 32 or 64 bit transfers. The effect of dynamic bus sizing can be accommodated through the use of byte enable signals and software control.

B. PLB SuperSet Functions

In accordance with the present invention, a number of implemented functions are supersets of the standard PLB functions. For example, the present invention provides support for double data rate (DDR) data paths, wherein the data path can run at 2X the clock frequency of the address path. Additionally, the present invention includes a dynamic write byte enable mechanism to allow write transactions to be optimized across the connection fabric. Specifically, for each byte of write data transferred, the present invention can provide an additional bit, thereby allowing each byte of data to be selectively skipped. In this manner, the dynamic write byte enable mechanism can efficiently write patterns of bytes, thereby enhancing system performance during non-contiguous memory write operations. This is particularly advantageous in systems that utilize DMA. Specifically, the DMA engine would no longer require complex logic to sequence through misaligned data. Instead, the DMA engine can simply put the proper byte enable pattern up to accommodate the content of the transfer. Furthermore, the DMA engine will no longer consume as many bus cycles to transfer its data, thereby adding additional available performance to the system. Finally, the PIC core of the present invention utilizes a transaction forwarding architecture to support pipelining and enable higher overall system performance. These superset functions significantly increase IP performance in the FPGA.

C. Signals: PLB to PIC Mapping

To provide the PLB functions described above, various signals are transferred between the PLB and the masters/slaves of the system. These PLB signals are listed below to indicate mapping to the present invention. For example, Table 1 lists various PLB signals from the perspective of a master, whether these signals are required in a basic CPU, and whether these signals can be implemented in an FPGA with reasonable performance.

TABLE 1

| SIGNAL NAME | DIRECTION | REQ'D BY CPU | IN FPGA |
|---|---|---|---|
| PLB Request Qualifiers | | | |
| SYS_plbClk | Input | Yes | Yes |
| SYS_plbReset | Input | Yes | Yes |
| PLB_MnAddrAck | Input | Yes | Yes |
| PLB_MnRearbitrate | Input | No | Yes (Shared Bus) |
| PLB_MnSSize | Input | No | No |
| PLB_MnBusy | Input | Yes | Yes |
| PLB_MnErr | Input | Yes | Yes |
| PLB_pendReq | Input | No | Yes (Static Value) |
| PLB_pendPri | Input | No | Yes |
| PLB_reqPri | Input | No | Yes (Static Value) |
| Mn_request | Output | Yes | Yes |
| Mn_priority | Output | No | Yes |
| Mn_busLock | Output | No | Yes |

TABLE 1-continued

| SIGNAL NAME | DIRECTION | REQ'D BY CPU | IN FPGA |
|---|---|---|---|
| Mn_RNW | Output | Yes | Yes |
| Mn_BE | Output | Yes (Non-burst) | Yes (Non-burst or Fixed Length Bursts) |
| Mn_size | Output | Yes (Non-burst or Cacheline) | Yes (Non-burst, fixed length bursts, or cacheline) |
| Mn_type | Output | No | No |
| Mn_Msize | Output | No | No |
| Mn_compress | Output | Yes | Yes |
| Mn_guarded | Output | Yes | Yes |
| Mn_ordered | Output | No | Yes |
| Mn_locker | Output | No | Yes |
| Mn_abort | Output | Yes | No |
| Mn_Abus | Output | Yes | Yes |
| PLB Write Data Bus | | | |
| PLB_MnWrDAck | Input | Yes | Yes |
| PLB_MnWrBTerm | Input | No | Yes |
| Mn_wrBurst | Output | No | No |
| Mn_wDBus | Output | Yes | Yes |
| PLB Read Data Bus | | | |
| PLB_MnRdAck | Input | Yes | Yes |
| PLB_MnRdBTerm | Input | No | Yes |
| PLB_MnRdWdAddr | Input | Yes | Yes |
| PLB_MnRdDBus | Input | Yes | Yes |
| Mn_rdBurst | Output | No | No |
| Superset Signals | | | |
| SYS_plbClk2x | Input | No | Yes |
| PLB_MnWrAck | Input | No | Yes |

Table 2 lists various PLB signals from the perspective of a slave, whether these signals are required in a basic CPU, and whether these signals can be implemented in an FPGA with reasonable performance.

TABLE 2

| SIGNAL NAME | DIRECTION | REQ'D IN CPU | IN FPGA |
|---|---|---|---|
| PLB Transfer Qualifiers | | | |
| SYS_plbClk | Input | Yes | Yes |
| SYS_plbReset | Input | Yes | Yes |
| PLB_PAValid | Input | Yes | Yes |
| PLB_busLock | Input | No | Yes |
| PLB_pendReq | Input | No | Yes |
| PLB_pendPri | Input | No | Yes (Static Value) |
| PLB_reqPri | Input | No | Yes (Static Value) |
| PLB_masterID | Input | No | Yes |
| PLB_RNW | Input | Yes | Yes |
| PLB_BE | Input | Yes (Non-burst) | Yes (Non-burst or Fixed Length Bursts) |
| PLB_size | Input | Yes (Non-burst or Cacheline) | Yes (Non-burst, fixed length bursts, or cacheline) |
| PLB_type | Input | No | No |
| PLB_Msize | Input | No | Yes (Static Value) |
| PLB_compress | Input | Yes | Yes |
| PLB_guarded | Input | Yes | Yes |
| PLB_ordered | Input | No | Yes |
| PLB_lockErr | Input | No | Yes |

TABLE 2-continued

| SIGNAL NAME | DIRECTION | REQ'D IN CPU | IN FPGA |
|---|---|---|---|
| PLB_abort | Input | No | Yes (Static Value) |
| PLB_Abus | Input | Yes | Yes |
| Sl_addrAck | Output | Yes | Yes |
| Sl_wait | Output | No | No |
| Sl_Ssize | Output | No | No |
| Sl_rearbitrate | Output | No | Yes (Shared Bus) |
| Sl_Mbusy | Output | Yes | Yes |
| Sl_Merr | Output | Yes | Yes |
| PLB Address Pipelining | | | |
| PLB_SAValid | Input | Yes (Performance) | Yes |
| PLB_rdPrim | Input | Yes (Performance) | Yes |
| PLB_wrPrim | Input | Yes (Performance) | Yes |
| PLB Write Data Bus | | | |
| PLB_wrDBus | Input | Yes | Yes |
| PLB_wrBurst | Input | No | No |
| Sl_wDAck | Output | Yes | Yes |
| Sl_wrComp | Output | Yes | Yes |
| Sl_wrBTerm | Output | No | Yes |
| PLB Read Data Bus | | | |
| PLB_rdBurst | Input | No | No |
| PLB_Sl_rdDBus | Output | Yes | Yes |
| PLB_rdWdAddr | Output | Yes | Yes |

IV. FPGA Implementation

In accordance with one embodiment of the present invention, a programmable interface core (PIC) provides communication between a central processing unit (CPU) and other devices, both on and off the FPGA. Because of the above-described subset of PLB functions designated by the present invention, the PIC core can advantageously use standard FPGA resources, i.e. lookup tables, multiplexers, and flip-flops, to efficiently implement those functions. The present invention takes advantage of pipelining as well as logic functions that map well into those resources.

A. Central Processing Unit (CPU)

Figure 4:
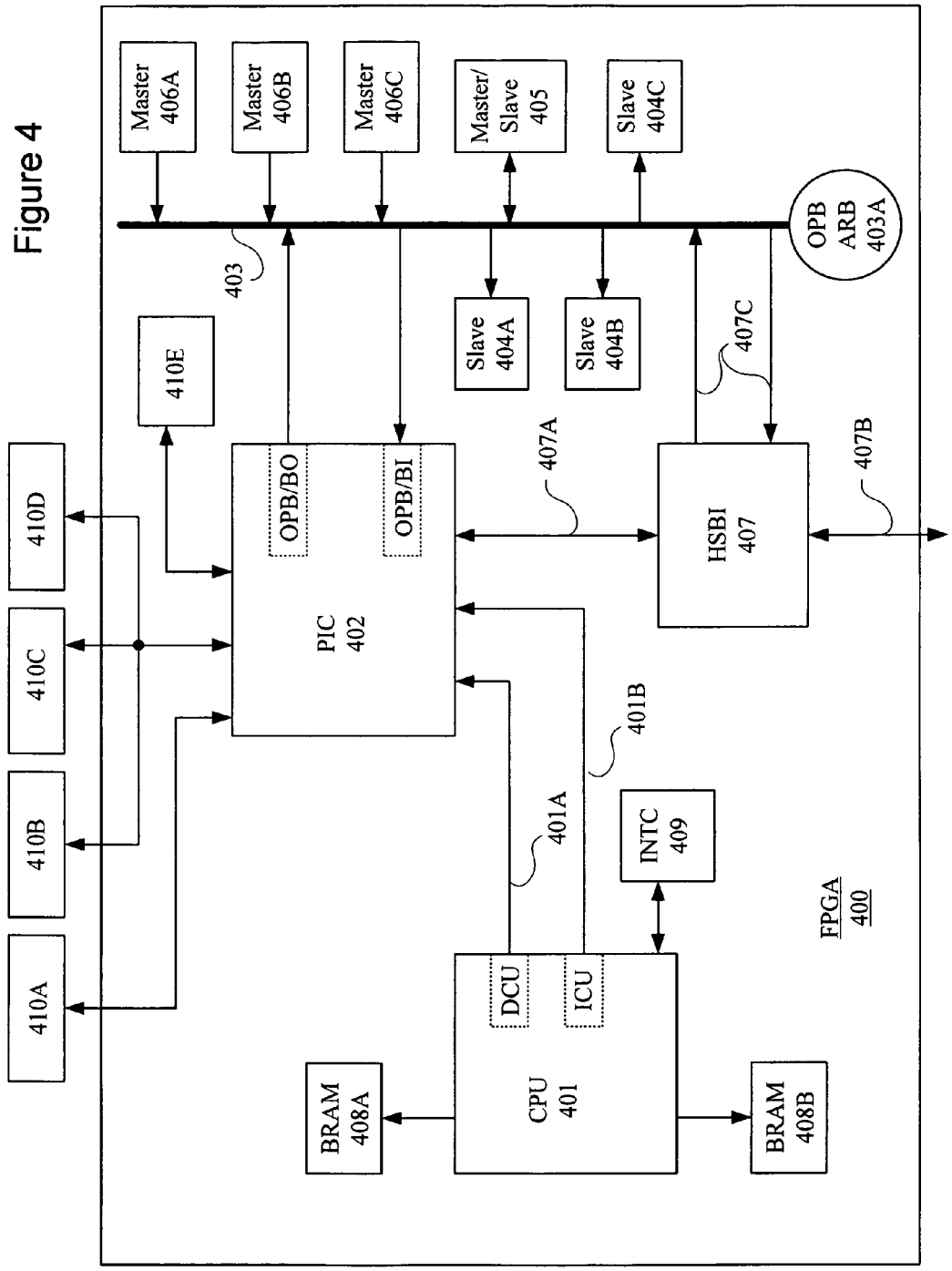
FIG. 4 illustrates a basic embedded processor FPGA system in accordance with the present invention.

FIG. 4 illustrates an FPGA 400 including a central processing unit (CPU) 401 formed from non-programmable resources on FPGA 400. In one embodiment, CPU 401 includes an IBM PowerPC 405 CPU. However, the invention is equally applicable to any CPU. Moreover, the invention can be used with any number of CPUs. Specifically, the architecture illustrated in FIG. 4 can be replicated for each CPU on the FPGA.

In this embodiment, CPU 401 can directly communicate with a plurality of "on-chip" memories, such as block random access memory (BRAM) 408A and 408B. Because each CPU defines its own ports and proprietary connections to such on-chip memories, these details are not provided herein.

CPU 401 is also coupled to an interrupt controller (INTC) 409 that intercepts and prioritizes "flags" sent by any number of the peripheral modules, i.e. master modules 406 or slave modules 404, to CPU 401. Thus, any slave module 404 or master module 406 can be coupled (lines not shown) to interrupt controller 409. These flags represent "events" associated with the peripheral modules that request immediate attention from CPU 401. In this manner, CPU 401 is freed from conducting continuous checks of the peripheral modules, thereby ensuring that CPU 401 can operate as efficiently as possible.

For example, one flag from a peripheral module could notify CPU 401 that a user has pressed an "Enter" key on a keyboard. Generating these flags is well known to those skilled in the art, and therefore is not described in detail herein. To respond to the interrupts generated by a peripheral module, CPU 401 uses PIC 402 and OPB 403 (both described in detail below).

Note that CPU 401 may include a structure that facilitates the coupling of the dedicated pin-out of CPU 401 to the FPGA fabric. The present invention can operate with a variety of CPUs having different structures.

FPGA 400 further includes a plurality of data paths (not shown) that allow transfer of data to CPU 401 from a plurality of high-speed devices 410 as well as master/slave modules 404/406. Thus, the paths shown in FIG. 4 are intended to indicate transaction paths in accordance with the present invention.

B. Programmable Interface Core (PIC)

Figure 3:
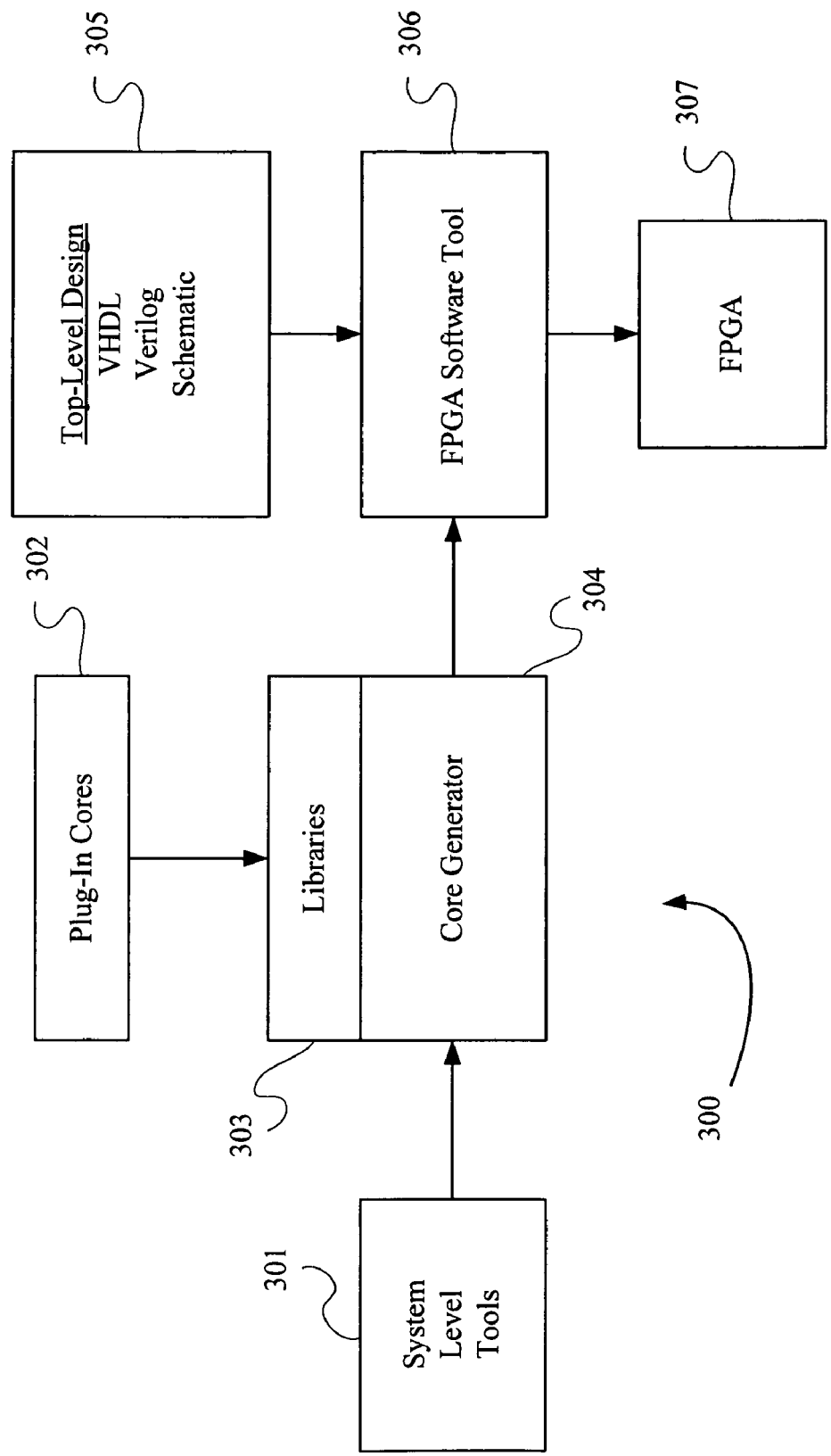
FIG. 3 illustrates one IP process layout for using one or more cores in an FPGA.

In accordance with the present invention, to provide high performance communication with other devices (both on FPGA 400 and off-chip), CPU 401 uses a programmable interface core (PIC) 402. Programmable interface core 402, as the name implies, is implemented on FPGA 400 using the configuration bits generated by an FPGA software tool (see FPGA software tool 306, FIG. 3). In one optimized embodiment, programmable interface core 402 includes a crosspoint switch, wherein the crosspoint switch selectively allows any master device (such as CPU 401 or high speed bus interface (HSBI) 407) to communicate with any slave device 410. Moreover, in a crosspoint switch, another master device can simultaneously communicate with another slave device while the first transaction proceeds. In this manner, the present invention can provide a high performance interface between master devices and slave devices, both on FPGA 400 and off-chip.

In the embodiment shown in FIG. 4, programmable interface core 402 would use a 4 input (master) ×4 output (slave) (4×4) crosspoint switch to connect the master devices to the slave devices. Specifically, master devices can include the instruction cache unit (ICU) of CPU 401, the data cache unit (DCU) of CPU 401, high speed bus interface (HSBI) 407, and an OPB bridge-in module (OPB/BI), whereas slave devices can include a DDR SDRAM Controller device 410A, one of off-chip memories 410B-410D, an on-chip memory 410E (in one embodiment, a BRAM), and an OPB bride-out module (OPB/BO). In other embodiments having N master devices and M slave devices, programmable interface core 402 can be configured as an N×M crosspoint switch. However, of importance, due to the increased connectivity of a crosspoint switch compared to other types of switches, the implementation of a crosspoint switch must be carefully evaluated to optimize available resources on FPGA 400. This evaluation is described in detail below.

Figure 5A:
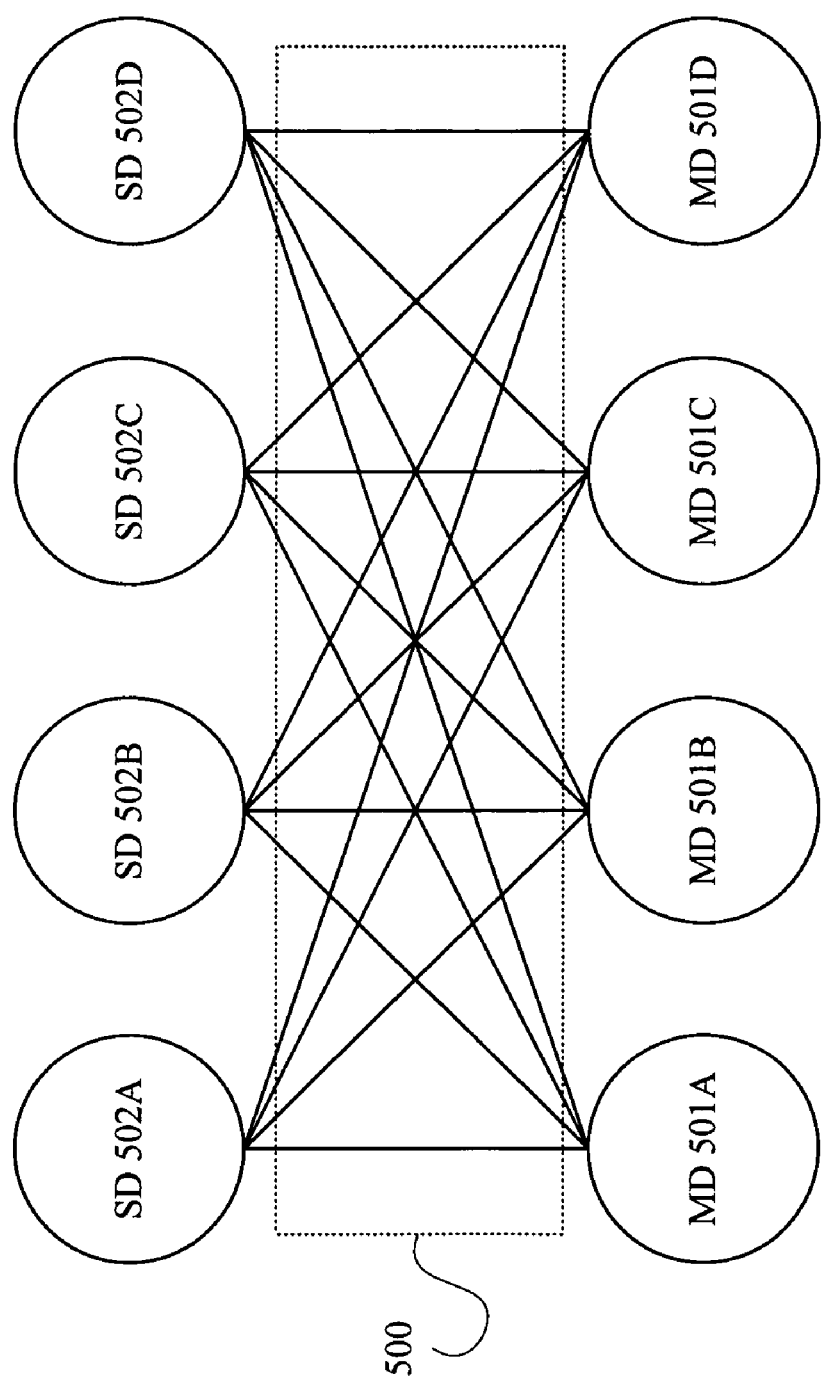
FIG. 5A illustrates a simplified diagram of a 4×4 crosspoint switch in accordance with the present invention.

FIG. 5A illustrates a simplified 4×4 crosspoint switch 500 provided as part of a programmable interface core, wherein crosspoint switch 500 selectively couples four master devices 501A-501D and four slave devices 502A-502D. In one embodiment, the size of crosspoint switch 400 can be expanded to a 16×16 switch. Note that the logic resources typically limit the size of the crosspoint switch, although routing resources can also be limiting. Thus, the maximum size of the crosspoint switch is FPGA-dependent. In one embodiment, the maximum size can be calculated to take into account the N×M size and the parameters used to generate the PIC. Crosspoint switch 500 includes two separate structures for the address and data paths of the transaction. In an actual FPGA, these structures, described in reference to FIGS. 5B (500A) and 5C (500B), could be located on overlapping programmable resources. In other embodiments, the structures used in the address and data logic of the transaction are formed from non-overlapping programmable resources.

Figure 5B:
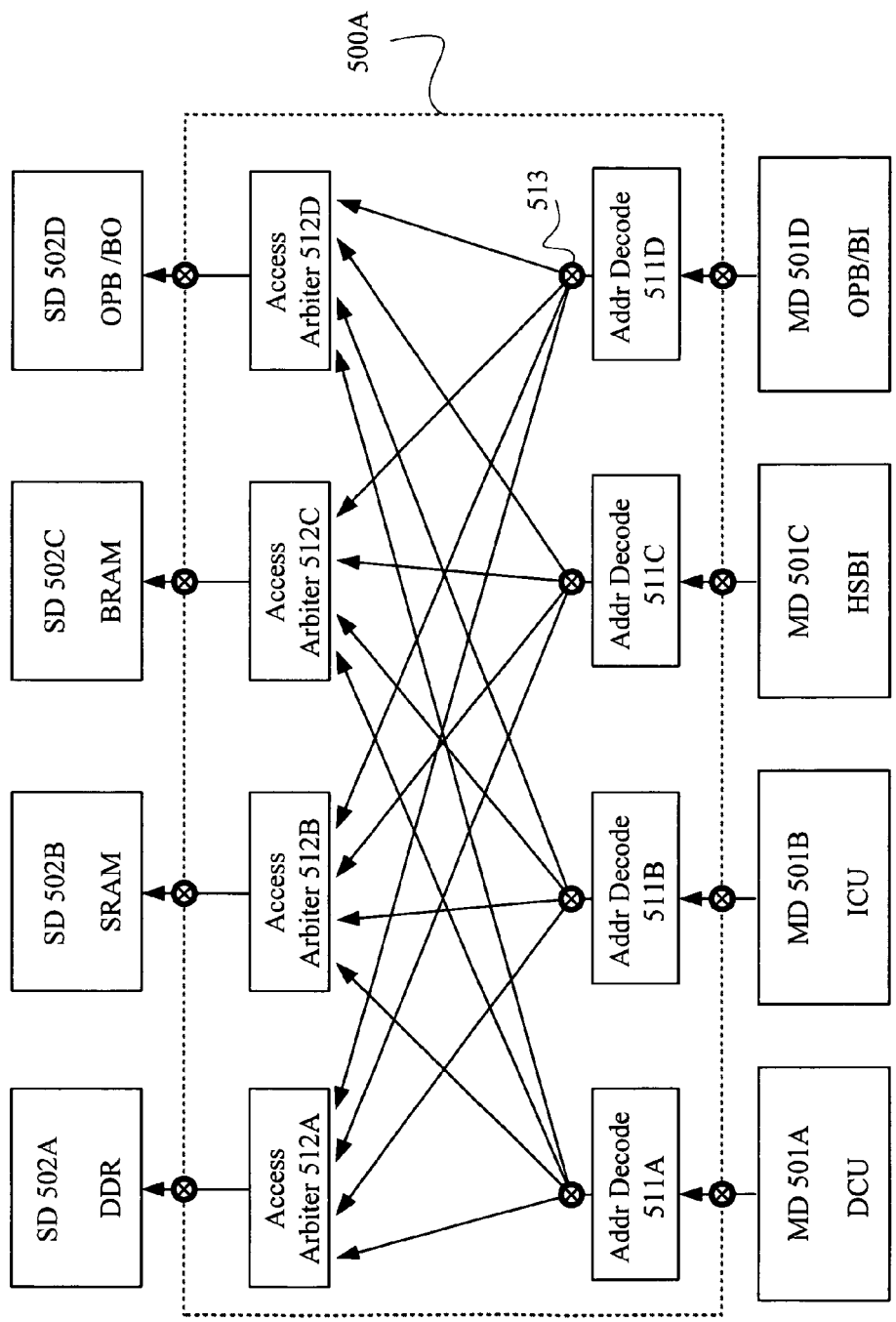
FIG. 5B illustrates a more detailed diagram of one implementation of the crosspoint switch of FIG. 5A in the address logic.

FIG. 5B illustrates a more detailed diagram of one implementation of the crosspoint switch in the address logic (hereinafter crosspoint switch 500A). In this implementation, crosspoint switch 500A includes N address decoders 511 (wherein N equals the number of master devices 501) and M access arbiters 512 (wherein M equals the number of slave devices 502). Master devices 501A-501D include a data cache unit (DCU), an instruction cache unit (ICU), a high-speed bus interface (HSBI), and an on-chip peripheral bus bridge-in module OPB/BI. Slave devices 502A-502D include a DDR device, a static random access memory (SRAM), a block RAM (BRAM), and an OPB bridge-out master OPB/BO.

Regarding the OPB/BI and OPB/BO modules, note that if CPU 401 (FIG. 4) needs to communicate with a slave module 404 or a master/slave module 405 (explained below), then an OPB bridge-out module OPB/BO in programmable interface core (PIC) 402 drives the CPU's command onto OPB 403. However, from the perspective of PIC 402, this OPB/BO module functions as a slave device. On the other hand, if a master module 406 or a master/slave module 405 issues a command to device 410, then that request is received by a bridge-in module OPB/BI in programmable interface core 402. Thus, from the perspective of PIC 402, OPB/BI appears to function as a master. Therefore, OPB/BO and OPB/BI can be characterized as bridging modules in programmable interface core 502 having both master and slave functionality. OPB/BOM and OPB/BI are explained in greater detail in reference to FIGS. 16 and 17.

In crosspoint switch 500A, an access decoder 511 receives an address from its respective master device 501 and then decodes the address to determine which slave device 502 the master device wishes to access. After decoding, the address decoder 511 forwards the address to the access arbiter 512 associated with the requested slave device 502. Recall that multiple master devices 501 may wish to access one slave device 502. Therefore, access arbiter 512 is used to determine priority among the requesting master devices. Some known algorithms that could be used by access arbiters 512 include the Single-Level Round Robin, the Multi-Level Round Robin, the Least Recently Used, and the Priority Based approaches (explained in further detail below in reference to OPB bus arbiter 503A). Note that additional information from the master device 501 including whether the transaction is a Read or Write operation and the size of the data transfer is transferred with the decoded address to the slave device 502.

The use of address decoder 511 and access arbiter 512 in crosspoint switch 500A allows master devices 501 to begin another transaction before the previous transaction is complete. In other words, once the decoded address is provided to an access arbiter 512, the address decoder 511 can begin decoding the next address. This type of process is called "transaction forwarding". The present invention advantageously uses transaction forwarding to increase performance of the crosspoint switch.

In one embodiment of the present invention, this transaction forwarding feature can be further enhanced by including multiple registers 513 (only one labeled for simplicity) in the address logic. In FIG. 5B, these registers can be placed before address decoders 511, after address decoders 511 and before access arbiters 512, and/or after access arbiters 512 and before slave devices 502. Note that additional registers can be located at any point in the address logic (however, each address path should have a register in the same location to ensure consistent timing across the address/control paths). In the present invention, these registers 513 can provide pipelining for the address and control information, thereby allowing the requesting master to initiate another transaction while the other transaction is being processed. Thus, in this manner, the pipelining of the present invention can increase the overall address/control bandwidth of the system, thereby increasing the speed of the address logic for multiple transactions.

Figure 5C:
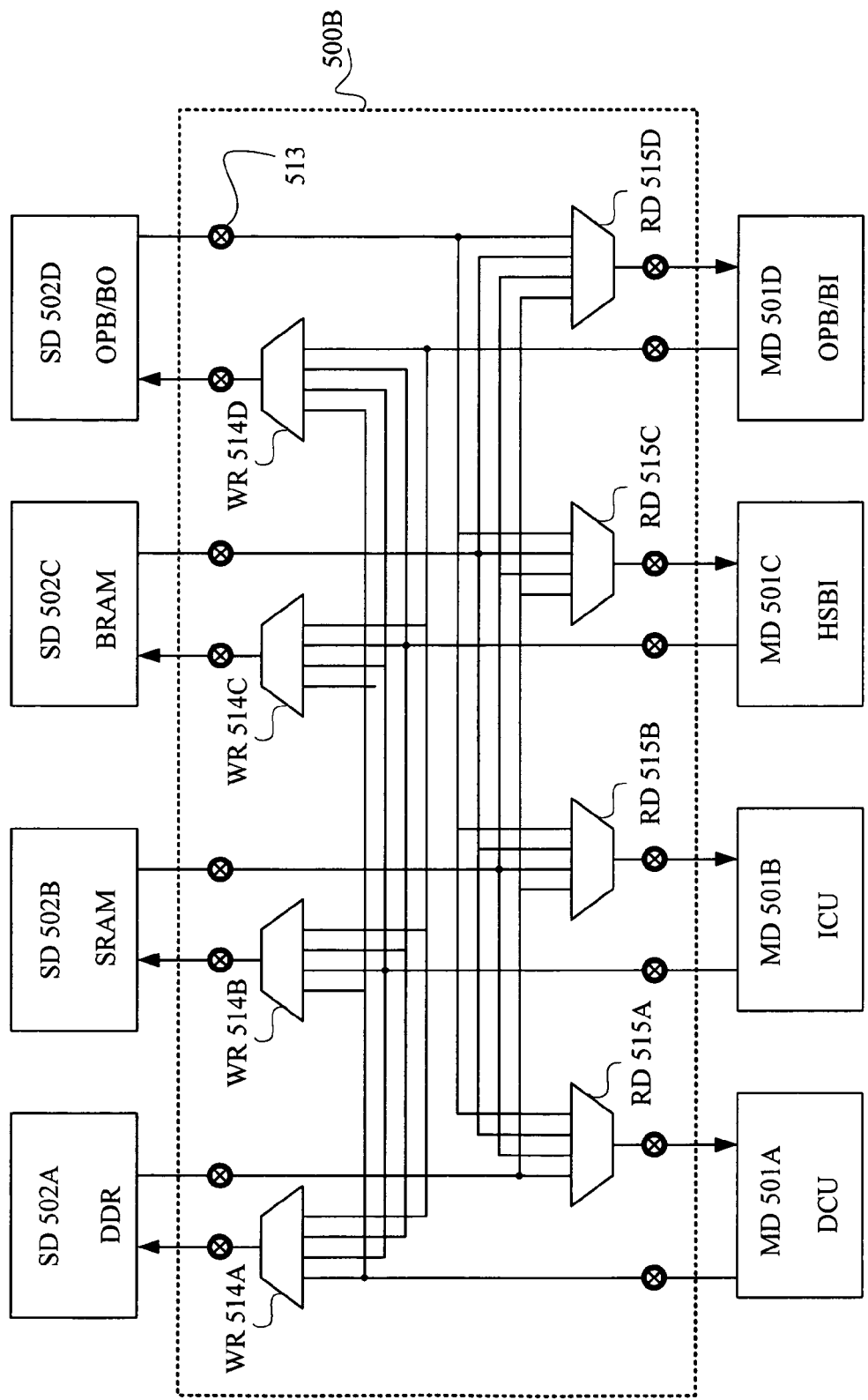
FIG. 5C illustrates a more detailed diagram of one implementation of the crosspoint switch of FIG. 5A in the data logic.

After an access arbiter 512 determines that a particular slave device 502 is free for a transaction, that access arbiter 512 communicates with structures provided in the data logic to generate the appropriate connections as described in reference to FIG. 5C. FIG. 5C illustrates a more detailed diagram of one implementation of the crosspoint switch for the data logic (hereinafter crosspoint switch 500B). In this implementation, crosspoint switch 500B includes N write multiplexers 514 (wherein N equals the number of slave devices 502 that can be written to in a Write operation) and M read multiplexers 515 (wherein M equals the number of master devices 501 that can receive data in a Read operation). Multiplexers 514A-514D and 515A-515D are controlled by access arbiters 512A-512D (FIG. 5B).

Similarly to the address logic, crosspoint switch 500B can include pipelining, which is provided by registers 513. In one embodiment, these registers 513 are located between master devices 501 and write multiplexers 514 and between slave devices 502 and read multiplexers 515. Note that additional registers can be located at any point in the data logic. However, each data path should have a register in the same location to ensure consistent timing across the data paths. In the present invention, these registers 513 can provide pipelining for the transferred data, thereby allowing either the requesting master or the accessed slave to initiate another Read or Write transaction while another Read or Write transaction is being processed. Thus, in this manner, the pipelining of the present invention can also increase the overall data bandwidth of the system, thereby increasing the throughput of the data logic of multiple transactions.

As described above, the present invention can advantageously use transaction forwarding in both the address and data logic. Pipelining allows the optimization of transaction forwarding. Specifically, because a master device does not communicate directly with a slave device, pipeline registers can be provided in multiple locations in the address/data logic. Thus, once a master device sends out an address and receives an acknowledge from the slave, the master device could pipeline the rest of the information (both control and data) associated with that transaction. The pipelining helps in that once the slave data acknowledge signals reach the master, the master can supply the data without waiting for the slave to have actually received the data. At this point, the master device can initiate another transaction. The amount of pipelining determines the number of transactions that can be simultaneously active.

Note that for overall system performance, the latency (i.e. the delay associated with this pipelining) must also be considered. For example, in one embodiment, the registers can be implemented using flip-flops, which require a clock signal. This clock signal can be set based on the time necessary for the address decoders and access arbiters to perform their respective functions. Note that pipelining is directly correlated to frequency. Thus, the more pipelining, the higher the frequency provided. However, increasing the frequency also undesirably increases the latency. Therefore, as described in further detail below, the present invention establishes a balance between bandwidth (as provided by pipelining) and latency.

As another advantage, the present invention can significantly reduce the logic provided within each slave device. Specifically, slave devices communicating with master devices in connection with the present invention can eliminate the complex circuitry needed to decode addresses. Therefore, the present invention simplifies the task of designing, implementing, and fabricating slave devices.

In contrast, in a shared bus system, a master device would broadcast an address to all slave devices. Thus, in this system, each slave device would include the logic to decode the address and determine whether the address pertained to that slave device. After the address is decoded, the applicable slave device would send a signal back to the master device, which in turn would send the remainder of the information regarding the transaction to the identified slave device.

As can be appreciated from the above description, a shared bus system can significantly limit the amount of pipelining that can be included in the system. For example, once a master device sends out the address, all slave devices must decode the address, thereby preventing other non-designated slave devices from proceeding with other transactions with other master devices. Therefore, the shared bus system of the prior art inherently provides lower performance than the crosspoint switch of the present invention. Note that in a hybrid system (described below), the number of slaves on a shared bus can be limited. In this manner, the time broadcasting an address and waiting for a response from the slaves can be minimized. In other words, those devices that need high bandwidth can be balanced against those that can sustain the extra latencies implicit in a shared bus configuration, thereby optimizing a specific system.

Configuring a crosspoint switch in the FGPA as the switch fabric of the present invention provides several advantages. First, the crosspoint switch is "non-blocking", thereby ensuring that an input is guaranteed an un-congested path to the output. This aspect is particularly advantageous in the pipelined architecture of the present invention. Second, the crosspoint switch implemented using FPGA resources allows a connection to be selectively changed quickly. Note that changing such a connection, and thus also changing a path, does not affect the connections for any other paths. Third, the crosspoint switch can be programmably "trimmed" to minimize resources used on the FPGA.

Figure 5D:
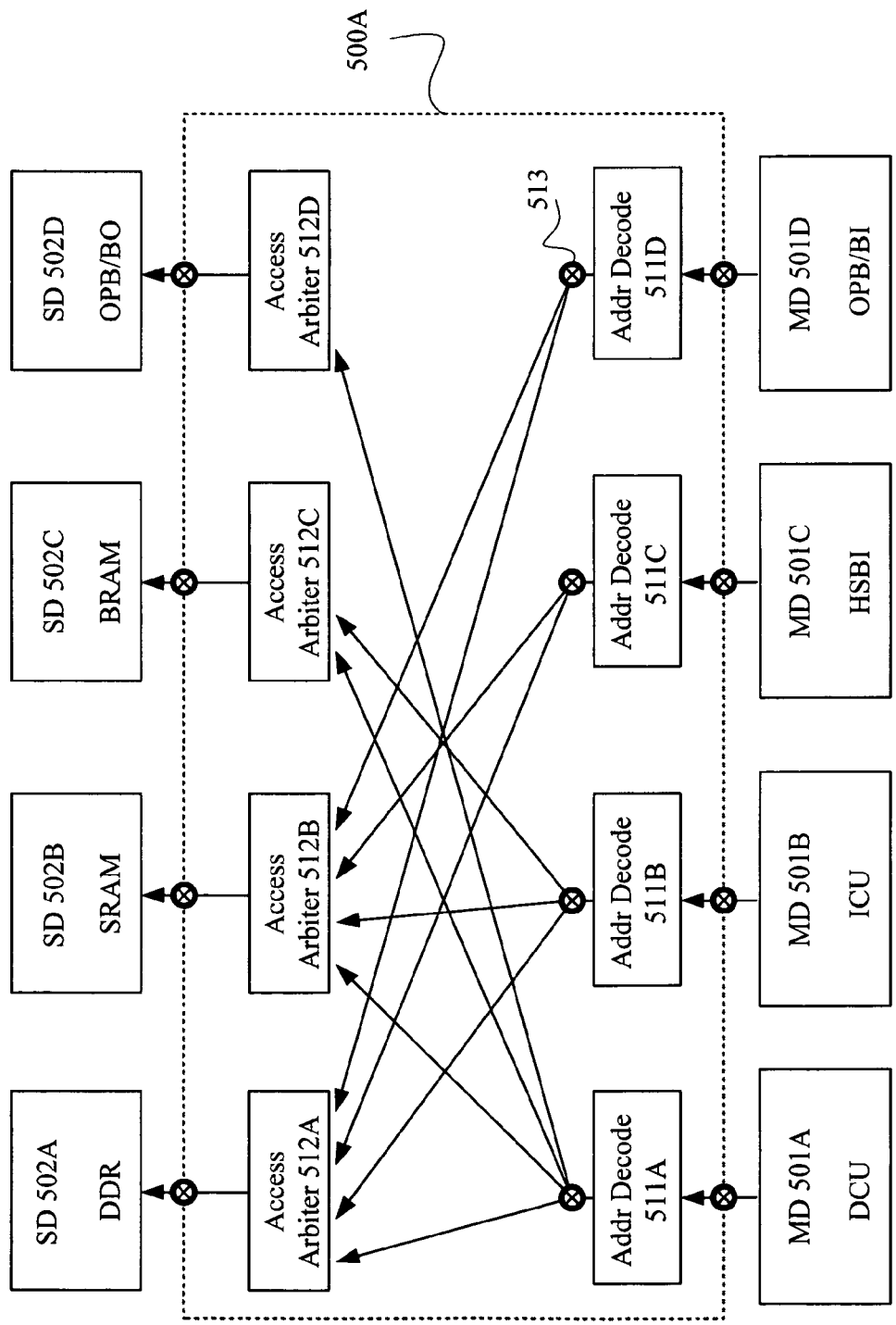
FIG. 5D illustrates one embodiment the crosspoint switch of FIG. 5B in which address/control logic is trimmed.

For example, FIG. 5D illustrates one embodiment of crosspoint switch 500A in which address/control logic is trimmed. In this embodiment, the user has determined that some address/control logic will not be used. Note that software can help the user specify which logic can be trimmed; however, the user must typically provide the basic parameters for the software to make such a determination. The present invention eliminates the unused logic, thereby allowing the resources associated with that logic to be used for other components of the user's design. Alternatively, even if the other components of the user's design do not use the trimmed logic, the user's design can be shrunk, perhaps even allowing a smaller FPGA to be used, or more masters or slaves to be implemented in the same size FPGA. In FIG. 5D, the following address/control logic is eliminated: ICU to OPB/BO, HSBI to BRAM, HSBI to OPB/BO, OPB/BI to BRAM, and OPB/BI to OPB/BO.

Figure 5E:
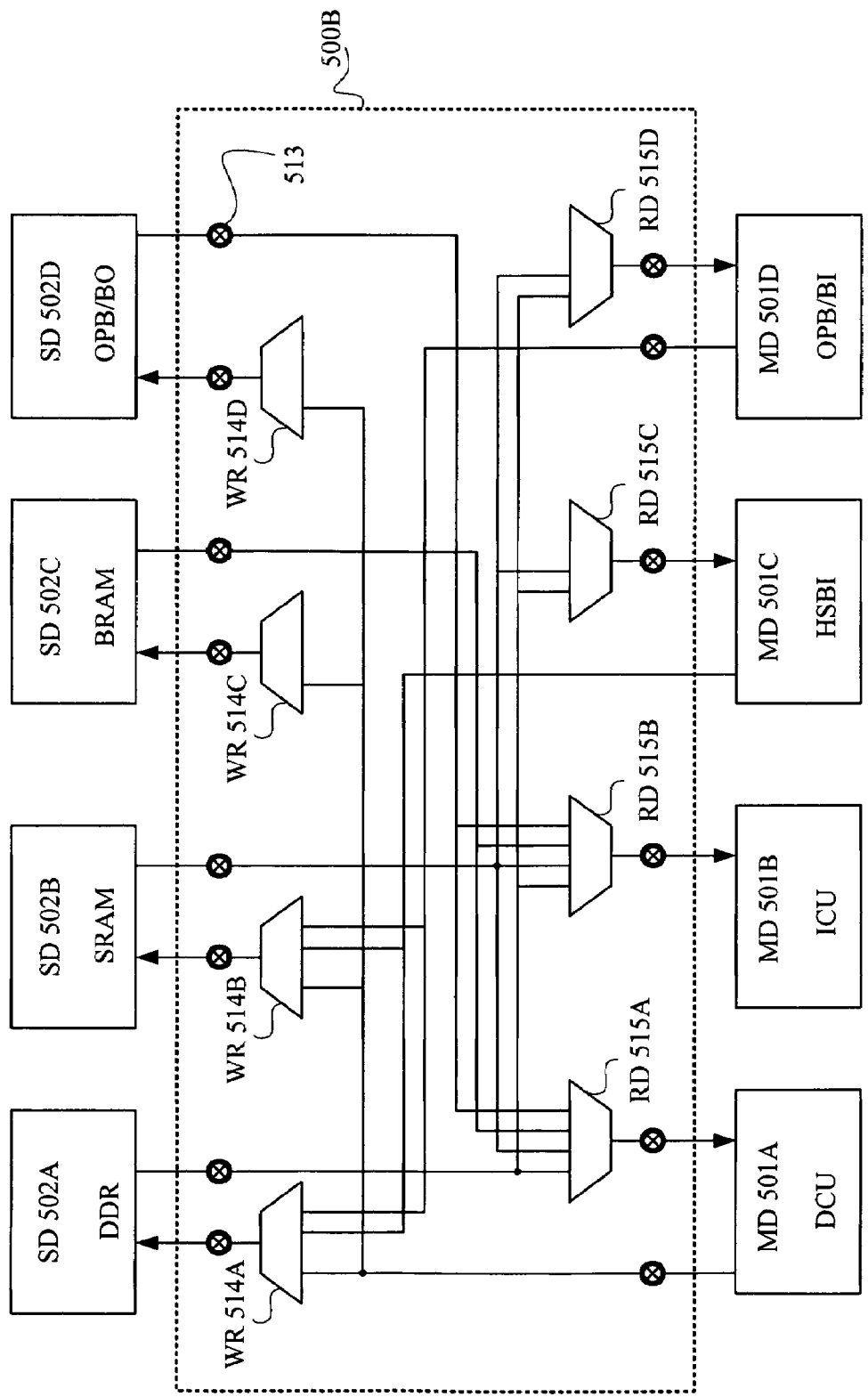
FIG. 5E illustrates one embodiment the crosspoint switch of FIG. 5C in which data logic is trimmed.

As another example, FIG. 5E illustrates one embodiment of crosspoint switch 500B in which data logic is trimmed. In this embodiment, the user has determined that some data logic will not be used. The present invention can advantageously eliminate the unused logic. In FIG. 5E, the following write data logic is eliminated: HSBI to BRAM and OPB/BO, ICU to any slave device (i.e. ICU is a read-only device), and OPB/BI to BRAM and OPB/BO. Additionally, in this embodiment, the following read logic is also eliminated: BRAM to HSBI and OPB/BI, and OPB/BO to HSBI and OPB/BI.

In accordance with the present invention, trimming of any paths (and associated logic) can simplify the remaining circuitry. For example, in FIG. 5E, write multiplexers 514C and 514D each have only one input. Thus, these multiplexers could be implemented as simple pass transistors, for example. Other multiplexers, such as read multiplexers 515C and 515D, could also be simplified. Simplifying logic can improve the speed and other performance parameters of the system. Thus, the ability to trim programmable resources in accordance with the present invention can provide significant improvements in performance and area of the FPGA.

In one embodiment of the invention, crosspoint switch 500A/500B is designed such that the address/control logic runs at CLK and the data logic runs at CLK2X. Specifically, once an access arbiter 512 determines a slave device 502 is available for a transaction, that access arbiter 512 can create the necessary logic for that transaction by controlling the appropriate Write multiplexer 514 or Read multiplexer 515. Therefore, at this point, because no additional logic or path transitions are required, the Write or Read operation can proceed without further delay. Thus, in one embodiment, the address/control logic can run at 133 MHz and the data logic can run at 266 MHz.

Of importance, in a dual clock system, the control path operates at ½ the nominal data clock rate to give this path preferential time to accomplish its task. Furthermore, because the ½ to 1 ratio exists, the data latency is substantially reduced and the frequency of data transfers can be increased.

Note that crosspoint switch 500A/500B can include additional lines dedicated to transfer one or more specific signals to a master device 501. These additional lines could transfer, but are not limited to transferring, an acknowledge signal. For example, in one embodiment, transaction forwarding can be triggered by an acknowledge signal provided by an access arbiter 512 to the requesting master device 501. Specifically, pipelining of the control signals and data is initiated after the requesting master device 501 receives the acknowledge signal.

C. Master & Slave Modules

In accordance with the present invention, both master modules 406 and slave modules 404, typically provided as peripheral devices in prior art systems, can be placed on the FPGA either as part of the user's top-level design or as cores. In one embodiment of the present invention, FPGA 400 can include a hybrid module 405 that acts both as a master as well as a slave. Specifically, hybrid master/slave module 405 can initiate transactions and take control of an on-chip peripheral bus (OPB) 403 during certain time periods and during other periods can accept transactions and provide data to OPB bus 403. For example, in a networking application, if a packet of data is received by hybrid module 405 as a slave, then hybrid module 405 can forward the packet into memory as a master using DMA. In another embodiment, master functionality is embedded in the slave module.

Advantageously, because the present invention facilitates parameterization, the number of master and slave modules can be changed, even dynamically. Thus, the present invention uses only the resources on the FPGA needed to implement the user's design.

D. OPB Bus

In accordance with the present invention, on-chip peripheral bus (OPB) 403 includes a connection infrastructure that facilitates communication between programmable interface core 402 and modules 404/406. OPB 403 uses a shared bus architecture that supports a plurality of lower performance peripheral devices, i.e. modules 404/406. These modules 404/406 could use serial ports and Ethernet connections, for example. In one embodiment, modules 404/406 can follow the IBM CoreConnect™ OPB specification.

Of importance, OPB 403 can be formed from the programmable routing resources provided on FPGA 400. Specifically, the lines of the bus can be formed from the programmable routing resources, whereas the switching logic can be formed from the programmable resources in the CLBs. In this manner, OPB 403 can be positioned anywhere on FPGA 400. Moreover, OPB 403 can be configured to accommodate any number of modules 404/406. In other words, if only three master modules 406 and one slave module 404 is placed on FPGA 400 by the user, then the present invention ensures that ports for only these four modules are created. Thus, OPB 403 is completely parameterizable in accordance with the present invention.

OPB 403 includes switching logic that allows a single master module 406 to communicate with a slave module 404 or master/slave 405. Specifically, because of the shared bus architecture, other master modules 406 or master/slave 405 must wait to begin their transactions with their respective slave modules 404 during each active transaction. An OPB arbiter 403A is provided to assign priority to these transactions.

In accordance with one embodiment of the present invention, OPB arbiter 403A is a core that can be configured to provide any type of arbitration scheme and can even be configured to change dynamically when FPGA 400 is in operation. Note that like OPB 403, OPB arbiter 403A is completely parameterizable. Thus, OPB arbiter 403A uses only the programmable resources on FPGA 400 necessary to arbitrate a user-designated number of master modules 406. In general, OPB arbiter 403A uses a pre-built algorithm to determine which master module 406 can take control of OPB 403 and the time period of that control.

Arbitration must resolve the competing goals of fairness and priority. Fairness requires that one master module 406 should not be allowed to monopolize OPB 403. However, priority requires that, under certain circumstances, predetermined master modules 406 should use OPB 403 more often to accomplish time critical goals. Some typical algorithms that could be used by OPB arbiter 403A are the Single-Level Round Robin, the Multi-Level Round Robin, the Least Recently Used, and the Priority Based approaches.

In the Single Level Round Robin approach, a small unit of time, i.e. a quantum, is defined. All transactions (associated with specific masters 306) are put in a circular queue. OPB arbiter 403A would follow the queue, and allocate the master module's use of OPB 403 to accomplish the transaction for a time interval of one quantum. Any new transaction would be added after the last transaction in the queue.

If the transaction finishes before the end of the quantum, master module 406 would release OPB 403 voluntarily. However, if the transaction is still running at the end of the quantum, master module 406 would be preempted and the transaction would be added to the end of the queue. Note that in another embodiment, master module 406 is allowed to complete its transaction. Then, OPB arbiter 403A can assign OPB 403 to the next transaction in the queue.

In the Multi-Level Round Robin approach, at least two circular queues are formed. For example, assuming first and second queues are formed, transactions that use OPB 403 frequently would be placed in the first queue and transactions that use OPB 403 less frequently would be placed in the second queue. Transactions in the second queue would have equal access to OPB 403, if in the same queue. However, the transactions in the second queue, as a group, would have equal access to OPB 403 as each transaction in the first queue. In other words, the transactions of the second queue effectively form a "super transaction", wherein the super transaction is deemed to be one of the transactions in the first queue. Thus, for every round of the first queue transactions, one transaction of the second queue would be performed. In this approach, if the transaction finishes before the end of the quantum, master module 406 would release OPB 403 voluntarily. However, if the transaction is still running at the end of the quantum, master module 406 would be preempted and the transaction would be added to the end of the appropriate queue.

In the Least Recently Used approach, an arbitrary queue is formed. OPB arbiter 403A would initially follow the queue and allow each transaction to finish before allowing the next master module 406 in the queue to get control of OPB 403. However, if OPB arbiter 403A received a request for bus control from a master module 406 not next in the queue, OPB arbiter 403A would give control of OPB 403 (after the completion of the transaction running) to the master module 406 that had least recently used OPB 403.

Finally, in a priority-based approach, OPB arbiter 403A would determine bus control based solely on the priority of the associated transaction performed by the master module 406. In this approach, each transaction of higher priority would complete before the transactions of lower priority would be allowed to initiate. In one embodiment, the priority-based approach includes granting priority to the master having the most influence on performance in the FPGA.

E. High Speed Bus Interface

In accordance with one embodiment of the present invention, FPGA 400 includes a high speed bus interface (HSBI) 407 that can transfer large amounts of data between programmable interface core 402 and an off-chip device (not shown) via buses 407A and 407B. Exemplary off-chip devices could use gigabit I/O, rapid I/O, PCI-X, or other known high performance protocols to communicate with interface 407. This interface 407 can be provided in the form of a core. Note that the transferred data can be transferred from or to off-chip memory (such as a flash memory, an SRAM memory, and/or another type of memory) or on-chip memory (such as BRAM).

In one embodiment, HSBI 407 can be addressed for non-data movement by buses 407C. These buses allow CPU 401 or other bus masters to have localized access to the internal register set of HSBI 407. For example, HSBI 407 may have generated an interrupt to INTC 409 to indicate that it has received a packet of data and has completed transferring it to an external DDR memory device. CPU 401, in responding to the interrupt could use bus 407A to talk to HSBI 407 to see what its request for service was about. However, the act of using bus 407A means that any ongoing data movement operations would need to be interrupted. Accordingly, in one embodiment, a set of teriary busses 407C exist for both master and slave operation onto OPB 403. Using bus 407C, CPU 401 can talk with HSBI 407 without impacting data movement on bus 407A. Further, if HSBI 407 wanted to move data to device 404C, it could do so without first having to access PIC 402, and/or storing it to memory. Rather, HSBI 407 could initiate a transaction on OPB 403 and transfer the data directly, thereby eliminating the need to double buffer the data and contributing to significant performance improvements throughout the system.

V. FPGA Implementation: Detailed

A. PIC & Devices: Ports, Timing, & Embodiment

Master devices and slave devices use a generic interface that allows for a more modular design. Specifically, these modules use generic ports (explained in detail below) that can be "plugged in" to the programmable interface core. In the description herein, the term "ports" can include a set of signals provided between the master/slave devices and the programmable interface core. Because of these generic ports, any number of master devices and slave devices, in any combination, can be included in the present invention. In one embodiment, N master devices and M slave devices are coupled to the programmable interface core, wherein N and M are integers (in some cases the same integer) equal to or greater than one.

Note that the present invention recognizes the importance of choosing the right balance between complex protocols that provide more features versus simple protocols that may run faster. In the embodiment described in detail herein, a relatively simple protocol is used, thereby still accomplishing most tasks but also running very fast.

1. Communication Between Master Device and PIC

Figure 6:
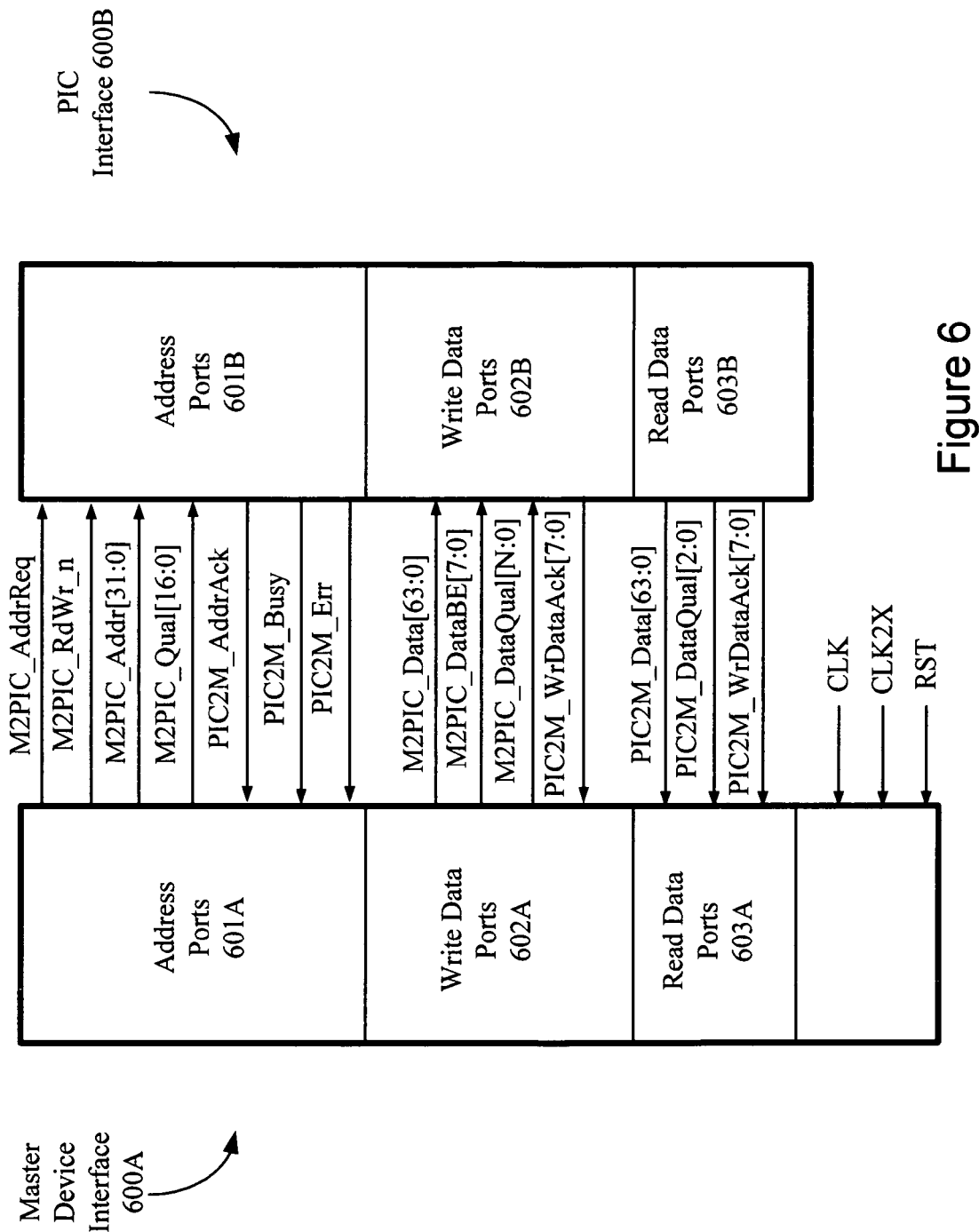
FIG. 6 illustrates an overview of the ports provided for a master device and the programmable interface core of the present invention and the signals that could be transferred between such ports.

FIG. 6 illustrates typical signals that can be transferred between any master device and the programmable interface core. To facilitate this transfer, the master device includes an interface 600A having address ports 601A, write data ports 602A, and read data ports 603A. In a similar configuration, the programmable interface core includes a PIC interface 600B having address ports 601B, write data ports 602B, and read data ports 603B. In one embodiment, each signal (or set of signals) transferred between ports has an associated line/bus, thereby facilitating the efficient transfer of that signal. Note that, in the description herein, the name of the signal can also refer to the associated line/bus. In accordance with the embodiment described below, standard PLB protocols are limited, thereby providing fewer features, but allowing the FPGA to run significantly faster.

a. Address Ports for Masters

Address ports 601A can output the following signals.

M2PIC_AddrReq

This status signal indicates that the master wishes to request a data transfer. Note that other signals, specifically M2PIC_Addr[31:0], M2PIC_AddrQual, and M2PIC_RdWr_n, must also be valid when M2PIC_AddrReq is active. In one embodiment of the present invention, a logic one signal (1) indicates that a request is pending, whereas a logic zero (0) signal indicates that no request is pending. This signal is characterized as a middle timing signal and has a clock domain of CLK.

M2PIC_Addr[0:31]

This 32-bit signal indicates the address, i.e. the specific byte in the memory space, of the requested transfer. As discussed above, this signal must be valid on the same cycle that M2PIC_AddrReq is valid. This bus is on the critical path because it feeds the address decoders for the programmable interface core (see address decoders 511 in FIG. 5B, for example). Thus, in one embodiment, only the upper bits are actually compared so that the lower bits can be treated as having middle timing. Specifically, the upper bits identify the address of the slave, whereas the lower bits identify the targeted memory in the slave. Thus, because identifying the slave precedes (see access arbiters 512 in FIG. 5B, for example) arbitration in the present invention and only one transaction can be active in a slave during any one period of time, reading the upper bits should be characterized as late timing, whereas the actual memory location in the slave can be characterized as middle timing.

Note that the requested data transfer is preferably address aligned with respect to the size of the transfer. For example, in an 8-word transfer, the address should be on an 8-word boundary. In other words, a 2-word transfer could begin at logical address 0, 2, 4, etc., whereas a 4-word transfer could begin at logical address 0, 4, 8, etc., whereas an 8-word transfer could begin at logical address 0, 8, 16, etc. (As one exception, an unaligned address could be given in the case of specifying a target word first transfer.) Alignment is required for devices like DDR SDRAM because these devices are designed to perform aligned block transfers. This signal has a clock domain of CLK.

M2PIC_RdWr_n

This signal provides a Read or a Write flag to accompany the address request signal (M2PIC_AddrReq). As described above, this signal must be valid on the same cycle that M2PIC_AddrReq is valid. In one embodiment, a logic one signal (1) indicates that a Read operation is requested, whereas a logic zero (0) signal indicates that a Write operation is requested. This signal is characterized as a middle timing signal and has a clock domain of CLK.

M2PIC_AddrQual[16:0]

This address transfer qualifier signal is specific to a proprietary CPU, in one embodiment the IBM PowerPC 405. As indicated above, this signal must be valid on the same cycle that M2PIC_AddrReq is valid. These signals are not decoded or processed by the programmable interface core, but are merely routed to the appropriate slave device. This signal is characterized as a middle timing signal and has a clock domain of CLK. The bit definitions for this signal are as follows:

| Bit | Name | Description |
|---|---|---|
| [16] | Cacheable Attribute | Cacheability of Data (Set to 0 if unused) |
| [15] | Guarded Attribute | Guard Data (Set to 0 if unused) |
| [14] | User Defined Attribute | User Defined Attribute (Set to 0 if unused) |
| [13] | WriteThru | Write Through Attribute (Set to 0 if unused) |
| [12:11] | Priority | Transfer Request Priority - The higher the number, the more important the request. This information is currently unused in the slave arbitration logic. (Recommend setting to 00) |
| [10:8] | Transfer Size | 000 = 1 word (1-4 bytes) - 32 Bit<br>000 = 2 word (1-8 bytes) - 64 Bit<br>001 = 4 word burst<br>010 = 8 word burst<br>011 = 16 word burst<br>100 = 32 word burst<br>101-111 = reserved |
| [7:0] | Single Beat Transfer Byte Enables | These are the byte enables during a single data beat transfer (Transfer Size = 000). Bits [7:4] are undefined in a 32 bit PIC System |

Note that in a 32-bit system, the user may not wish to support the 32 word burst mode since this may require structures that do not map efficiently into FPGA primitives.

Byte enables are provided for single beat (i.e. one or two word) transfers to allow devices like the CPU to perform smaller-sized reads like byte and half-word reads. This function is particularly important in the OPB bridge (explained in detail in reference to FIGS. 16 and 17), for example, because some OPB devices (particularly the slaves) may only have byte-wide registers. For memory devices such as DRAM or SRAM, there is no problem reading in a word or a double word even if only a byte is required so these devices may ignore the Single Beat Transfer Byte Enable. These byte enable bits are also valid for writes even though the information is redundant to the data path byte enables.

Address Port 601A can also receive the following signals.

PIC2M_AddrAck

This strobe signal (from the programmable interface core) acknowledges the current address and fetches the next address request, if any. On the cycle after PIC2M_AddrAck is asserted, M2PIC_AddrReq, M2PIC_Addr, M2PIC_RdWr_n, and M2PIC_AddrQual are updated. This signal is only asserted for one CLK cycle per address request. This signal is characterized as a late timing signal and has a clock domain of CLK.

PIC2M_Busy

This signal tells the requesting master that one of its transactions is ongoing in a slave. This signal goes high after the programmable interface core issues its PIC2M_AddrAck and goes back low when a slave has asserted its S2PIC_RdXferDone or S2PIC_WrXferDone signal (explained in detail below) to indicate the data transfer is completed by the slave. In one embodiment, the PIC2M_Busy signal and the master's M2PIC_AddrReq signal are provided to an OR gate. In this manner, the master can determine when it has completed all its transactions over the programmable interface core. This signal supports the "Sync" or "EIEIO" (Enforce Instruction Execution In Order) instruction in the CPU. In one embodiment, a logic 1 indicates that the programmable interface core is busy with a data transfer, and a logic 0 indicates that there are no ongoing transactions. Note that a slave is allowed to hold signal PIC2M_Busy active after it has asserted S2PIC_RdXferDone/S2PIC_WrXferDone if it has not completed the transaction internally. This signal is characterized as a middle timing signal and has a clock domain of CLK.

PIC2M_Err

This signal tells a master that one of its ongoing transactions has caused an error. For read errors, this signal would be active with PIC2M_RdDataAck (explained below). For write errors, this signal can be asserted during or after the transaction over the programmable interface core. More specifically, the error signal can only be asserted after a write transaction has completed over the programmable interface core as long as the PIC2M_Busy signal remains active. At this point, the requesting master can examine the error registers, i.e. BEAR and BESR, of the slave to determine what the error was. This signal is characterized as a late timing signal and has a clock domain of CLK2X.

b. Write Ports for Masters

In accordance with the present invention, a master must be sure it can supply all the Write data it is requesting to transfer. There are no data flow control signals so a master cannot slow or suspend the flow of data being transferred. However, a slave device is permitted to force wait states between data transfers by holding off data acknowledge signals (i.e. PIC2M_WrData Ack). In light of these limitations, master Write ports 602A can output the following signals.

M2PIC_Data

This signal provides the Write transfer data. Generally, the first piece of Write data to be transferred is available by the time the corresponding address request has a chance to reach the slave. In one embodiment, there is a latency of two CLK (or four CLKX2) cycles for address data to pipeline through the programmable interface core. Thus, write data should be ready two CLK cycles after an address request has been issued. Note that in a custom system where slaves have a given minimum response time for writes, the availability of write data can be delayed by this amount.

In one embodiment, the Write transfer data includes 64 bits. However, in other embodiments, less or more bits can be used. In any case, the bus that carries the Write transfer data can be scaled down/up to the appropriate width. Note that this bus may travel a long distance across the programmable interface core so its timing is critical. Thus, this signal is characterized as a late timing signal and has a clock domain of CLK2X.

M2PIC_DataBE[7:0]

This Write transfer data byte enable signal has the same timing as the M2PIC_Data signal and accompanies the Write data as the byte enable qualifiers. In one embodiment, any byte enable pattern, including interleaved bits or all bits off, is allowed. For example, a high speed master could initiate a 16-word burst transfer and turn off all the byte enables on the first data transfer to effectively perform a 14 word burst in one operation instead of 3 operations (8-word burst+4-word burst+1 doubleword). This signal would be 4 bits wide in a 32 bit PIC system. This signal is characterized as a late timing signal and has a clock domain of CLK2X.

M2PIC_DataQual[N:0]

This signal allows for additional information to be transferred with the write data and/or write byte enables. For example, in one embodiment, parity or error correction code bits could be transferred with the write data. Note that each M2PIC_DataQual signal can change with each datum. This signal is characterized as a late timing signal and has a clock domain of CLK2X.

PIC2M_WrDataAck[7:0]

This strobe acknowledges the Write data and allows the next piece of data to be transferred. On the cycle after the PIC2M_WrDataAck signal is asserted, the next data, if any, must be driven. Each PIC2M_WrDataAck bit (in this embodiment, a total of 8 bits) acknowledges the data for its corresponding byte lane. In this manner, a smaller width or slower slave can acknowledge a few byte lanes at a time. However, note that the transaction is acknowledged for all byte lanes even though the byte enable bit is not set for that byte lane. In this manner, the master knows that the datum has been properly written. The dynamic nature of the PIC2M_WrDataAck signal is advantageous because it allows for data to not be contiguous in transfers. In one embodiment, the PIC2M_WrDataAck bits are cycled through in order of increasing byte addresses (i.e. from bit [7] to [0] or from [0] to [7] depending on the system). In a 32 bit system, this signal would be 4 bits wide. This signal is characterized as a late timing signal and has a clock domain of CLK2X.

c. Read Ports for Masters

In a Read operation, a master device must be sure it can receive all the data it is requesting to transfer. There are no data flow control signals so a master device cannot slow or interrupt the flow of data being transferred. However, a slave device is permitted to force wait states between data transfers by holding off data acknowledge signals (i.e. PIC2M_RdDataAck).

Read Port 603A can receive the following signals.

PIC2M_Data

This signal includes the Read data to be transferred. In one embodiment, this includes 64 bits of data. In other embodiments, less or more bits can be transferred. In any case, the bus transferring this signal bus can be scaled down/up to the appropriate size. Because this bus may travel a long distance across the programmable interface core, its timing is critical. Therefore, this signal is characterized as a late timing signal and has a clock domain of CLK2X.

PIC2M_DataQual

This signal refers to Read data transfer qualifiers. In one embodiment, the bit definitions are as follows:

| Bit | Name | Description |
| --- | --- | --- |
| [4:0] | Read Word Address | Specifies which word or doubleword in a cacheline transfer is being sent. Bit [0] is always 0 in a system with a 64 bit data path. |

Note that in one embodiment, the CPU can request transfers up to 32 words in size. Thus, 5 bits of "Read Word Address" are required to support the CPU (logically, this signal cannot define transfers greater than 32 words). This signal is characterized as a late timing signal and has a clock domain of CLK2X.

PIC2M_RdDataAck[7:0]

This read strobe signal qualifies the read data being received. Each PIC2M_RdDataAck bit individually acknowledges the data for its corresponding byte lane, thereby allowing a smaller width or slower slave to acknowledge a few byte lanes at a time. The slave guarantees that all byte lanes will be acknowledged even if the byte enable bit is not set for that byte lane. In addition, the slave can cycle through the PIC2M_RdDataAck bits in order of increasing byte addresses (this could go from bit [7] to [0] or from [0] to [7] depending on the system being big or little endian). Consequently, in a 32-bit PIC system, this signal would be 4 bits wide. This signal is characterized as a late timing signal and has a clock domain of CLK2X.

2. Timing of Master Device

Figure 7:
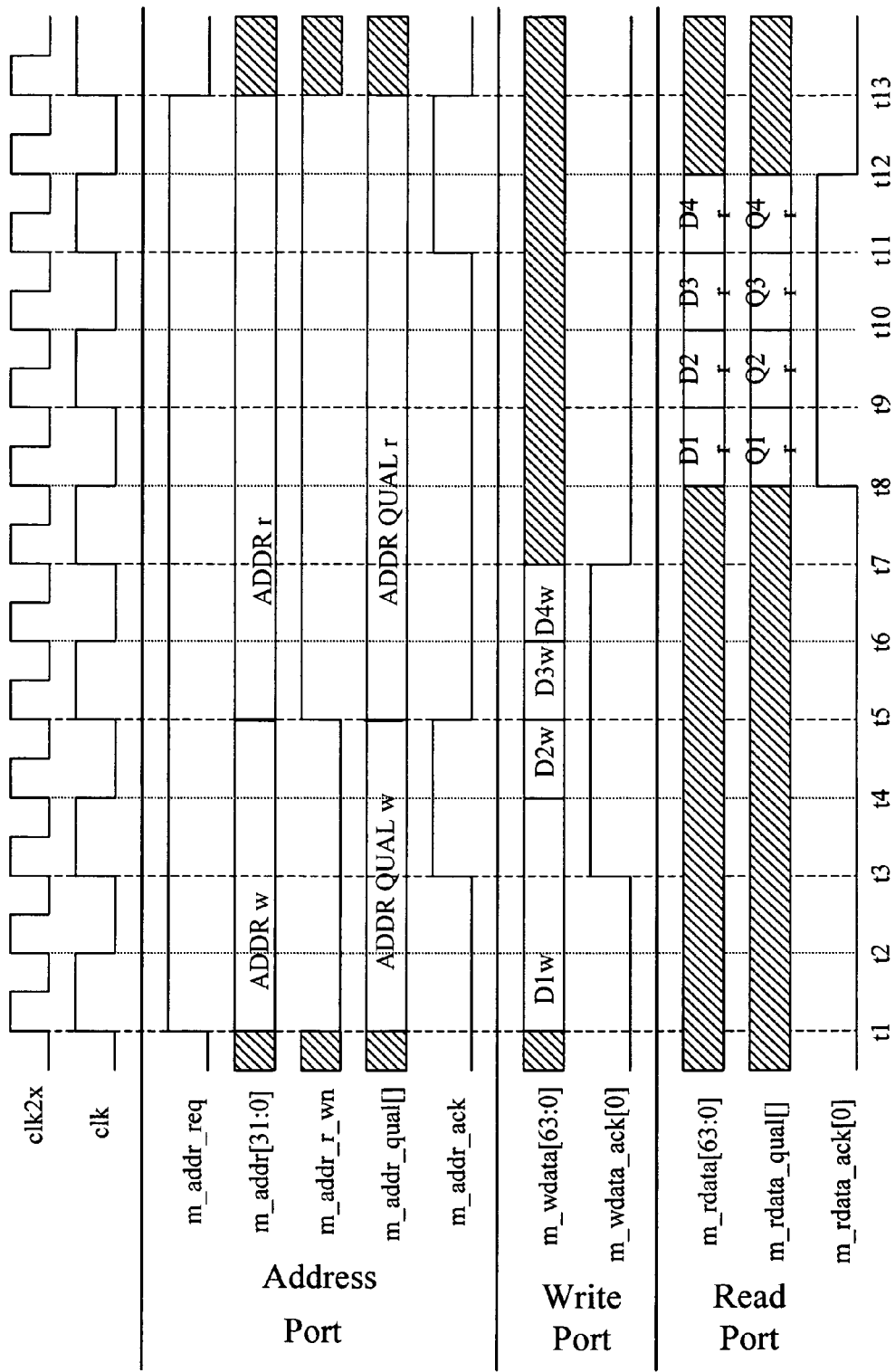
FIG. 7 illustrates a timing diagram of a master during an 8-word Write operation followed by an 8-word Read operation.

FIG. 7 illustrates a timing diagram for a master device generating an 8-word Write operation and then an 8-word Read operation. In the Write operation, a master asserts an address request (m_addr_req) at time t1. At the same time, the master indicates that the transaction is a Write operation (m_addr_r_wn transitions low), and sends the Write address (m_addr[31:0]) as well as the size of the transfer and any other qualifiers (m_addr_qual[ ]).

After a latency of one clock (clk) cycle (latency can vary in other embodiments), the master receives an address acknowledge (m_addr_ack) from the programmable interface core at time t3, thereby allowing the master to begin another transaction at time t5. Note that at time t1, the master also sends the Write data (D1$w$), but waits until after receipt of the address acknowledge (m_addr_ack) at time t3 to continue sending the rest of the Write data (D2$w$, D3$w$, and D4$w$) at times t3, t4, and t5 (latency of one DDR clock (clk2$x$) cycle). (In this embodiment, a word equals 32 bits. Thus, in a 64-bit data path, only 4 64-bit transfers are required.)

In FIG. 7, the Read operation immediately follows the Write operation. Therefore, the address request (m_addr_req) remains at logic 1. However, the master must indicate that the transaction is a Read operation. Thus, m_addr_r_wn transitions high at time t5. In accordance with the pipelining of one embodiment of the present invention, the master can send the Read address (m_addr[31:0]) and address qualifier (m_addr_qual[ ]) at time t5, i.e. before the Write operation is complete at time t7. The master device receives the Read data (D1*r*, D2*r*, D3*r*, and D4*r*) and Read qualifiers (Q1*r*, Q2*r*, Q3*r*, and Q4*r*) starting at time t8 and ending at time t12.

3. Communication Between Slave Device and PIC

Figure 8:
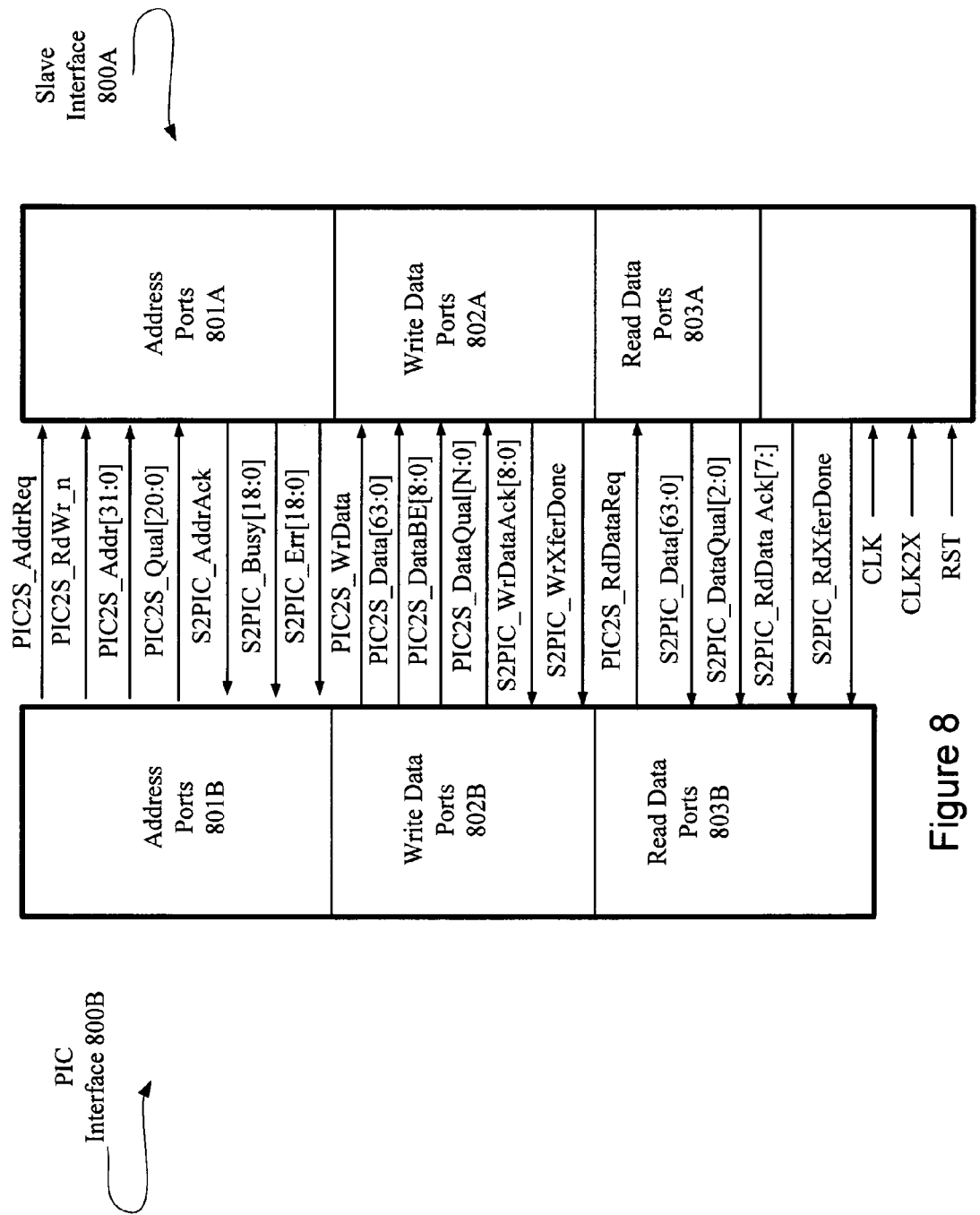
FIG. 8 illustrates an overview of the ports provided for a slave device and the programmable interface core of the present invention and the signals that could be transferred between such ports.

A slave device receives commands to transfer data and performs the Read or Write operation requested by the master devices. FIG. 8 illustrates typical signals that can be transferred between a slave device and the programmable interface core. To facilitate this transfer, the slave device includes an interface 800A having address ports 801A, write data ports 802A, and read data ports 803A. In a similar configuration, the programmable interface core includes a PIC interface 800B having address ports 801B, write data ports 802B, and read data ports 803B. Note that some signals are analogous to those for the master ports (FIG. 6) with their signal directions reversed.

a. Address Ports for Slaves

Address ports 801A can receive the following signals.

PIC2S_AddrReq

This status signal indicates if there is a pending address request from the master. The address (PIC2S_Addr) and address qualifiers (PIC2S_AddrQual, PIC2S_RdWr_n) must also be valid when PIC2S_AddrReq is active. In one embodiment, a logic 1 indicates a request is pending and a logic 0 indicates that a request is not pending. This signal is characterized as a early timing signal and has a clock domain of CLK.

PIC2S_RdWr_n

This signal, which accompanies the address request signal, identifies whether the request is a Read or a Write operation. This signal must be valid on the same cycle that PIC2S_AddrReq is valid. In one embodiment, a logic 1 indicates a READ operation and a logic 0 indicates a WRITE operation. This signal is characterized as an early timing signal and has a clock domain of CLK.

PIC2S_Addr[31:0]

This signal provides the address of the requested transfer. Specifically, the address value points to a specific byte in the memory space and must be valid on the same cycle that PIC2S_AddrReq is valid. Note that the masters provide address values that are aligned with respect to the size of the data transfer. This signal is characterized as an early timing signal and has a clock domain of CLK.

PIC2S_AddrQual[20:0]

This address transfer qualifier signal is specific to the proprietary CPU, in one embodiment the IBM PowerPC 405. As indicated above, this address qualifier information must be valid on the same cycle that the PIC2S_AddrReq signal is valid. This signal is characterized as an early timing signal and has a clock domain of CLK. The bit definitions are as follows:

| Bit | Name | Description |
|---|---|---|
| [20:17] | Master ID | This signal specifies the ID Number of the master currently accessing the slave. This information can be useful, for example, to optimize performance or to modify behavior for specific masters. The user should consider compatibility issues if this signal is utilized because the location of the masters is system specific. |
| [16] | Cacheable Attribute | Cacheability of Data (Set to 0 if unused) |
| [15] | Guarded Attribute | Guard Data (Set to 0 if unused) |
| [14] | User Defined Attribute | User Defined Attribute (Set to 0 if unused) |
| [13] | WriteThru | Write Through Attribute (Set to 0 if unused) |
| [12:11] | Priority | This signal provides a transfer request priority. In one embodiment, the higher the number the more important the request. |
| [10:8] | Transfer Size | 000 = 1 word (1-4 bytes, 32 bit system)<br>000 = 1 doubleword (1-8 bytes, 64 bit system)<br>001 = 4 word burst<br>010 = 8 word burst<br>011 = 16 word burst<br>100 = 32 word burst<br>101-111 = reserved |
| [7:0] | Single Beat Transfer Byte Enables | These are the byte enables provided during a single data beat transfer (Transfer Size = 000). Bits [7:4] are undefined in a 32 bit system. |

Byte enables are provided for single beat transfers to allow devices like the CPU to perform smaller sized reads like byte and halfword reads. This is particularly important in the OPB Bridge, for example, since some OPB devices may only have byte wide registers. For memory devices such as DRAM or SRAM, there is no problem reading in a word or a double word even if only a byte is required so these devices may ignore the Single Beat Transfer Byte Enable. These byte enable bits are also valid for writes even though the information is redundant to the data path byte enables.

Address ports 801A can also output the following signals.

S2PIC_AddrAck

This strobe signal acknowledges the address and retrieves the next address request, if any. On the cycle after the S2PIC_AddrAck signal is asserted, the PIC2S_AddrReq, PIC2S_Addr, PIC2S_RdWr_n, and PIC2S_AddrQual signals a updated to the next address request, if any. This strobe signal is only asserted for one CLK cycle per address request. This signal is characterized as an early timing signal and has a clock domain of CLK.

A slave that wishes to support address pipelining can immediately acknowledge the address information so that the core of the present invention can retrieve the next address. A slave cannot acknowledge a second address request until the slave has completed the data transfer associated with the first request. In other words, the slave can use the pipelined address request to set up the next transfer, but the slave must not acknowledge the second address prematurely.

One exception to this general rule is that a slave is allowed to immediately acknowledge a second request if the second request uses a different data port. For example, a slave can acknowledge a read transfer, then acknowledge a write transfer, and then look at a third address.

S2PIC_Busy [15:0]

This signal tells the master that one of its transactions is ongoing in a slave. Specifically, the slave is responsible for driving the Busy signal back to the corresponding master that initiated the transaction. The interconnect core of the present invention can automatically assert this busy signal to the master until the time the slave issues a S2PIC_RdXferDone or S2PIC_WrXferDone signal (explained below). Alternatively, the slave can continue to drive the busy signal after the S2PIC_Wr/RdXferDone signal to tell the master that the transaction has not completed in the slave (i.e. the transaction is still pending on another bus or is still queued up in the slave). This signal supports the "Sync" or "EIEIO" (Enforce Instruction Execution In Order) instruction in the CPU. In one embodiment, a logic 1 indicates the slave is still busy with a data transfer and a logic 0 indicates the slave has no ongoing transactions. This signal is characterized as a middle timing signal and has a clock domain of CLK.

S2PIC_Err [15:0]

This signal tells the master that one of its ongoing transactions has caused an error. Specifically, the slave is responsible for driving the Err signal back to the corresponding master that initiated the transaction. For read errors this signal would be active with the S2PIC_RdDataAck signal. For write errors, this signal can be asserted anytime during or after (if the S2PIC_Busy signal remains active) the transaction over the core. Slaves that can generate errors can include error registers (such as BEARs and BESRs), thereby allowing the master to find out the cause of the error. This signal is characterized as a late timing signal and has a clock domain of CLK2X.

b. Write Ports for Slaves

The write data ports 802A can receive the following signals.

PIC2S_WrDataReq

The slave waits for this signal to go active before the slave begins to request that the write data be transferred from the master. Because a master must guarantee that it can supply all the data the master wants to write, this signal will not change in the middle of a data transfer. After this signal goes active, it will stay high until the slave asserts the S2PIC_WrXferDone signal. A slave can assert the S2PIC_WrDataAck signal and begin transferring data on the same cycle that the PIC2S_WrDataReq signal goes active. This signal is characterized as an early timing signal and has a clock domain of CLK.

PIC2S_Data[63:0]

This signal includes the Write transfer data. Note that although 64 bits are indicated, this bus can be scaled down to a 32-bit width to be used in a 32-bit system. This bus may travel a long distance across the core so its timing is critical. This signal is characterized as a middle timing signal and has a clock domain of CLK2X.

PIC2S_DataBE[7:0]

This signal has the same timing as the PIC2S_Data signal and accompanies the write data as the byte enable qualifiers. All byte enable patterns including "interleaved" bits or "all bits off" are allowed. Note that in a 32-bit system, this bus can be scaled down to a 4-bit width. Like the Write data, this bus may also travel a long distance across the core so its timing is also critical. This signal is characterized as a middle timing signal and has a clock domain of CLK2X.

PIC2S_DataQual[N:0]

This signal, although typically not required by the CPU, can be provided for the PIC. For example, another CPU or system could benefit from additional information transferred with the write data and/or the write byte enable signals. In one embodiment, this additional information could include parity bits or error correction codes. This signal is characterized as a middle timing signal and has a clock domain of CLK2X.

The write data ports 802A can also output the following signals.

Output: S2PIC_WrDataAck[7:0]

This strobe signal acknowledges the write data and allows the next piece of data to be transferred. The latency between the S2PIC_WrDataAck signal and the next data word being available on the PIC2S_Data signal is system dependent. In one embodiment, the default could be a three CLK2X cycle delay between the S2PIC_WrDataAck signal and the next data being asserted. Each bit of the S2PIC_WrDataAck signal individually acknowledges the data for its corresponding byte lane, thereby allowing a smaller width or slower slave to acknowledge a few byte lanes at a time. Note that the slave must acknowledge all the byte lanes even if the byte enable bit is not set for that byte lane. In addition, the slave must assert the S2PIC_WrDataAck bits in order of increasing byte addresses (this could go from bit [7] to [0] or from [0] to [7] depending on the system being big or little endian). A slow slave device is also permitted to insert gaps between assertions of the S2PIC_WrDataAck signal to control the rate at which the slave transfers data. Consequently, in a 32-bit system, this signal would be 4 bits wide. This signal is characterized as a late timing signal and has a clock domain of CLK2X.

S2PIC_WrXferDone

The slave asserts this signal to indicate that the slave is finished using the write data bus and has transferred all the data. This signal can be asserted on the last cycle of the S2PIC_WrDataAck signal that the slave needs to send. Note that the S2PIC_WrXferDone signal can be asserted before the corresponding write data has arrived via the PIC2S_Data and PIC2S_DataBE signals. This signal is characterized as a middle timing signal and has a clock domain of CLK.

c. Read Ports for Slaves

Read ports 803A can receive the following signals.

PIC2S_RdDataReq

The slave must wait for this signal to go active before the slave can begin to transfer the Read data requested by the master. Because a master must guarantee that it can receive all the data it wishes to read, this signal will not change in the middle of a data transfer. After this signal goes active, it will stay high until the slave asserts the S2PIC_RdXferDone signal. A slave is free to assert the S2PIC_RdDataAck signal and begin transferring data on the same cycle that the PIC2S_RdDataReq signal goes active. This signal is characterized as an early timing signal and has a clock domain of CLK.

Read data ports 803A can also output the following signals.

S2PIC_Data[63:0] (CLK2X, middle)

This signal includes the transferred Read data. This signal can be scaled down to 32 bits in a 32-bit system. This signal is characterized as a middle timing signal and has a clock domain of CLK2X.

S2PIC_DataQual[2:0]

This signal includes the Read data transfer qualifiers. In one embodiment, the bit definitions are as follows:

| Bit | Name | Description |
| --- | --- | --- |
| [4:0] | Read Word Address | Specifies which word or doubleword in a cacheline transfer is being sent. Bit [0] is always 0 in a system with a 64-bit data path. |

In one embodiment, the CPU can request transfers up to 32 words in size. Thus, 5 bits of "Read Word Address" are required to support this CPU. It logically follows that the "Read Word Address" field is therefore undefined for transfers greater than 32 words. Slaves that do not support target word first transfers (i.e. the ability to transfer words in any order) can simply transfer the data in normal sequential order and set the "Read Word Address" bits accordingly. This signal is characterized as a middle timing signal and has a clock domain of CLK2X.

S2PIC_RdDataAck[7:0]

This Read strobe signal qualifies the Read data being received. Each S2PIC_RdDataAck bit acknowledges the data for its corresponding byte lane, thereby allowing a smaller width or slower slave to acknowledge a few byte lanes at a time. The slave must acknowledge all the byte lanes even if the byte enable bit is not set for that byte lane. In addition, the slave must assert the S2PIC_RdDataAck bits in order of increasing byte addresses (this could go from bit [7] to [0] or from [0] to [7] depending on the system being big or little endian). Consequently, in a 32-bit system, this signal would be 4 bits wide. This signal is characterized as a late timing signal and has a clock domain of CLK2X.

S2PIC_RdXferDone (CLK, middle)

This signal is asserted by the slave to indicate that it is finished using the read data bus and has transferred all the requested data. This signal is characterized as an early timing signal and has a clock domain of CLK.

4. Timing of Slave Device

Figure 9:
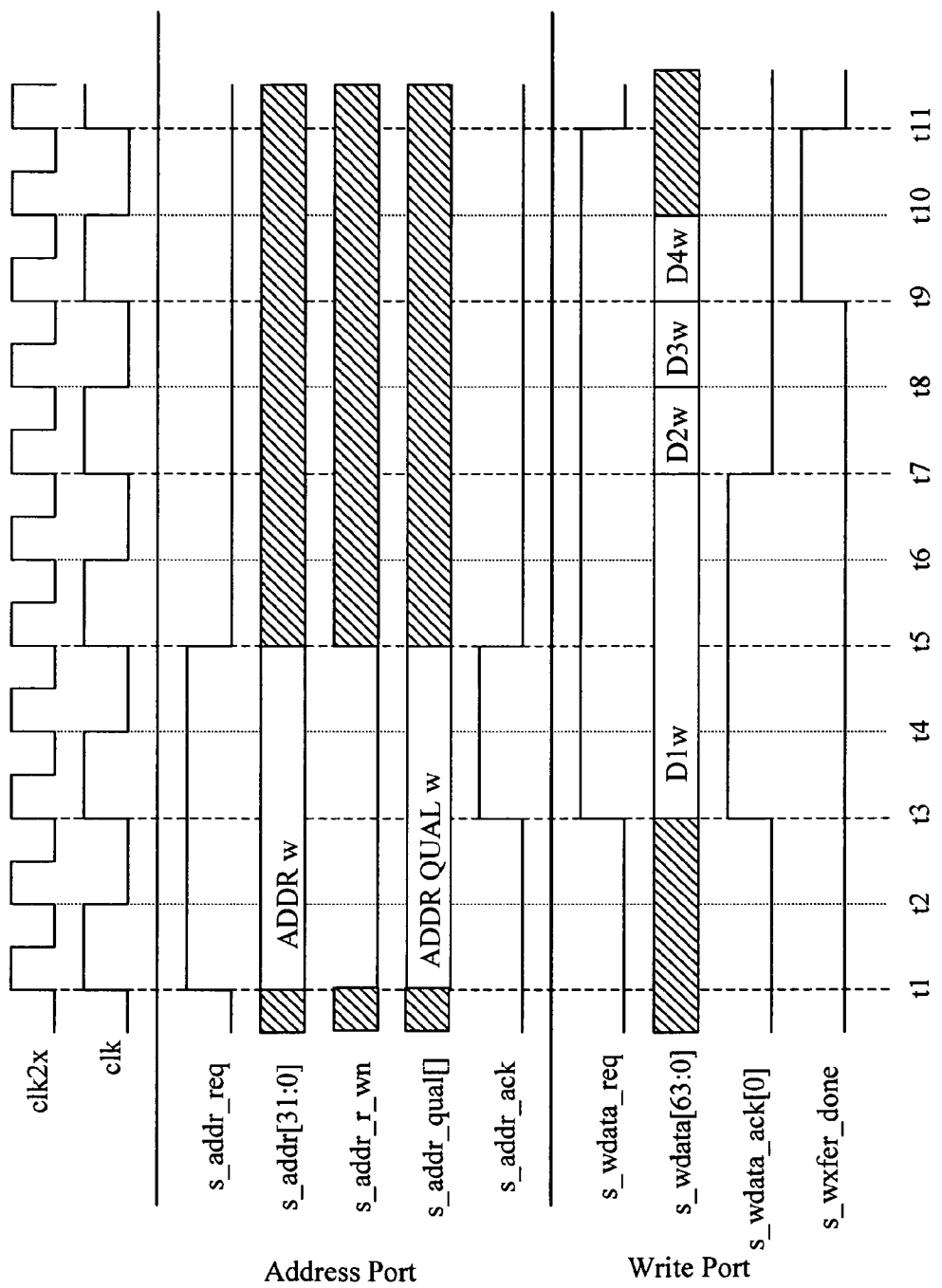
FIG. 9 illustrates a timing diagram of a slave during an 8-word Write operation.

FIG. 9 illustrates a timing diagram of a slave during an 8-word Write operation. At time t1, the slave receives the address request (s_addr_req), the address (s_addr[31:0]), and address qualifier (s_addr_qual[ ]). At time t3, the slave generates the address acknowledge (s_addr_ack), thereby allowing the master to proceed with another transaction, and begins the Write operation of data D1$w$ at time t3. Note that in this embodiment a latency of 2 clock (clk) cycles is provided before the slave writes data D2$w$ at time t7. This latency is based on the pipelining and can vary in other embodiments.

Once the slave begins the Write operation at time t3, the slave asserts a write acknowledge (s_wdata_ack[0]) for the duration needed to write the data (i.e. two clock (clk) cycles). In other words, the slave asks for all the data, and acknowledges the size of the Write transaction before it has actually received the data. In this manner, once the rest of the data (i.e. data D2$w$-D4$w$) is received, the slave can write this data in three DDR cycles, i.e. time t7-t9. After the slave has confirmed that it has received the data for the transaction at time t9 (a latency of one clock (clk) cycle), the slave sends a Write transfer done signal (s_wxfer_done) back to the master. Note that the PIC asserts a Write data request during times t3-t11, which indicates the active Write period to the slave.

Figure 10:
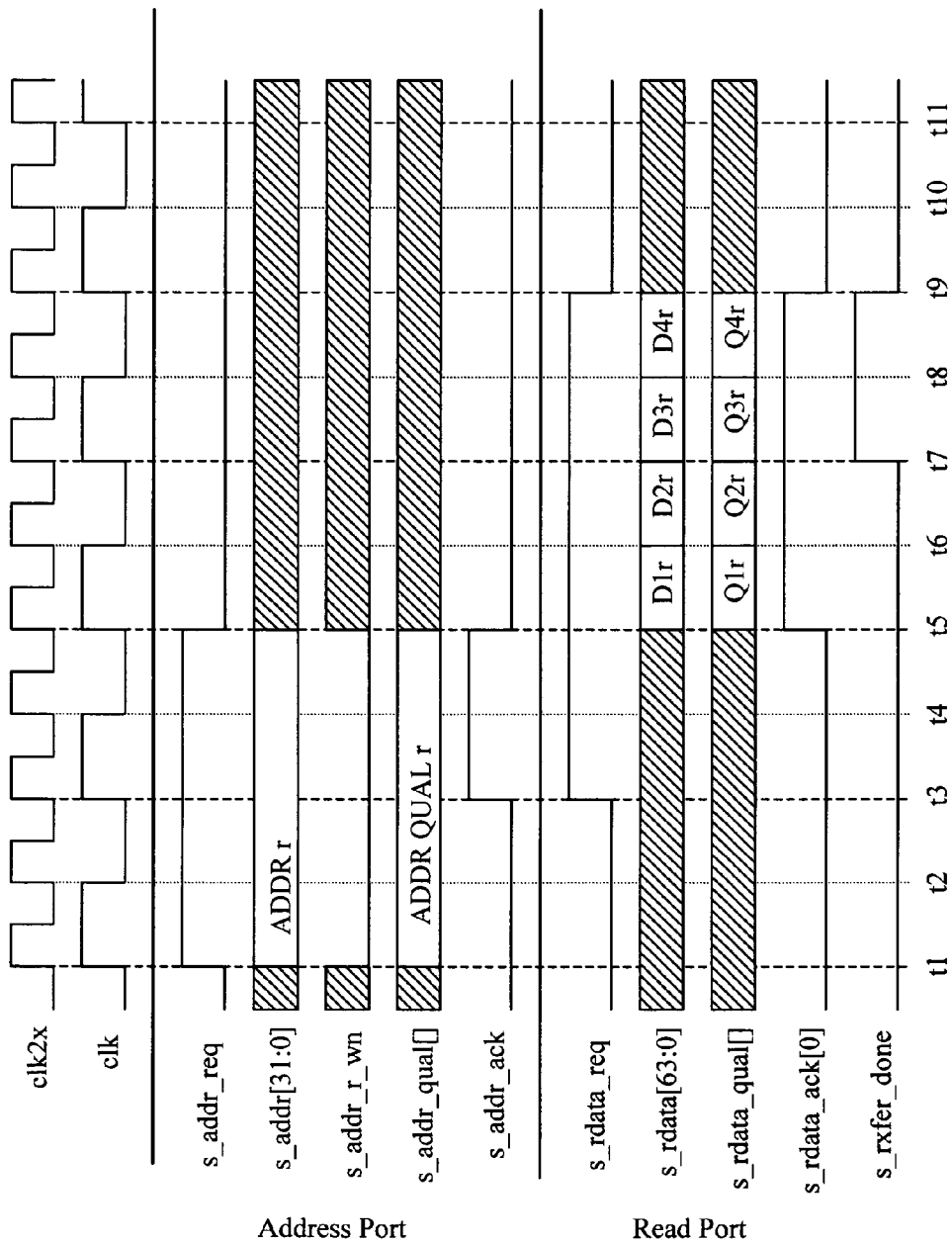
FIG. 10 illustrates a timing diagram of a slave during an 8-word Read operation.

FIG. 10 illustrates a timing diagram of a slave during an 8-word Read operation. At time t1, the slave receives the address request (s_addr_req), the address (s_addr[31:0]), and address qualifier (s_add_qual[ ]). At time t3, the slave generates the address acknowledge (s_addr_ack), thereby allowing the master to proceed with another transaction. Note that because the slave is not waiting for write data from a master, the slave can immediately begin its Read operation after a latency of 1 clock (clk) cycle at time t5.

Once the slave begins the Read operation at time t5, the slave asserts a read acknowledge (s_rdata_ack[0]) for the duration needed to read the data (i.e. two clock (clk) cycles). After a latency of one clock (clk) cycle, the slave sends a Read transfer done signal (s_rxfer_done) back to the master. Note that the slave asserts a Read data request during times t3-t9, which indicates the active Read period for the slave.

B. Programmable Interface Core

Figure 11A:
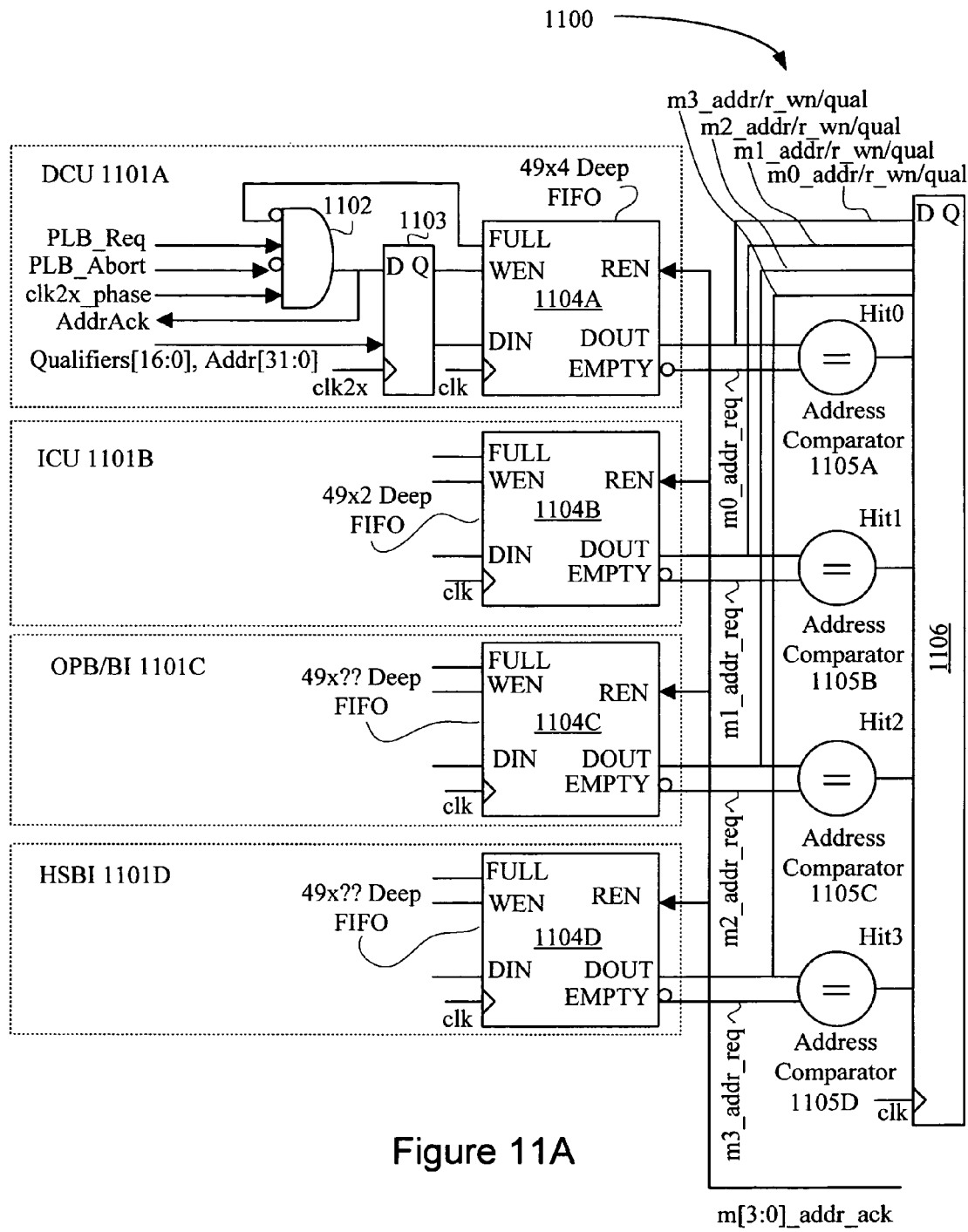
FIGS. 11A and 11B illustrate one embodiment of address/control logic in a programmable interface core in accordance with the present invention, the path including various address/control signals associated with the core.
Figure 11B:
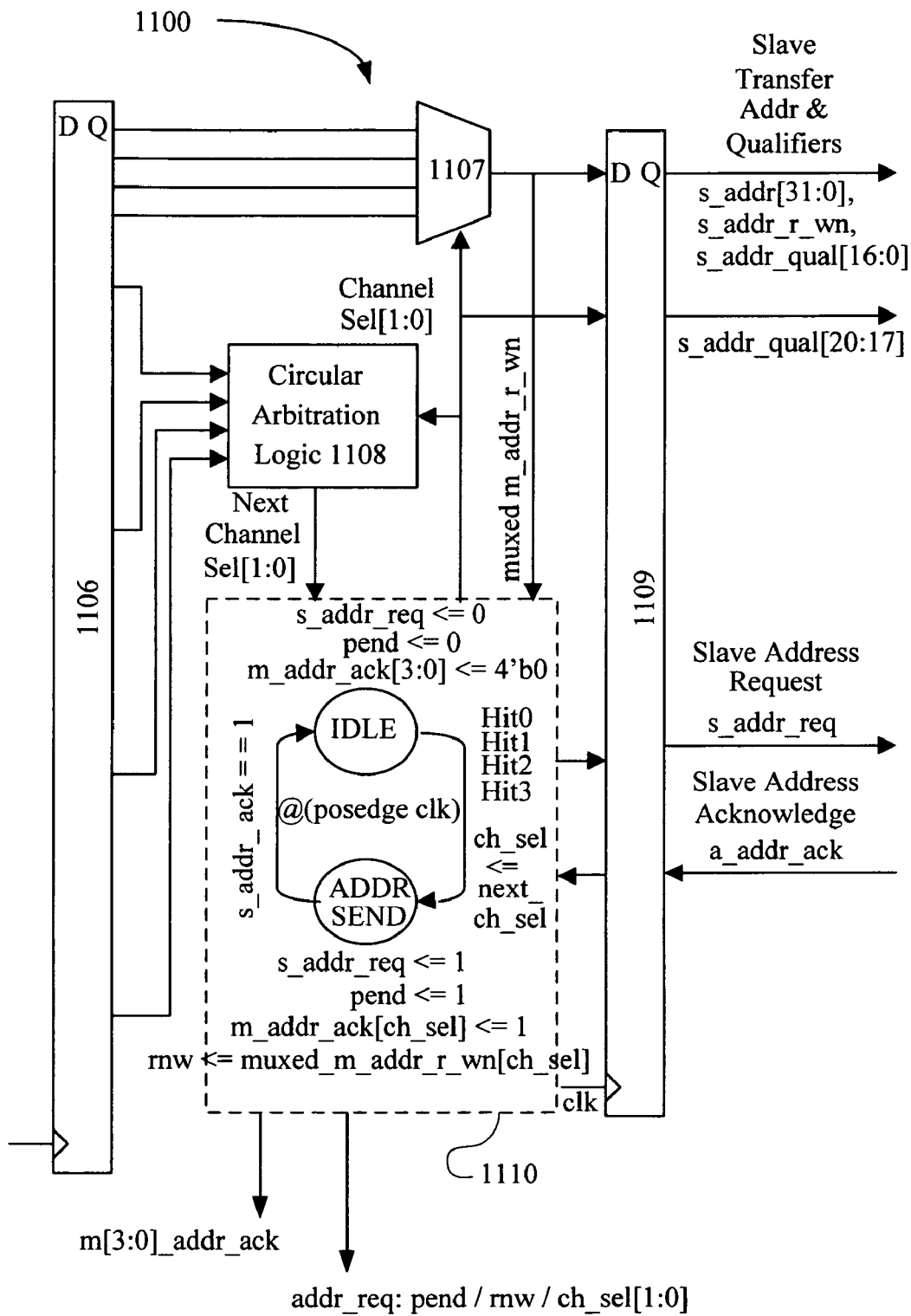

FIGS. 11A and 11B illustrate one embodiment of an address/control path in a programmable interface core (PIC) including various address/control signals associated with the PIC. In FIGS. 11A and 11B, four master devices are shown: a DCU 1101A (the data cache unit of the CPU), an ICU 1101B (the instruction cache unit of the CPU), an OPB slave (Bridge In) 1101C, and a high-speed bus interface (HSBI) 1101D. In this embodiment, each master 1101 provides its requests to a first-in first-out (FIFO) register 1104. Thus, requests from the master 1101 are queued in FIFO 1104.

Circuitry for activating and writing to registers 1102 that is shown in master device 1101A can be duplicated for master devices 1101B-1101D. Specifically, each master device 1101 can include a logic gate 1102, for example an AND gate, for activating a plurality of flip-flops 1103 (shown as one flip-flop for simplicity). Based on the control signals received by logic gate 1102, the appropriate control signal is provided to the Write enable (WEN) terminal of register 1104. Register 1104, when full, asserts the appropriate logic signal on its FULL terminal, which in turn is provided to logic gate 1102 to deactivate the WEN of register 1104.

Flip-flop 1103 also receives the address and address qualifiers for the transaction. Note that flip-flop 1103 can receive this information at DDR, i.e. at clk2$x$, whereas FIFO 1104 receives this information at the standard FPGA clock, i.e. clk. FIFOs 1104A-104D provide their respective addresses to a plurality of address comparators 1105A-1105D in PIC 1100. Each address comparator 1105 decodes its incoming address and compares the decoded address with its stored addresses of the slave devices in the FPGA.

As described previously, in one embodiment, only the upper bits of the address identify the slave device, whereas the lower bits identify the memory address in the slave device. In this manner, address comparators 1105 can quickly determine which slave device is being requested. Once a "hit" is determined, i.e. the requested slave is identified for the transaction, the slave identification information is provided to a plurality of registers 1106, which in turn transfer the information to arbitration logic 1108. Note that the address qualifiers associated with the addresses are not encoded and therefore do not pass through address comparators 1105. In one embodiment, the address qualifiers are transferred from FIFOs 1104 directly to registers 1106, and then to a multiplexer 1107.

Multiplexer 1107 selectively chooses which address qualifier is output to another set of registers 1109. Note that registers 1109, like registers 1106, can provide the pipelining of the present invention. Other embodiments of the present invention can include fewer or more registers. Multiplexer 1107 is controlled by a state machine 1110, which in turn receives inputs from circular arbitration logic 1108 and from multiplexer 1107. (Note that once state machine 1110 selects the appropriate master, state machine 1110 then needs to know if the selected master is requesting a read or write transaction). Initially, state machine 1110 is in an idle state in which it tells the slave devices (via registers 1109) that no requests are pending. After receiving the selected address request provided by arbitration logic 1108, state machine 1110 enters the address send state in which the "channel" is set. In other words, state machine 1110 acknowledges the selected master device for the transaction and proceeds to send the address request and address qualifiers to the appropriate slave device. Once the slave device receives the address request, the slave can acknowledge the receipt, thereby resetting state machine 1110 to the idle state. In this manner, state machine 1110 can look at the next transaction. Note that if the next transaction is for the slave currently involved in the present transaction, then the slave will not send its acknowledge until the present transaction completes.

Figure 12A:
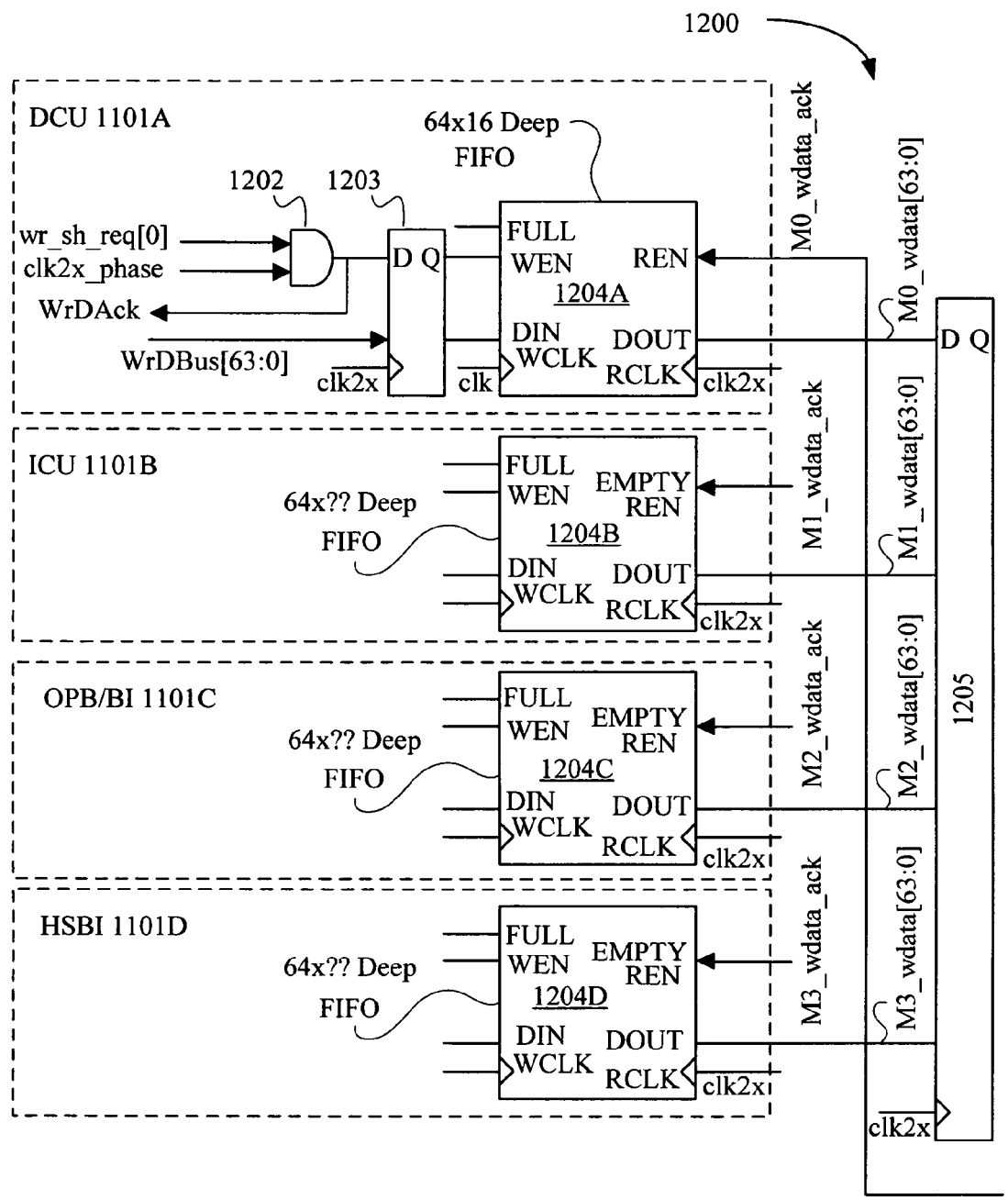
FIGS. 12A and 12B illustrate one embodiment of the circuitry associated with write data logic in accordance with the present invention, the logic including various write signals associated with the core.
Figure 12B:
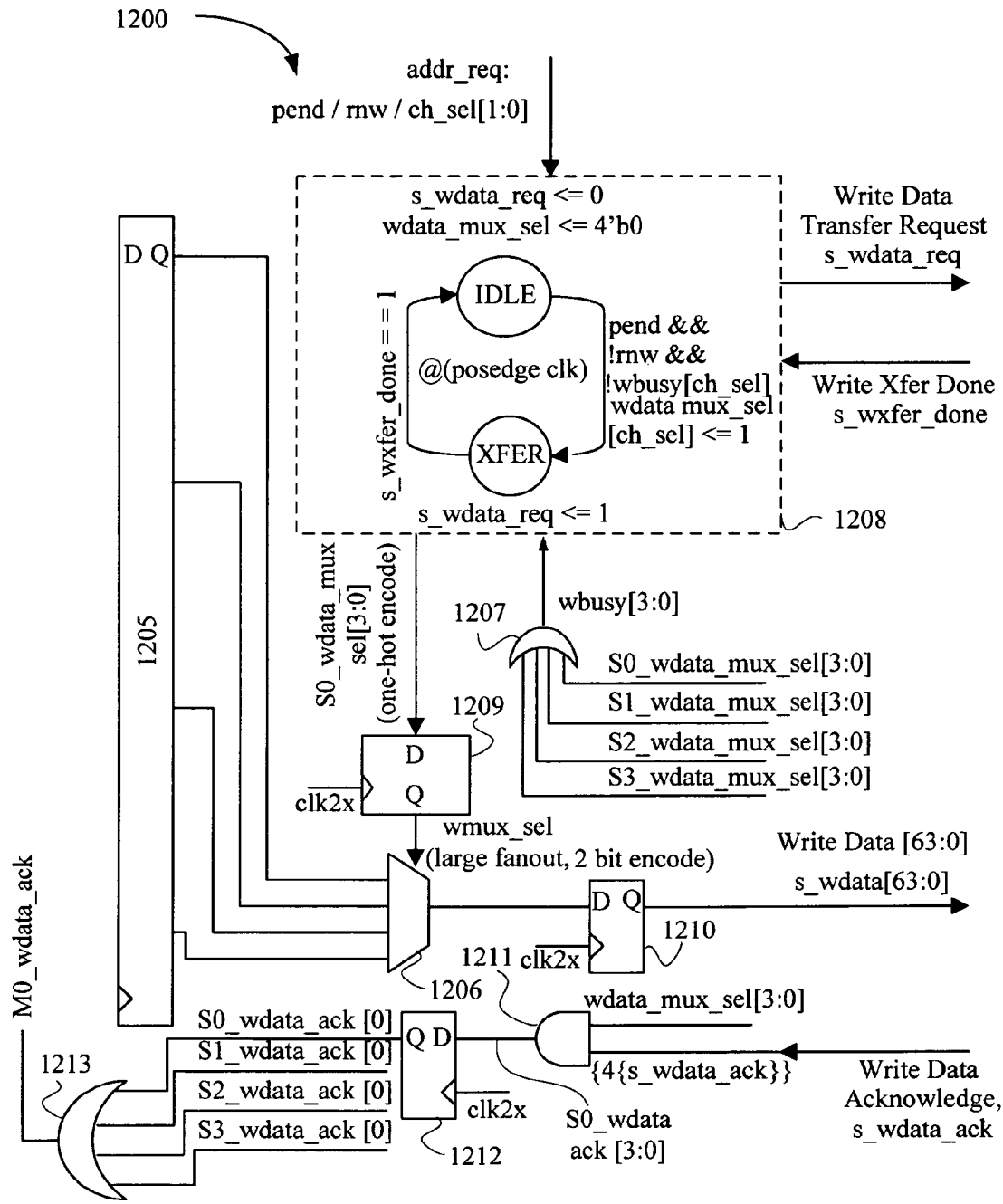

FIGS. 12A and 12B illustrate one embodiment of the circuitry associated with a write data path in accordance with the present invention. In FIG. 12A illustrates the same four master devices shown in FIG. 11A: DCU 1101A, ICU 1101B, OPB slave 1101C, and high-speed bus interface (HSBI) 1101D. In this embodiment, each master 1101 provides its data to a first-in first-out (FIFO) register 1204. Thus, requests from the master 1101 are queued in FIFO 1204.

Circuitry for transferring data to FIFOs 1204 that is shown in master device 1101A can be duplicated for master devices 1101B-1101D. Specifically, each master device 1101 can include a logic gate 1202, for example an AND gate, for activating a plurality of flip-flops 1203 (shown as one flip-flop for simplicity). Based on the control signals received by logic gate 1202, the appropriate control signal is provided to the Write enable (WEN) terminal of FIFO 1204.

Flip-flop 1203 also receives the data for the transaction. Note that flip-flop 1203 can receive this information at DDR, i.e. at clk2*x*, whereas FIFO 1204 receives this information at the standard FPGA clock, i.e. clk. FIFOs 1204A-1204D provide their respective data to a plurality of registers 1205 for pipelining and then to a multiplexer 1206. Note that the implementation of flip-flops versus FIFOs can be dependent on the application. For example, if the master can keep up with the full DDR rate of write data, then flip-flops can be used. However, if the master cannot keep up with the full DDR rate, then the write data can be sent to a FIFO, thereby allowing the master to process the write data at its own pace.

Multiplexer 1206 selectively chooses which data is output to another pipeline register 1210 along the data path. Note that in a full crosspoint implementation of PIC 1200, a state machine 1208, multiplexer 1206, and pipeline register 1210 can be replicated for each slave device. Multiplexer 1206 is controlled by state machine 1208 (via flip-flop 1209), which in turn receives inputs from the slaves indicating whether this data path is currently being used. If the path is being used (in this case, a logic 1 signal asserted), then the data path is "busy" and state machine 1208 will not allow another master to begin a write operation on that same data path.

Initially, state machine 1208 is in an idle state in which it tells the slave devices that no write requests are pending. Note that if the write data resource is busy because another slave is using it, then state machine 1208 must stay in IDLE. After receiving a write request, state machine 1208 enters a transfer state, thereby activating multiplexer 1206 (which is associated with the data path to one slave device) to send data. Once the slave device receives the data, the slave can acknowledge the receipt by providing an appropriate logic signal to logic (AND) gate 1211. Note that logic gate 1211 and pipeline register 1212 are replicated by the number of slave devices. Logic gate 1211 also receives a multiplexer select signal. In other words, only one of the logic gates 1211 receives active signals for both the multiplexer select signal and the write acknowledge. The outputs of registers 1212 are then provided to OR gate 1213, which in turn provides the write acknowledge signal to one of masters 1101 (in this case, master device 1101A). After the write transaction is complete, the slave sends a write transfer done signal to state machine 1208, thereby allowing state machine 1208 to re-enter its idle state.

Figure 13A:
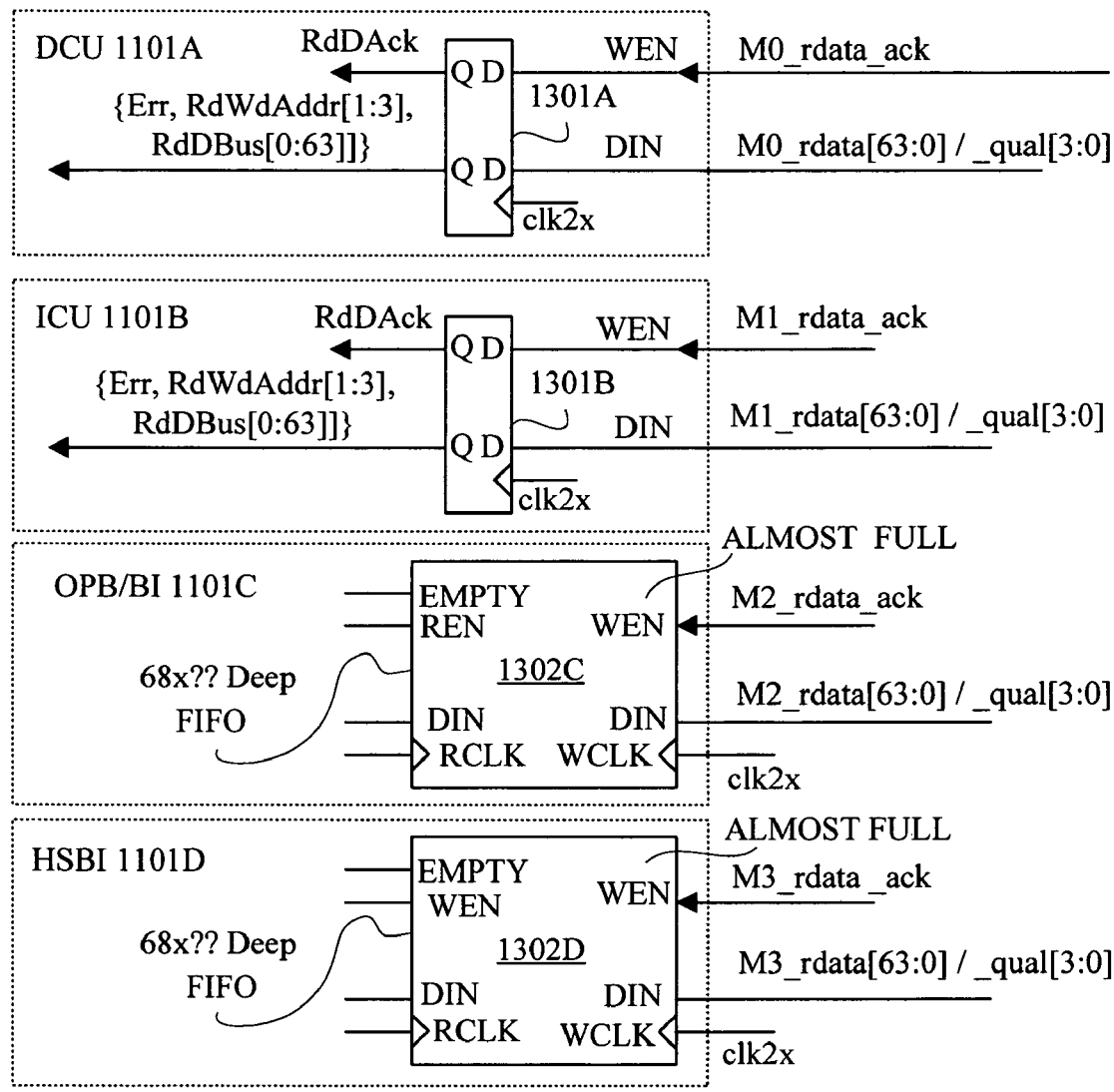
FIGS. 13A and 13B illustrate one embodiment of the circuitry associated with read data logic in accordance with the present invention, the logic including various read signals associated with the core.
Figure 13B:
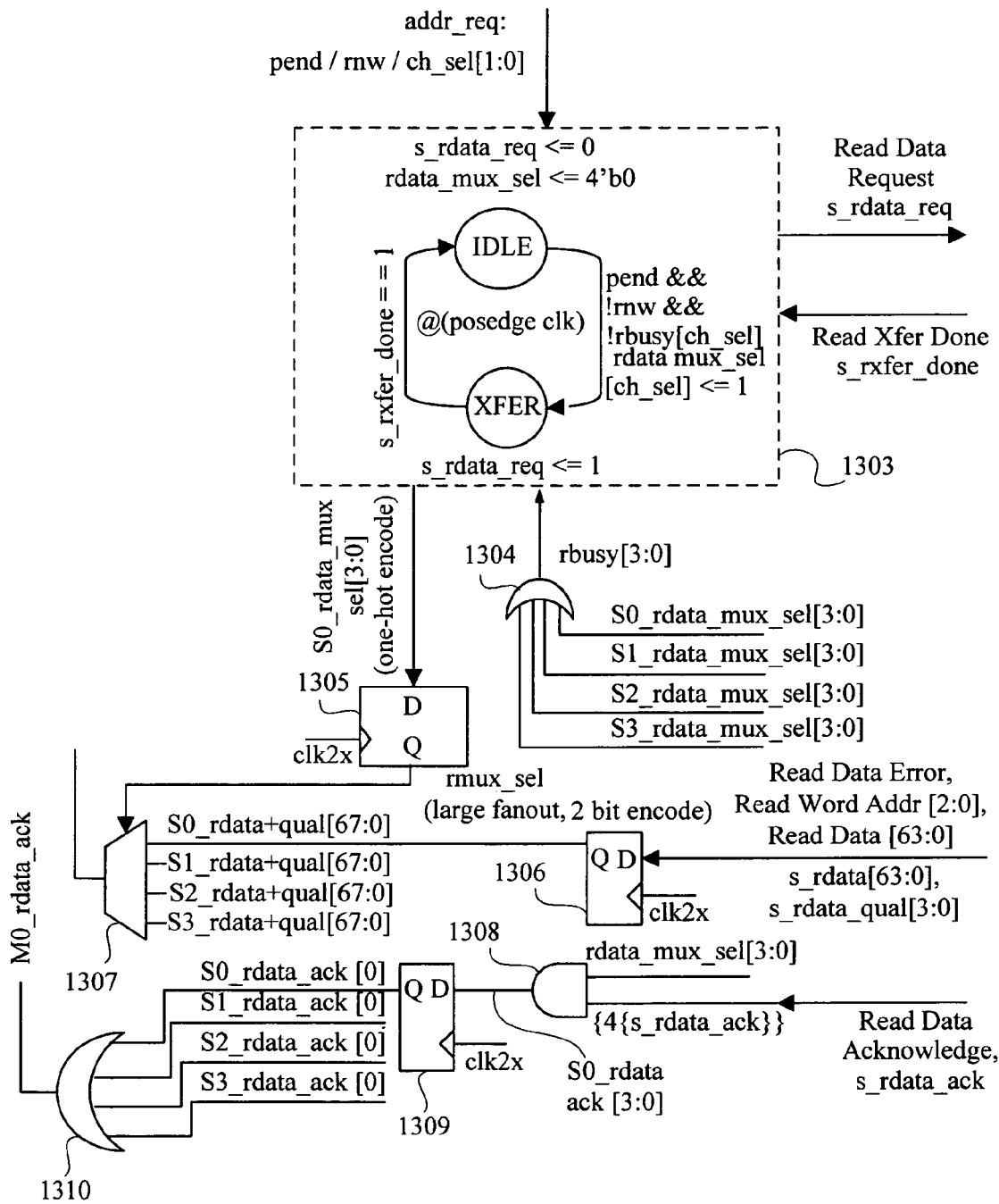

FIGS. 13A and 13B illustrate one embodiment of the circuitry associated with a read data path in accordance with the present invention. In FIG. 13A, the same four master devices are shown as in FIG. 11A: DCU 1101A, ICU 1101B, OPB slave 1101C, and high-speed bus interface (HSBI) 1101D. In this embodiment, master devices 1101A and 1101B include flip-flops 1301A and 1301B, respectively, for receiving their read data, whereas master devices 1101C and 1101D include first-in first-out (FIFO) registers 1302C and 1302D, respectively, for receiving their read data. Note that the implementation of flip-flops versus FIFOs can be dependent on the application. For example, if the master can keep up with the full DDR rate of read data, then flip-flops can be used. However, if the master cannot keep up with the full DDR rate, then the data can be sent to a FIFO, thereby allowing the master to process the read data at its own pace.

Initially, state machine 1303 is in an idle state in which it tells the slave devices that no read requests are pending. This state is determined by a plurality of read multiplexer select signals provided to an OR gate 1304. If any one of these multiplexer select signals is active high, thereby indicating that the read data path is active, state machine 1303 remains in the idle state. After receiving a read request and confirming that the read data path is inactive, state machine 1303 enters a transfer state, thereby activating multiplexer 1307 (which is associated with the data path to one master device) to send data. Note that flip-flop 1306 provides pipelining in the read data path. Thus, to ensure substantially equal delay between the slave device (not shown) and flip-flop 1306 and between state machine 1303 and flip-flop 1306, a flip-flop 1305 is added in the control path to flip-flop 1306.

Once the slave device receives the request, the slave can acknowledge the request by providing an appropriate logic signal to logic (AND) gate 1308. Note that logic gate 1308 and pipeline register 1309 are replicated by the number of slave devices. Logic gate 1308 also receives a multiplexer select signal. In other words, only one of the logic gates 1308 receives active signals for both the multiplexer select signal and the read acknowledge. The outputs of registers 1309 are then provided to OR gate 1310, which in turn provides the read acknowledge signal to one of masters 1101 (in this case, master device 1101A). After the write transaction is complete, the slave sends a write transfer done signal to state machine 1208, thereby allowing state machine 1208 to re-enter its idle state.

Of importance, and exemplified by the circuitry shown in FIGS. 11A/11B, 12A/12B, and 13A/13B, the present invention minimizes the amount of logic between pipelined registers. In this manner, both the address/control and data paths are "balanced". In other words, logic and pipelined registers along both paths are evenly distributed, thereby ensuring that delays between registers (or logic) are substantially the same. In turn, this set timing can simplify the logic of the paths.

C. DCU/ICU: Interface to PLB

Figure 14:
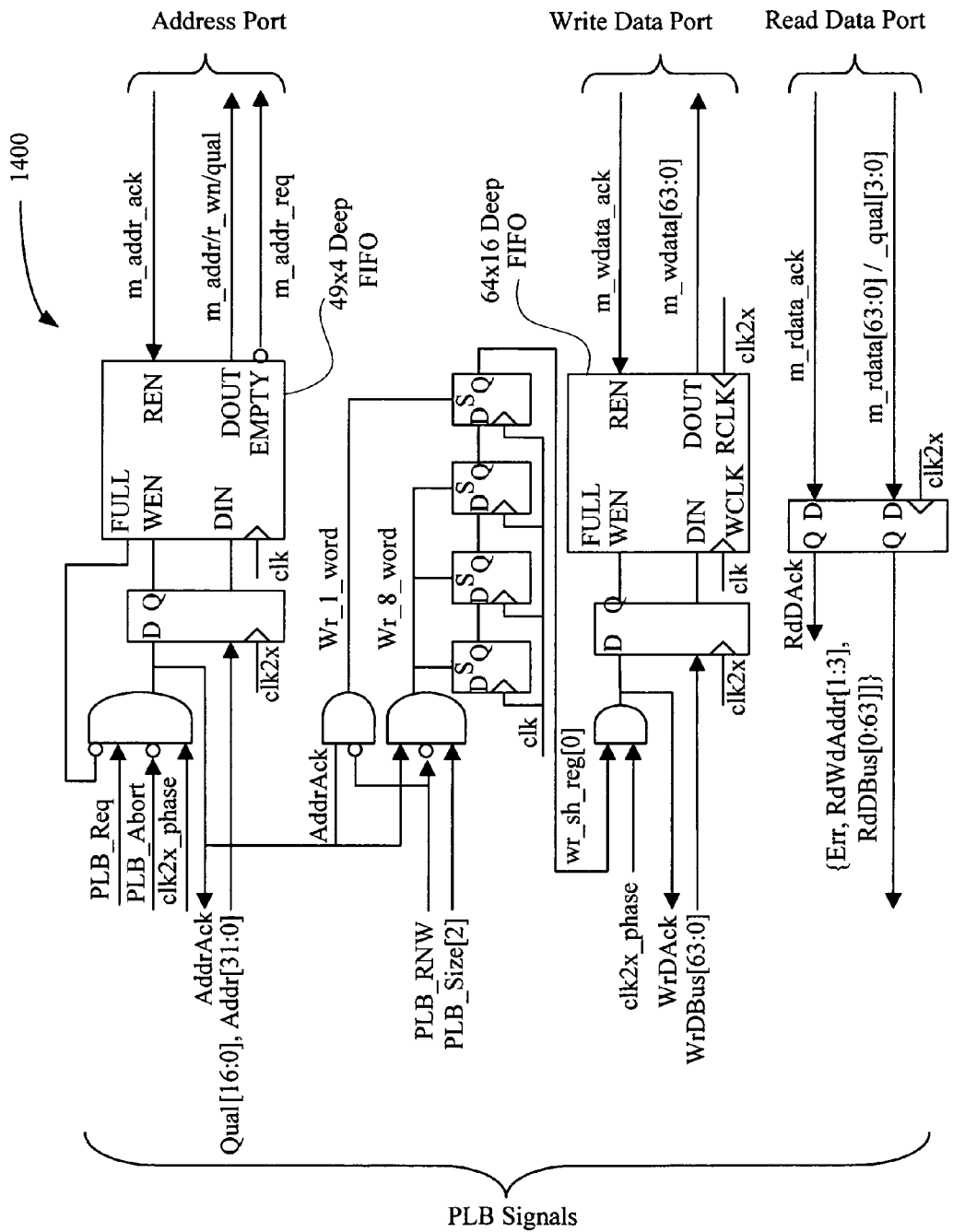
FIG. 14 illustrates one embodiment of the interface of the data cache unit or instruction cache unit to the processor local bus.

FIG. 14 illustrates one embodiment of the data cache unit (DCU) (or instruction cache unit (ICU)) interface to the PLB. This type of interface is known in the art and is proprietary to the CPU being used in the design. Note that because the present invention is applicable to any CPU, interface 1400 will vary based on the CPU being used. In FIG. 14, an interface 1400 is shown for use with the IBM PowerPC 405 CPU.

D. Block RAM: Interface to PIC

Figure 15:
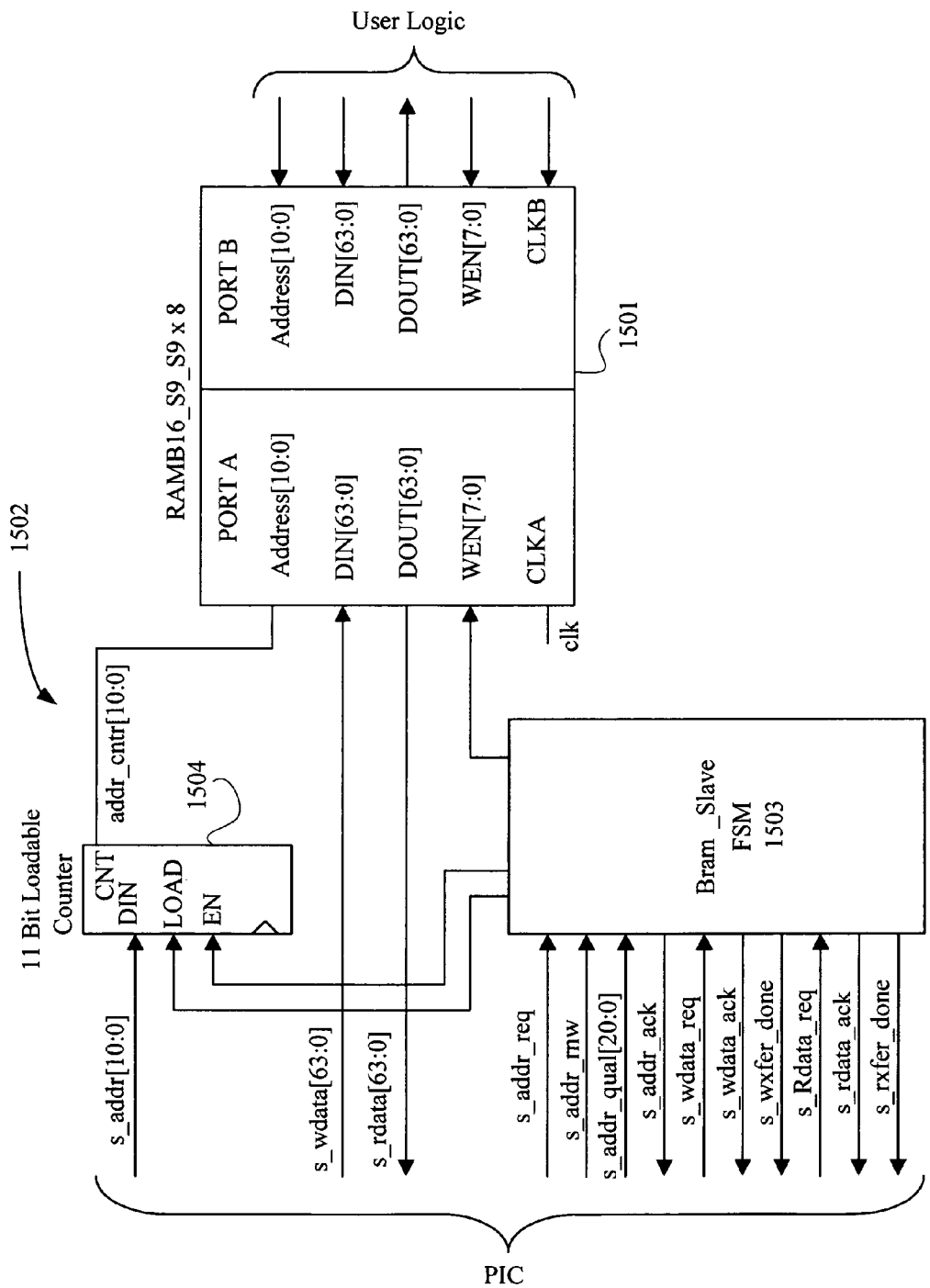
FIG. 15 illustrates the interface of a block RAM (BRAM) having dual port functionality to the programmable interface core of the present invention.

FIG. 15 illustrates a block RAM (BRAM) 1501 having two ports A and B, wherein each port has its own clocking, control, address, read/write function, and data width, thereby allowing independent read/write capabilities. In this embodiment, port B is coupled to the user logic on the FPGA and port A is coupled to an interface 1502. Interface 1502 receives signals from and provides various signals to the PIC via a finite state machine (FSM) 1503. In turn, FSM 1503 controls the write enable of port A in BRAM 1501. Interface 1502 further includes a counter 1504 for receiving a plurality of addresses from the PIC and providing a particular address based on its counter. Note that the load and enable features of this counter are also controlled by FSM 1503. In this manner, although various addresses can be loaded, FSM 1503 determines when they are provided to BRAM 1501. The write and read data terminals of port A are coupled to the PIC.

BRAM 1501 allows simultaneous access of the same memory cell from both port A and port B. Thus, when one port writes to a given memory cell, the other port cannot address the same memory cell during that write operation. Note that to deal with conflict resolution, the user could design user logic and software to address issues of data coherency and synchronization.

E. OPB Bridge Modules

1. OPB Bridge-Out Module

Figure 16:
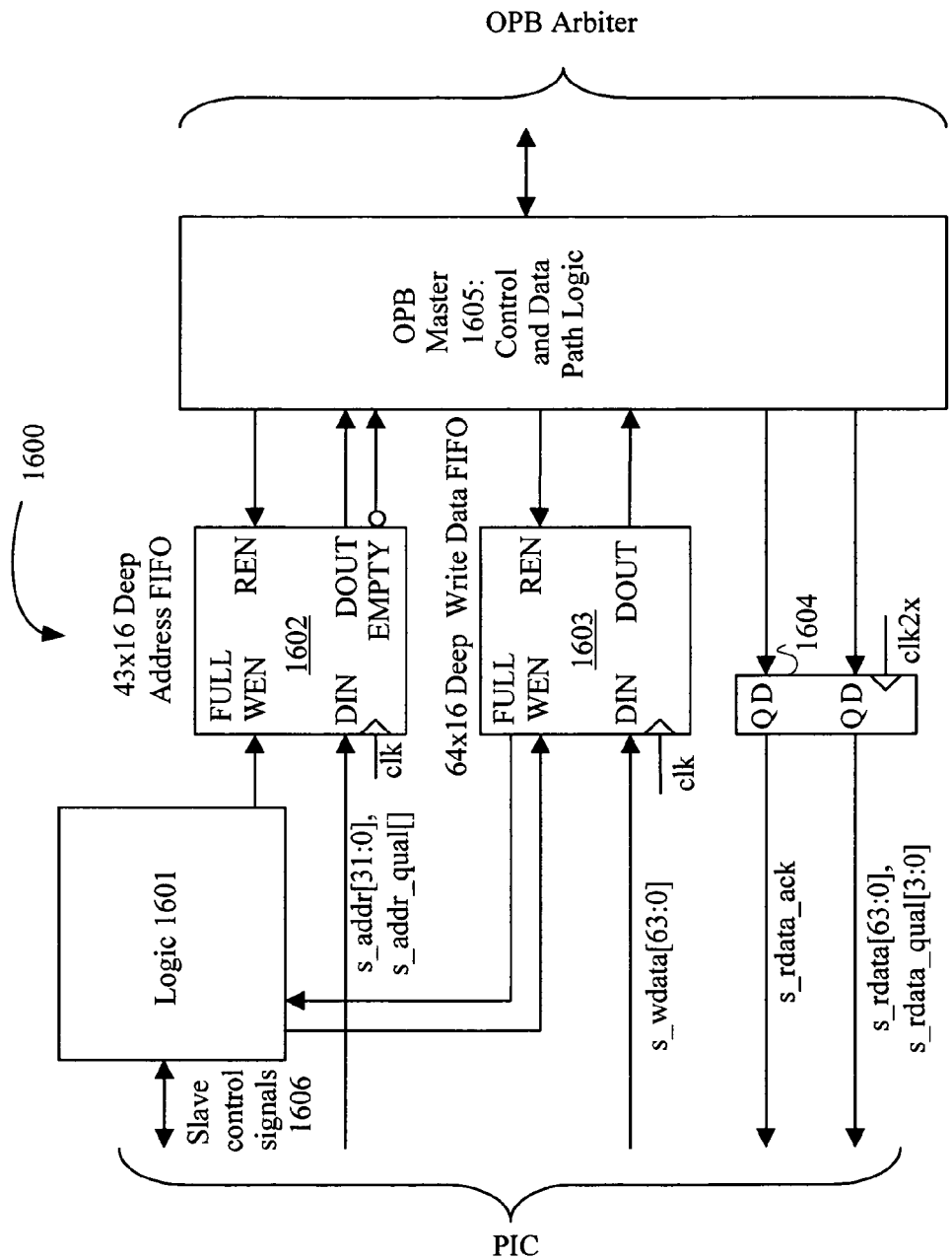
FIG. 16 illustrates a high-level diagram of one embodiment of a bridge-out module in the programmable interface core in accordance with the present invention.

The OPB/BO is a bridge-out module acting as a slave device to the programmable interface core (PIC) and a master device to the OPB. FIG. 16 illustrates a high-level diagram of one embodiment of a bridge-out module 1600 that uses a pipelined architecture to enable it to operate at high clock frequencies on the OPB master interface. In one embodiment, OPB/BO supports 64-bit DDR data paths on the PIC side and 32-bit byte enable transfers on the OPB side. Bridge-out module 1600 includes logic 1601 to decode PIC transfer requests and FIFOs 1602 and 1603 to queue transactions. Specifically, write transactions with dynamic byte enables can be queued up in FIFOs 1602 and 1603 to offload the data from the PIC master (not shown) without having to wait for OPB transfers to complete. Bridge-out module 1600 also includes a plurality of status registers included as part of the control and data path logic of OPB master 1605. These status registers can record any OPB errors that result from transactions initiated by the PIC masters. OPB master 1605 further includes the logic to properly generate error and busy signals back to each PIC master.

In a write operation including bridge-out module 1600, the programmable interface core (PIC) issues a write command (one of slave control signals 1606) that is decoded by logic 1601. If decode logic 1601 determines that bridge-out module 1600 is not busy performing another transaction, decode logic 1601 begins transferring the data into write data FIFO 1603. Decode logic 1601 also loads the address and transfer qualifiers into address FIFO 1602. Bridge-out module 1600 will stall any further data transfers when FIFOs 1602/1603 become full. In one embodiment, write data FIFO 1603 is 64 bits wide, but can be written with a 32-bit or 64-bit wide quantity of data depending on the size of the transfer.

A separate group of logic that is connected to a port of OPB master 1605 polls Address FIFO 1602 for pending transactions. If Address FIFO 1602 is not empty, a transaction request is read from it. The address, transfer size, and read/write information is sent to a state machine within OPB master 1605 that begins the OPB data transfer process. The OPB transfer logic within OPB master 1605 requests bus access to the OPB and begins the write transfer when OPB master 1605 is granted the OPB bus. If the transfer is a burst (i.e. more than one fullword), the appropriate signals (such as bus lock and sequential address signals) are asserted to perform an OPB write burst. Write data is transferred out of write data FIFO 1603 to supply data to the OPB. When the transfer is completed, Address FIFO 1602 is again polled for additional transfer requests. Any acknowledge or timeout conditions are signaled back to the corresponding PIC Master with the BEAR/BESR (not shown) updated.

In a read operation including bridge-out module 1600, the read transfer request is decoded by logic 1601 and then queued up in address FIFO 1602, assuming it is not full. Logic in OPB master 1605 that polls address FIFO 1602 sees the pending read request and executes the read transfer over the OPB. If more than one fullword is to be read, then a burst read operation is performed. The read data is returned back to the PIC master via flip-flop 1604. Once again, any acknowledge or timeout conditions are signaled back to the corresponding PIC master with the BEAR/BESR updated.

The logic within OPB master 1605 interfacing with the OPB is preferably designed to meet the OPB performance goals of the design. Specifically, because the OPB uses single cycle handshaking protocols, it is important that outputs of OPB master 1605 be driven directly out of a flip-flop. In other words, for worst-case analysis, all signals should be assumed to have late timing and thus should be register-driven to provide maximum propagation time across the OPB. Additionally, in one embodiment, signals being received by OPB master 1605 traverse no more than one level of logic before being registered again, thereby maximizing the amount of time for signals to propagate across the OPB to a slave module and then back to bridge-out module 1600.

In bridge-out module 1600, address and write data FIFOs 1602/1603 can be designed to run at high clock rates. In one embodiment, the FIFO designs are based on Shift Register Look-Up-Table (SRL) FPGA primitives and require a synchronous relationship between the read and write ports. Note that the implementation of an SRL-based FIFO typically includes an up/down counter that controls which shift register tap is accessed. The counter counts up if the FIFO is written but not read, and it counts down if the FIFO is read but not written. Otherwise the counter is not changed. Because of their simplicity, an SRL-based FIFO typically does not support any protection mechanism. Thus, if the FIFO is read when empty or written when full, then an unrecoverable error may occur. To prevent this from occurring, logic 1601 should be designed to ensure that FIFOs 1602/1603 are used properly.

As described above, bridge-out module 1600 can use fullword byte enable transfers. To provide higher performance and lower area, bridge-out module 1600 can eliminate the "dynamic bus sizing" functionality utilized by legacy OPB devices. Therefore, in this embodiment, the OPB modules connected to bridge-out module 1600 would use the fullword byte enable transfer protocol.

However, in light of the FPGA fabric, bridge-out module 1600 can be easily customized to provide different tradeoffs between performance and logic utilization. For example, address FIFO 1602 can be removed and write data FIFO 1603 can be simplified if posted write operations are not supported. Further logic reductions can be made by simplifying the logic in OPB master 1605 that handles error and busy signals. Note that these modifications may lower performance because transactions cannot be queued inside bridge-out module 1600, but would significantly reduce area.

In accordance with another embodiment of the invention, address FIFO 1602 and write data FIFO 1603, instead of being designed with SRL FIFOs, are converted to block RAM (BRAM) based FIFOs to reduce logic utilization. Moreover, BRAM FIFOs have higher clock-to-out delays, thereby potentially reducing the maximum OPB clock rate that can be achieved. BRAM FIFOs can also be used to implement asynchronous FIFOS, thereby advantageously allowing the OPB clock to be decoupled from the clock of the bridge-out module 1600.

If decoupling is desired, then the logic in OPB Master 1605 can be designed in a simple, straightforward fashion, assuming highest performance is not required. Specifically, at slower OPB clock rates (such as half the clock rate of bridge-out module 1600), much of the logic can be designed to include multi-cycle paths or allow more levels of logic to be used, thereby significantly reducing the logic utilization of the design.

2. OPB Bridge-In Module

Figure 17:
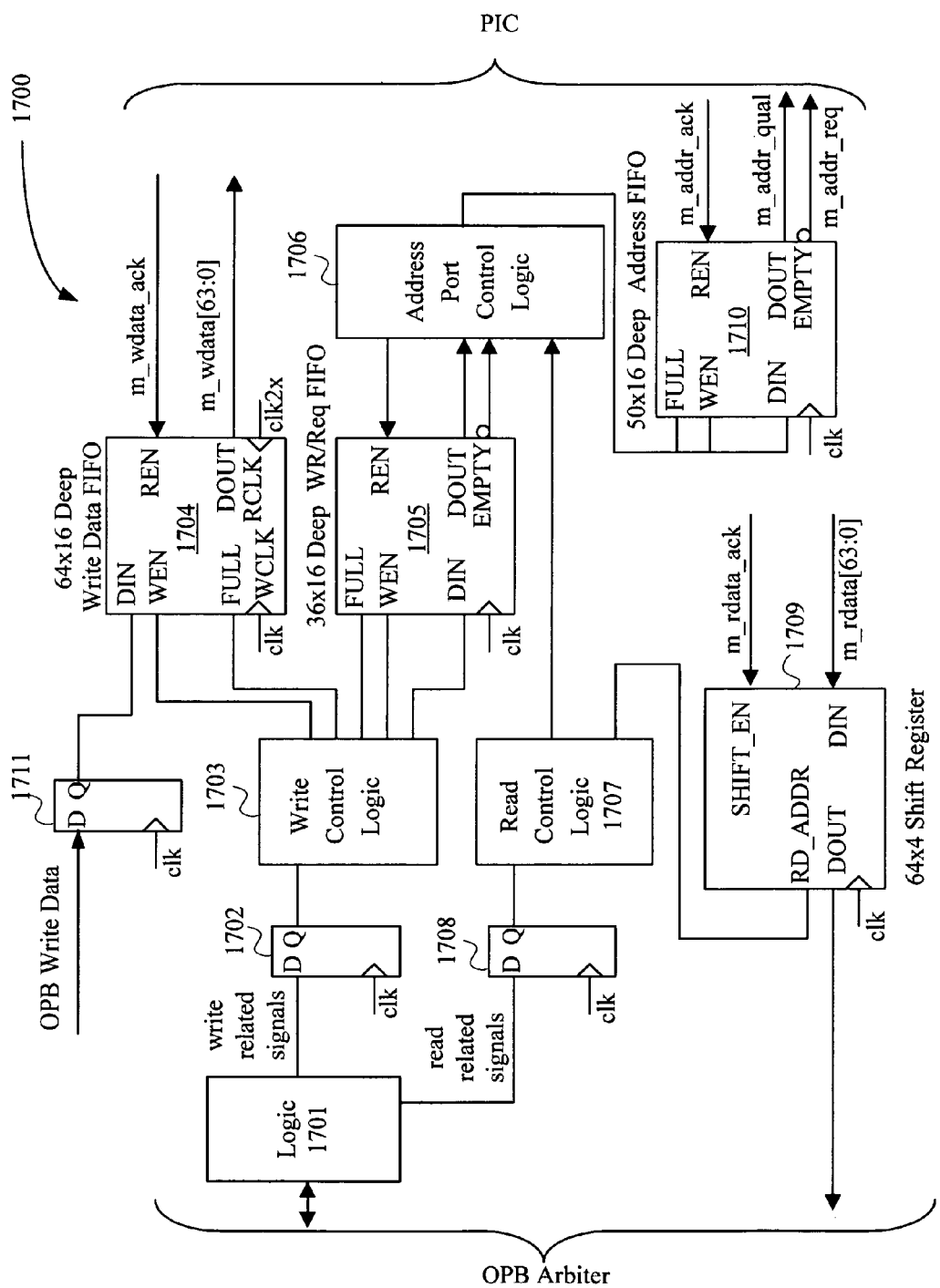
FIG. 17 illustrates a high-level diagram of one embodiment of a bridge-in module in the programmable interface core in accordance with the present invention.

The OPB/BI module receives OPB transaction requests as a slave and translates those requests into PIC transfers as a master. FIG. 17 illustrates a high-level diagram of one embodiment of a bridge-in module 1700 in accordance with the present invention. In bridge-in module 1700, OPB write data is stored into a write data FIFO 1704 that buffers the data to offload the transactions from the OPB. In one embodiment in which variable length bursts are not supported by the PIC slave modules, the OPB Burst writes can be converted into a series of single beat or cacheline transfers over the PIC. The OPB reads result in data fetches issued to the PIC slave module. Burst read requests cause bridge-in module 1700 to perform data pre-fetches of up to 8 words. Bridge-in module 1700 can also perform the necessary clock domain and bus width conversions to move data between the PIC 64-Bit DDR read/write data paths and the OPB 32-Bit non-DDR shared data path.

In a write operation, transactions over the OPB that are received by OPB bridge-in module 1700 are buffered into a write data FIFO 1704. Write data FIFO 1704 supports write posting to prevent the OPB from being tied up while the transaction is performed over the PIC. The destination address of the write transactions as well as the length of write bursts are stored in a separate write request FIFO 1705. After the write request is fully queued up in bridge-in module 1700, the OPB transaction is complete and the OPB is available for other transactions. If write data FIFO 1703 or write request FIFO 1705 is full, any additional write requests cause a Retry signal to be asserted by logic 1701.

A state machine in address port control logic 1706 continuously polls write request FIFO 1705 for pending write transactions. When control logic 1706 sees write request FIFO 1705 is not empty, the queued write transaction is taken out and processed. Write transactions from the OPB can start at any word boundary and can be up to 32 words long. Thus, a write transaction can be converted into a series of word or cacheline-aligned transfers that are supported by the PIC. This conversion is performed with the help of request alignment logic, also provided in control logic 1706, which looks at the start address and length of a burst and computes the largest PIC transfer size that can be used. The PIC transfer is put into an address FIFO 1710 where the transaction can then be presented on the PIC (master) port. Any remaining fraction of the original write burst is iteratively sent through control logic 1706 until the complete set of transactions has been loaded into address FIFO 1710. Note that at this point, the write data is queued up and available to the PIC.

Read transactions are handled through a separate state machine in control logic 1706 that controls read fetches from a PIC Slave and returns the data back over the OPB. If the OPB read request is a non-burst, a single word read request is loaded into address FIFO 1710. If the OPB read request is a burst operation, bridge-in module 1700 fetches data up to the next 8-word cacheline boundary by loading a read request of the smallest necessary size into address FIFO 1710.

The data that is returned from the read request is stored into a shift register 1709 that supports the PIC 64-bit DDR read data path. The data in shift register 1709 is then multiplexed to the appropriate 32-bit OPB data path (explained in detail above) and a corresponding transfer acknowledge signal is asserted. For a read burst that continues past the 8-word boundary, a new 8-word cacheline request is made over the PIC to the next memory location to continue the burst. In one embodiment in which bridge-in module 1700 does not cache data, each read requires a new PIC transaction request even if the data is available from a previous transaction. Note that any read errors from the PIC can cause the OPB error acknowledge signal to be asserted (not shown, but captured by the logic of shift register 1709). In one embodiment, logic 1701 can assert a time-out suppress while it waits for the read data to be returned. This feature is beneficial because it may take an indeterminate amount of time for the PIC transaction to complete.

The address decoder logic, which forms part of write control logic 1703 and 1707, is duplicated from the PIC so that bridge-in module 1700 only accepts transactions for addresses that are known to exist on the PIC side. In this manner, bridge-in module 1700 is prevented from generating address errors and from causing feedback loops with the bridge-out module (see FIG. 16). Moreover, this duplication also allows the PIC connection path between bridge-in module and the bridge-out module to be removed, thereby saving valuable logic resources.

Address, write request, and write data FIFOs 1710/1705/1704 can be designed to run at high clock rates. Specifically, in one embodiment, these FIFOs can be based on Shift Register Look-Up-Table (SRL) FPGA primitives that require a synchronous relationship between the read and write ports. As described above, because of their simplicity, an SRL-based FIFO typically does not support any protection mechanism. Thus, if the FIFO is read when empty or written when full, then an unrecoverable error may occur. To prevent this from occurring, logic 1706/1703/1707 should be designed to ensure that FIFOs 1710/1705/1704 are used properly.

The high clock frequency of the PIC master port in bridge-in module 1700 can make it difficult to meet the timing requirements of the design. Therefore, logic that operates in the 2× clock domain or is sensitive to the path of the 1× clock must be carefully designed so there is at most one level of logic between flip-flops. This design limitation encourages the use of efficient logic structures and/or certain FPGA primitives that may help improve timing.

In one embodiment of the present invention, the read pre-fetch size is increased from 8 words to 16 (or 32) words, thereby improving the efficiency of bridge-in module 1700 if long OPB read bursts are common. Note that short OPB burst reads may experience higher latency. Thus, the designer must decide what the optimal pre-fetch size is. Advantageously, the present invention can be changed to utilize 16- or 32-word pre-fetching with little additional logic. Specifically, as described above, the read data from the PIC can be stored in a 64 bit wide SRL array. Because each SRL is inherently 16 registers deep, there is already enough storage for 32 words of read data. Thus, in this case, the user could change the read data multiplexing logic and modify the read state machine logic to load longer read requests into address FIFO 1710.

In another embodiment of the present invention, write request FIFO 1705 can be removed to reduce the amount of logic used in the design. However, the removal of this FIFO would disable the write posting functionality. Disabling write posting functionality could potentially reduce OPB performance due to write transactions that are stalled by pending transactions over the PIC.

The control logic in write data FIFO 1704 uses a large amount of redundant logic. This redundancy reduces fanout, thereby allowing FIFO 1704 to run up to the desired DDR clock rate. At lower clock speeds, much of this redundant control logic can be removed. In addition, some read data path pipeline registers, such as registers 1711, 1702 and 1708 in FIG. 17, could also be taken out to reduce latency and resource usage if the timing constraints were relaxed.

F. Hybrid Programmable Interface Cores

Figure 18A:
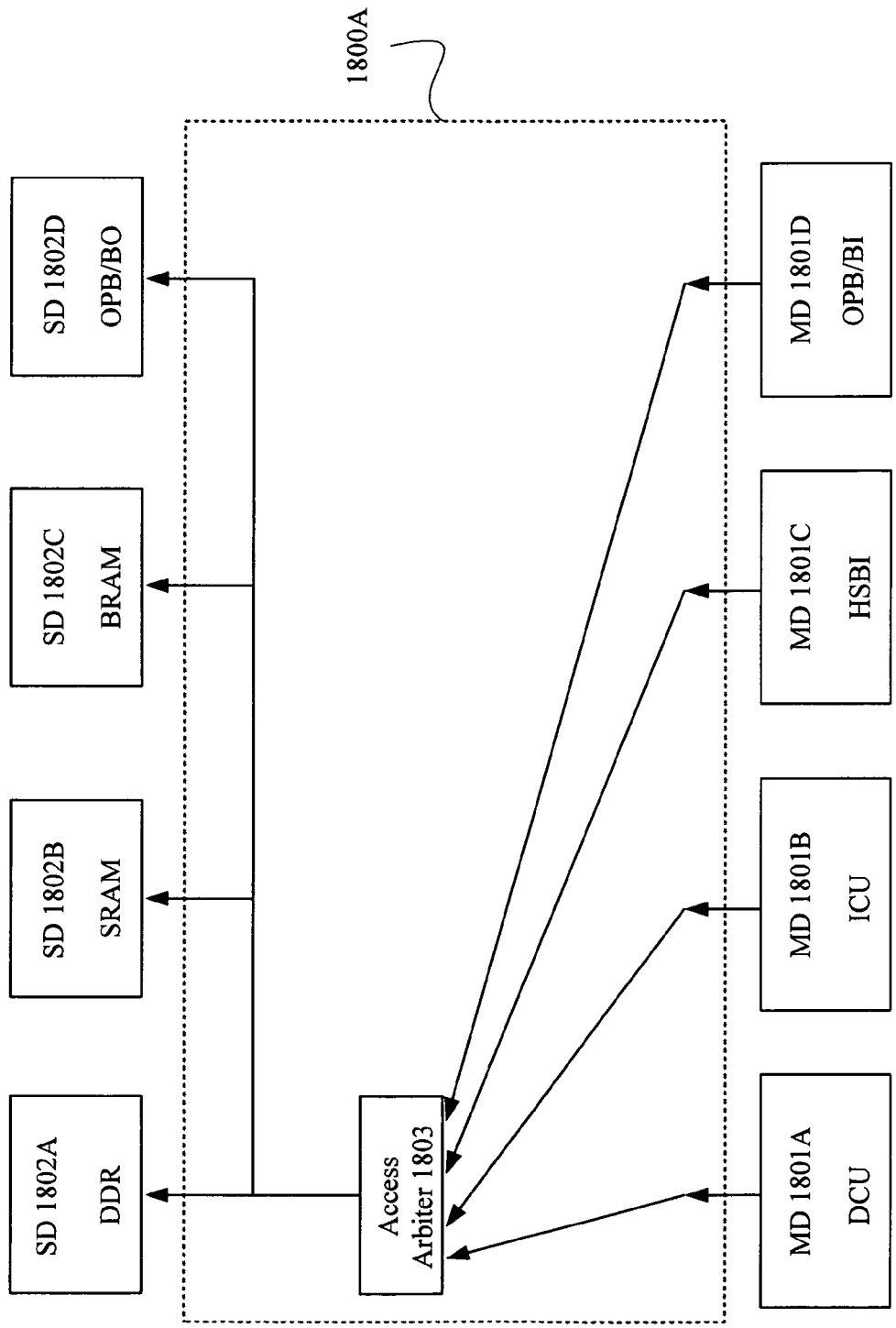
FIGS. 18A and 18B respectively illustrate the address/control and data logic of a shared bus architecture.
Figure 18B:
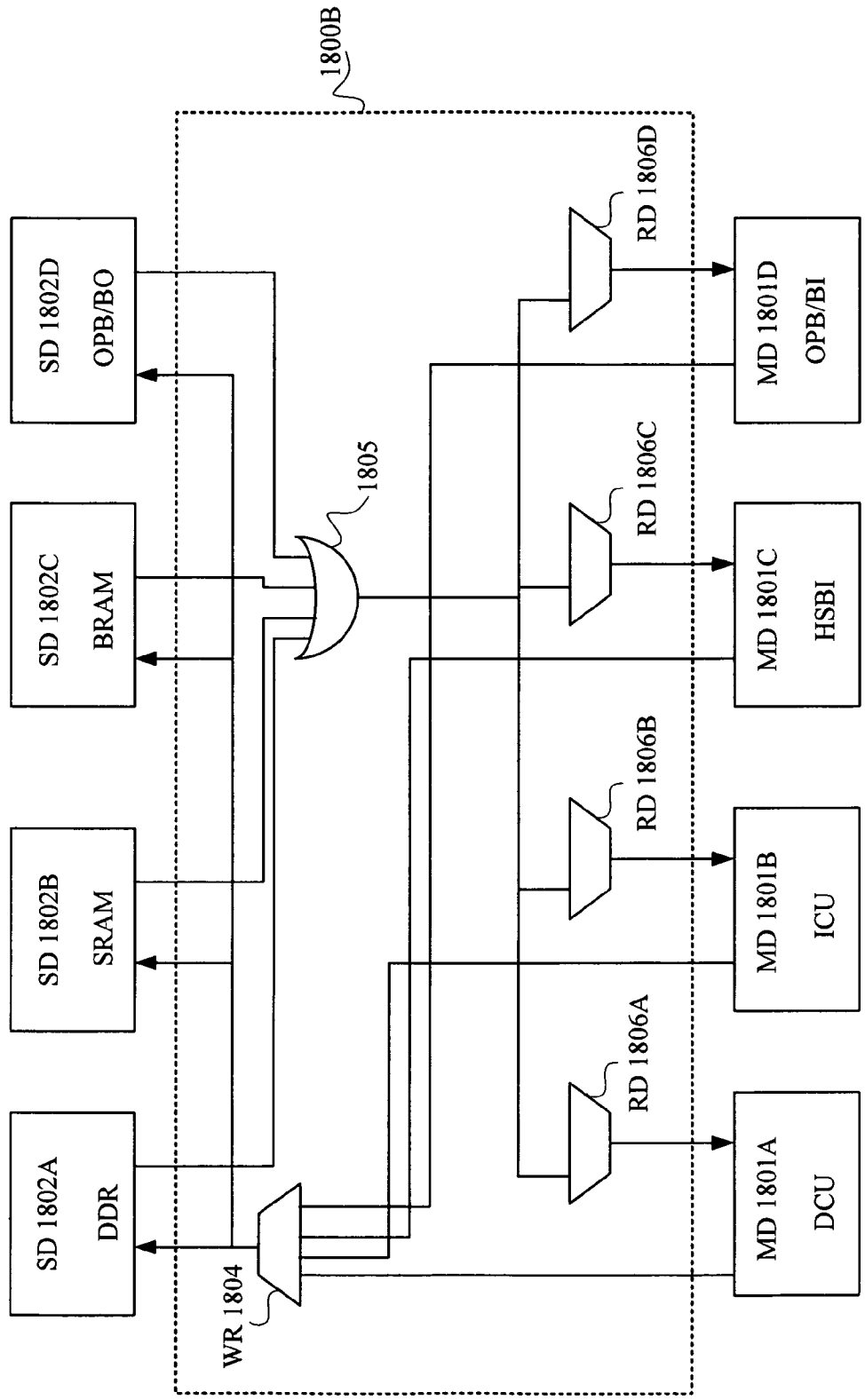

In another embodiment of the present invention, the programmable interface core (PIC) includes elements of a shared bus in addition to the crosspoint switch described in detail above. For the reader's convenience, FIGS. 18A and 18B respectively illustrate the address/control and data paths of a shared bus architecture. As shown in FIG. 18A, a shared bus 1800A for the address/control path could be implemented by providing an arbiter 1803, which receives the address/control signals of master devices 1801. Once access arbiter 1803 determines which master device 1801 should be selected to proceed with its transaction, the request is forwarded to all slave devices 1802. Each slave device 1802 decodes the address/control information and determines whether it is the requested slave for that transaction. Referring to FIG. 18B, the shared bus 1800B for the data path could be implemented by providing a single write multiplexer 1804, which receives the write data from master devices 1801. In a shared bus, all slave devices 1802 receive the selected write data; however, only one slave device 1802 actually writes the data. In a read operation, a slave device 1802 can output a logic zero signal, unless that slave device is active in the read transaction. In this manner, OR gate 1805 will transfer the read information to read multiplexers 1806. Control circuitry, not shown, determines which write data is selected by write multiplexer 1804 to complete the write operation as well as which read multiplexer 1806 is selected to complete the read operation.

Figure 19A:
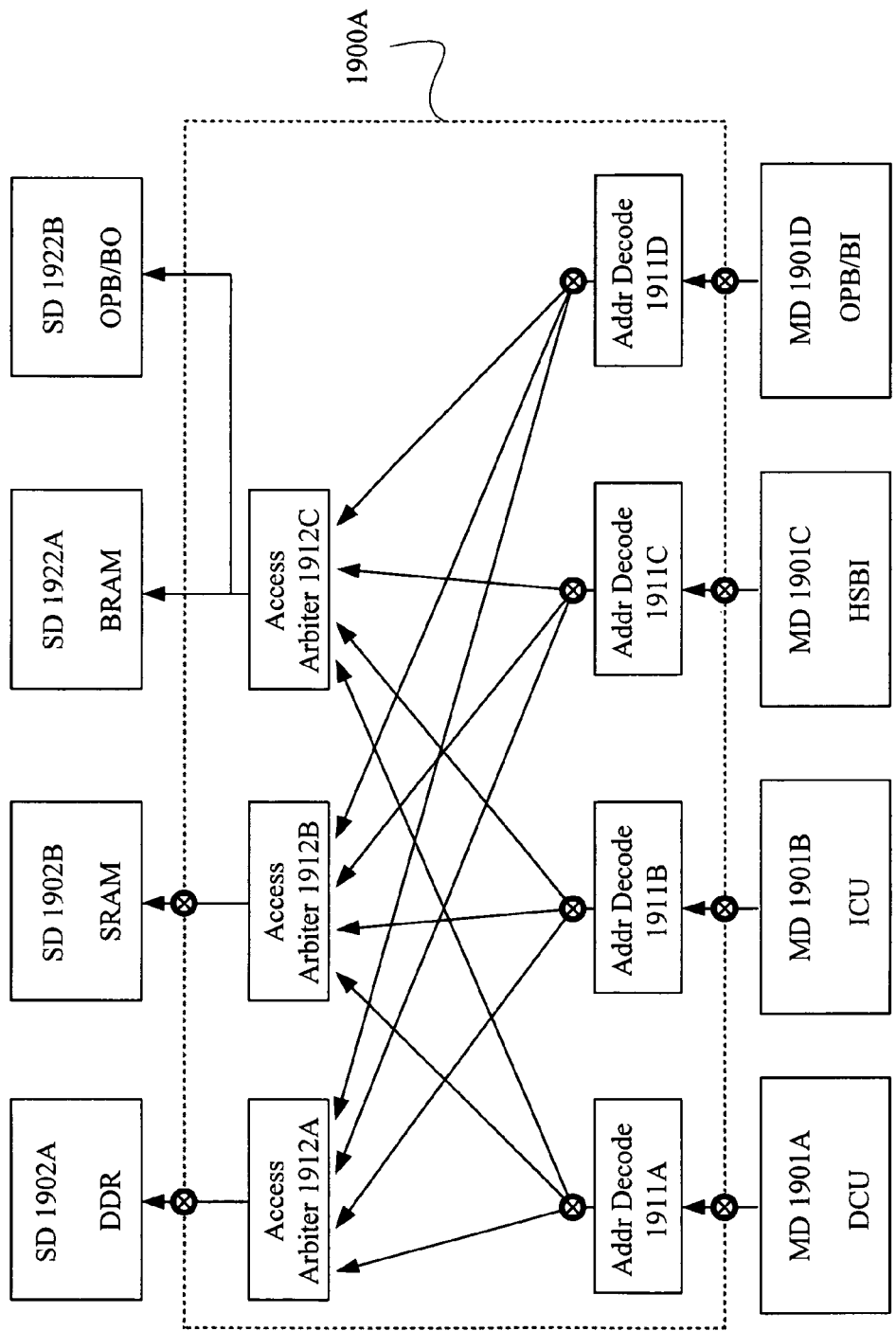
FIGS. 19A and 19B illustrate the address/control and data logic, respectively, of a hybrid crosspoint/shared bus architecture in accordance with one embodiment of the present invention.
Figure 19B:
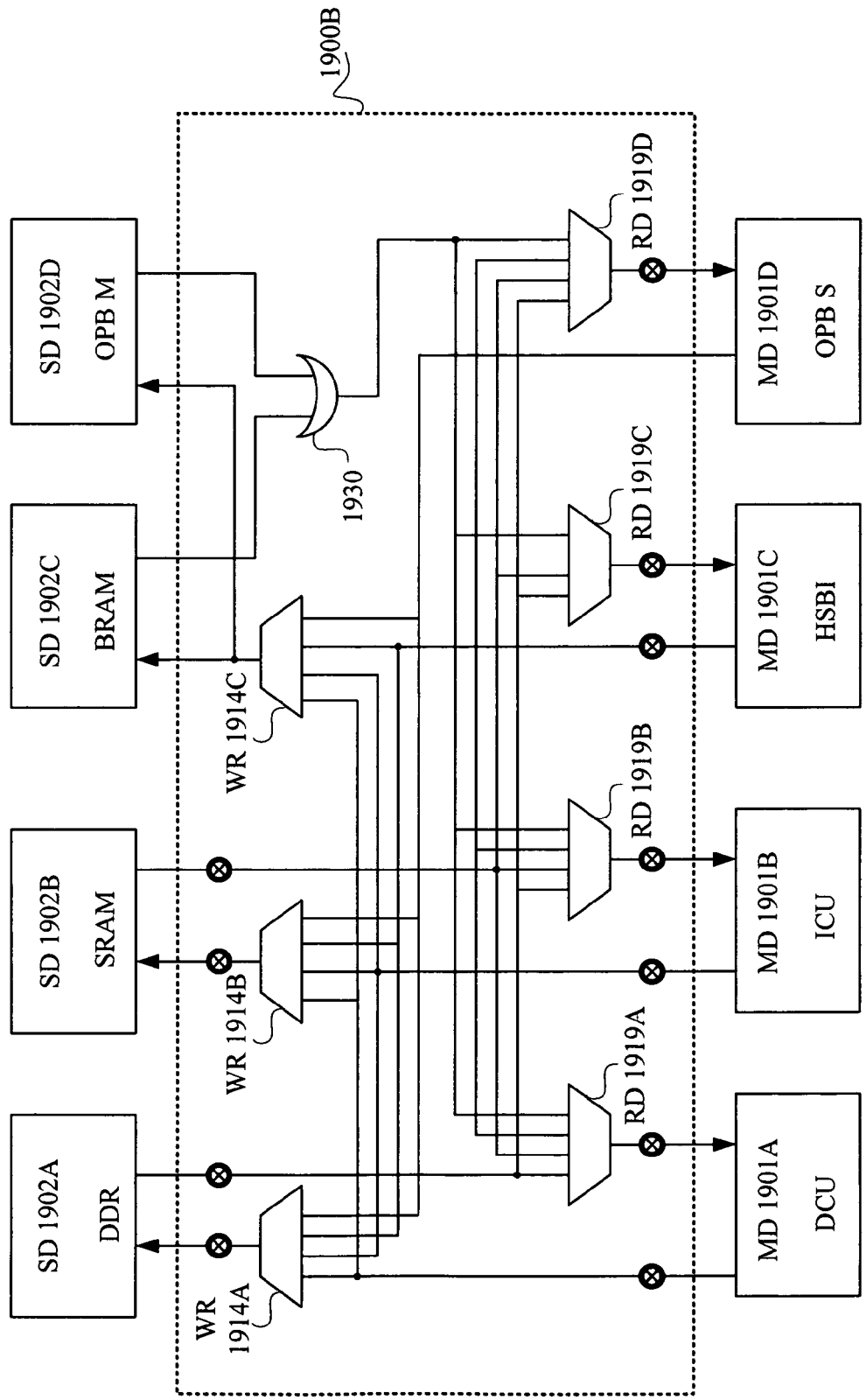

FIGS. 19A and 19B illustrate the address/control and data paths, respectively, of a hybrid crosspoint/shared bus architecture in accordance with another embodiment of the present invention. As shown in FIG. 19A, a hybrid switch 1900A for the address/control path includes a plurality of address decoders 1911A-1911D for receiving address/control information from master devices 1901A-1901D, respectively. In hybrid switch 1900A, three access arbiters 1912A-1912C can receive decoded address from address decoders 1911A-1911D. Access arbiter 1912C determines the arbitration for two slave devices 1922A and 1922B. In this embodiment, because of the shared bus coupled to access arbiter 1912C, only one of slave devices 1922A and 1922B can be active in a transaction. Unlike slave devices 1902A and 1902B, slave devices 1922A and 1922B must include decoding logic to determine which of them has been selected for the transaction. Note that in the shared bus portion of hybrid switch 1900A the pipelining registers have been removed.

As shown in FIG. 19B, a hybrid switch 1900B for the data path includes a plurality of read multiplexers 1919, one for each master device 1901. Note that slave devices 1902C and 1902D, instead of providing outputs directly to read multiplexers 1901, as in a crosspoint switch (see FIG. 5C), provide outputs to a logic (OR) gate 1930. Thus, in hybrid switch 1900B, only one slave device 1902C or 1902D can provide read information to master devices 1901 at any one time. In this embodiment, the inactive slave device(s) of slave devices 1902C and 1902D would output a logic zero. Hybrid switch 1900B also includes a plurality of write multiplexers 1914A-1914C, i.e. less the number of slave devices 1902. Thus, slave devices 1902C and 1902D both receive the write data provided by write multiplexer 1914C. The selected slave device 1902 (as determined by the address provided by access arbiter 1912C, see FIG. 19A) writes the data, whereas the non-selected slave device 1902 ignores the data.

Of importance, both the master and slave protocols in hybrid switch 1900A/1900B could remain the same as described in detail above for crosspoint switch 500A/500B. However, in one embodiment, a re-arbitrate port can be added to prevent deadlock on the shared bus portion of the hybrid switch. Note that hybrid switch 1900A/1900B, like the crosspoint switch, can be trimmed to eliminate unnecessary paths. Thus, for example, the write path associated with master device 1901B (i.e. an ICU) could be trimmed.

Hybrid switch 1900A/1900B can reduce the number of used resources compared to a full crosspoint switch. Specifically, the logic gates used in the hybrid switch use fewer resources than the multiplexers of the crosspoint switch. However, this advantage must be weighed against the potential reduction in performance. In one embodiment, the present invention could determine that a first set of slave devices, being slower than a second set of slave devices, could be configured to use the shared bus portion of the hybrid switch, whereas the second set of slave devices could be configured to use the crosspoint portion of the hybrid switch. In an FPGA environment, system designers can easily determine the appropriate mix of shared bus/crosspoint switch resources to maximize performance and minimize area.

G. Software Tools

In accordance with the present invention, a method for generating a configuration bitstream for a programmable logic device (PLD) is given. This method can be easily incorporated into the system described in reference to FIG. 3. Specifically, the method of the present invention includes activating a core generator, selecting a programmable interface core using the core generator, and providing the programmable interface core to a PLD software tool that generates the configuration bitstream. The PLD software, in addition to receiving the programmable interface of the present invention, can receive a top-level design provided by a user. Of importance, the programmable interface core can selectively provide a plurality of compliance levels. For example, the programmable interface core can provide a subset of the processor local bus (PLB) functions, as described in detail above. In one embodiment, the programmable interface core can tailor the subset to the functionality required by the top-level design.

The descriptions of the present invention provided herein are illustrative only and not limiting. Specifically, various embodiments of the present invention have been described in detail above. Modifications to those embodiments will be apparent to those skilled in the art. Therefore, the scope of the present invention can be defined only by the appended claims.

The invention claimed is:

1. A programmable logic device comprising:
   a central processing unit (CPU);
   on-chip peripheral bus;
   a programmable interface coupled between the CPU and the on-chip peripheral bus, wherein the programmable interface includes a core designated by a user, the programmable interface comprising an address decoder for accessing devices coupled to the on-chip peripheral bus; and
   a first device coupled to the on-chip peripheral bus for one of providing information to and receiving information from the CPU via the programmable interface using an address decoded by the address decoder of the programmable interface.

2. The programmable logic device of claim 1, further including a plurality of devices, each device for one of providing information to the CPU via the programmable interface, receiving information from the CPU via the programmable interface, and communicating with another device via the programmable interface.

3. The programmable logic device of claim 2, wherein the programmable interface includes a crosspoint switch for coupling the plurality of devices.

4. The programmable logic device of claim 3, wherein the crosspoint switch includes address/control paths and data paths.

5. The programmable logic device of claim 4, wherein the address/control paths are formed from a first set of programmable resources and the data paths are formed from a second set of programmable resources.

6. The programmable logic device of claim 4, wherein the data paths are trimmable.

7. The programmable logic device of claim 2, wherein a bridge module couples the on-chip peripheral bus to the programmable interface.

8. The programmable logic device of claim 7, wherein a first group of devices from the plurality of devices are coupled to the peripheral bus and coupled to the programmable interface via the bridge module.

9. The programmable logic device of claim 8, wherein a second group of devices from the plurality of devices are not connected to the programmable interface via the bridge module.

10. The programmable logic device of claim 8, wherein the first group of devices includes a plurality of cores designated by the user.

11. The programmable logic device of claim 10, wherein at least one core provides a master/slave functionality.

12. The programmable logic device of claim 10, wherein at least one core provides a master functionality.

13. The programmable logic device of claim 10, wherein at least one core provides a slave functionality.

14. A method for configuring a programmable logic device having an embedded microprocessor by use of a programming system having a software tool including a user-designated core, comprising:
    selectively providing connectivity between a plurality of masters on the programmable logic device and a plurality of slaves on the programmable logic device by way of an on-chip peripheral bus, wherein the microprocessor is one such master and wherein the user-designated core comprises an address decoder for accessing devices coupled to the on-chip peripheral bus; and
    generating a configuration bitstream to configure the programmable logic device to enable the address decoder of the user-designated core.

15. The method of claim 14, wherein the user-designated core includes:
    means for decoding addresses from the masters; and
    means for arbitrating transactions between the plurality of masters and the plurality of slaves based on the decoded addresses.

16. The method of claim 15, wherein the core provides full connectivity between the means for decoding and the means for arbitrating.

17. The method of claim 15, wherein connectivity between the means for decoding and the means for arbitrating can be selectively changed.

18. The method of claim 15, wherein the core includes:
    means for receiving write data from the plurality of masters and selectively providing the write data to designated slaves; and
    means for receiving read data from the plurality of slaves and selectively providing the read data to designated masters, wherein the means for receiving write data and the means for receiving read data are controlled by the means for arbitrating.

* * * * *